United States Patent [19]
Mitchell et al.

[11] Patent Number: 5,646,730
[45] Date of Patent: Jul. 8, 1997

[54] RELATIVE MOVEMENT DETECTING APPARATUS USING A DETECTOR POSITIONED IN A REGION OF NATURAL INTERFERENCE

[75] Inventors: Donald K. Mitchell, Newton; William G. Thorburn, Whitinsville, both of Mass.

[73] Assignee: MicroE, Inc., Needham Heights, Mass.

[21] Appl. No.: 590,203

[22] Filed: Jan. 23, 1996

Related U.S. Application Data

[63] Continuation of Ser. No. 394,224, Feb. 24, 1995, Pat. No. 5,486,923, which is a continuation of Ser. No. 250,666, May 27, 1994, abandoned, which is a continuation-in-part of Ser. No. 878,494, May 5, 1992, abandoned.

[51] Int. Cl.$^6$ .................................................. G01B 9/02
[52] U.S. Cl. ...................... 356/356; 356/345; 250/237 G
[58] Field of Search ................................ 356/345, 356, 356/358; 250/237 G

[56] References Cited

U.S. PATENT DOCUMENTS

| Re. 33,669 | 8/1991 | Nomura et al. ............... | 356/356 |
| 4,168,908 | 9/1979 | Cubalchini ................... | 356/363 |
| 4,176,276 | 11/1979 | Kaul et al. .................. | 250/237 |

(List continued on next page.)

FOREIGN PATENT DOCUMENTS

| 0 248 277 A2 | 6/1986 | European Pat. Off. . |
| 23 16 248.3 | 3/1973 | Germany . |
| 1 474 049 | 1/1974 | United Kingdom . |

OTHER PUBLICATIONS

Michael Hercher and Geert Wyntjes, "Precision Angle Measurement With a Two–Frequency HeNe Laser,", *Proceedings of SPIE–The International Society for Optical Engineering*, Jan. 15–16, 1987, Vo. 741, pp. 174–185.

(List continued on next page.)

*Primary Examiner*—Frank Gonzalez
*Assistant Examiner*—Robert Kim
*Attorney, Agent, or Firm*—Limbach & Limbach L.L.P.

[57] ABSTRACT

The apparatus disclosed herein employs a grating (13) which concentrates light at a preselected wavelength into the positive (33) and negative (35) first orders while minimizing the zeroth order (31). The grating (13) is illuminated with monochromatic light of the selected wavelength and a poly-phase periodic detector (25) has its sensing plane spaced from the grating a distance less than $$\frac{W}{2\tan\theta} \quad \text{where } \theta = \arcsin\left(\frac{\lambda}{P}\right)$$

where W is the width of the illuminated region of the grating. The period of the poly-phase detector is equal to P/2 so that each detector element (51) or phase responds principally to the natural interference between the positive and negative first orders without requiring magnification or redirection of the diffracted light. Preferably, the distance of the sensing plane from the grating (13) is greater than $$\frac{W}{2\tan\phi} \quad \text{where } \phi = \arcsin\left(\frac{3\lambda}{P}\right)$$

so that the detector response does not include substantial components from diffraction orders higher than the first. Various embodiments of the invention are described including a wavefront compensation approach which greatly increases design freedom in the selection of grating and detector characteristics in implementing the present invention in practical and manufacturable devices.

17 Claims, 36 Drawing Sheets

U.S. PATENT DOCUMENTS

| | | | |
|---|---|---|---|
| 4,631,416 | 12/1986 | Trutna, Jr. | 250/348 |
| 4,655,587 | 4/1987 | Wijntjes et al. | 356/346 |
| 4,676,645 | 6/1987 | Taniguchi et al. | 356/356 |
| 4,710,026 | 12/1987 | Magone et al. | 356/349 |
| 4,711,573 | 12/1987 | Wijntjes et al. | 356/346 |
| 4,728,193 | 3/1988 | Bartelt et al. | 356/356 |
| 4,731,772 | 3/1988 | Lee | 369/45 |
| 4,764,014 | 8/1988 | Makosch et al. | 356/351 |
| 4,776,698 | 10/1988 | Crosdale | 356/345 |
| 4,776,701 | 10/1988 | Pettigrew | 356/356 |
| 4,815,850 | 3/1989 | Kanayama et al. | 356/349 |
| 4,829,342 | 5/1989 | Nishimura | 356/356 |
| 4,868,385 | 9/1989 | Nishimura | 250/231 |
| 4,872,751 | 10/1989 | Hercher | 356/35.5 |
| 4,967,072 | 10/1990 | Nishimura | 250/231.16 |
| 4,970,388 | 11/1990 | Nishimura et al. | 210/237 G |
| 5,036,192 | 7/1991 | Ishizuka et al. | 250/231.16 |
| 5,043,775 | 8/1991 | Lee | 357/19 |
| 5,050,153 | 9/1991 | Lee | 369/112 |
| 5,066,130 | 11/1991 | Tsukiji et al. | 356/356 |
| 5,098,190 | 3/1992 | Wijntjes et al. | 356/356 |
| 5,104,225 | 4/1992 | Masreliez | 356/356 |
| 5,129,725 | 7/1992 | Ishizuka et al. | 356/374 |
| 5,136,152 | 8/1992 | Lee | 250/211 |
| 5,182,610 | 1/1993 | Shibata | 256/349 |
| 5,325,349 | 6/1994 | Taniguchi | 369/44 |
| 5,486,923 | 1/1996 | Mitchell et al. | 356/345 |

OTHER PUBLICATIONS

Lawrence Mertz, "Optical homodyne phase metrology," *Applied Optics*, vol. 28, No. 5, Mar. 1, 1989, pp. 1011–1014.

Lawrence Mertz, "Complex Interferometry", *Applied Optics*, vol. 22, No. 10, May 15, 1983, pp. 1530–1534.

Lawrence Mertz, "Real–time Fringe–Pattern Analysis", *Applied Optics*, vol. 22, No. 10, May 15, 1983, pp. 1535–1539.

Lawrence Mertz, "Phase Estimation with Few Photons," *Applied Optics*, vol. 23, No. 10, May 15, 1994, pp. 1638–1641.

Sharp Corporation Japan brochure, "Laser Diodes,", Mar. 1992.

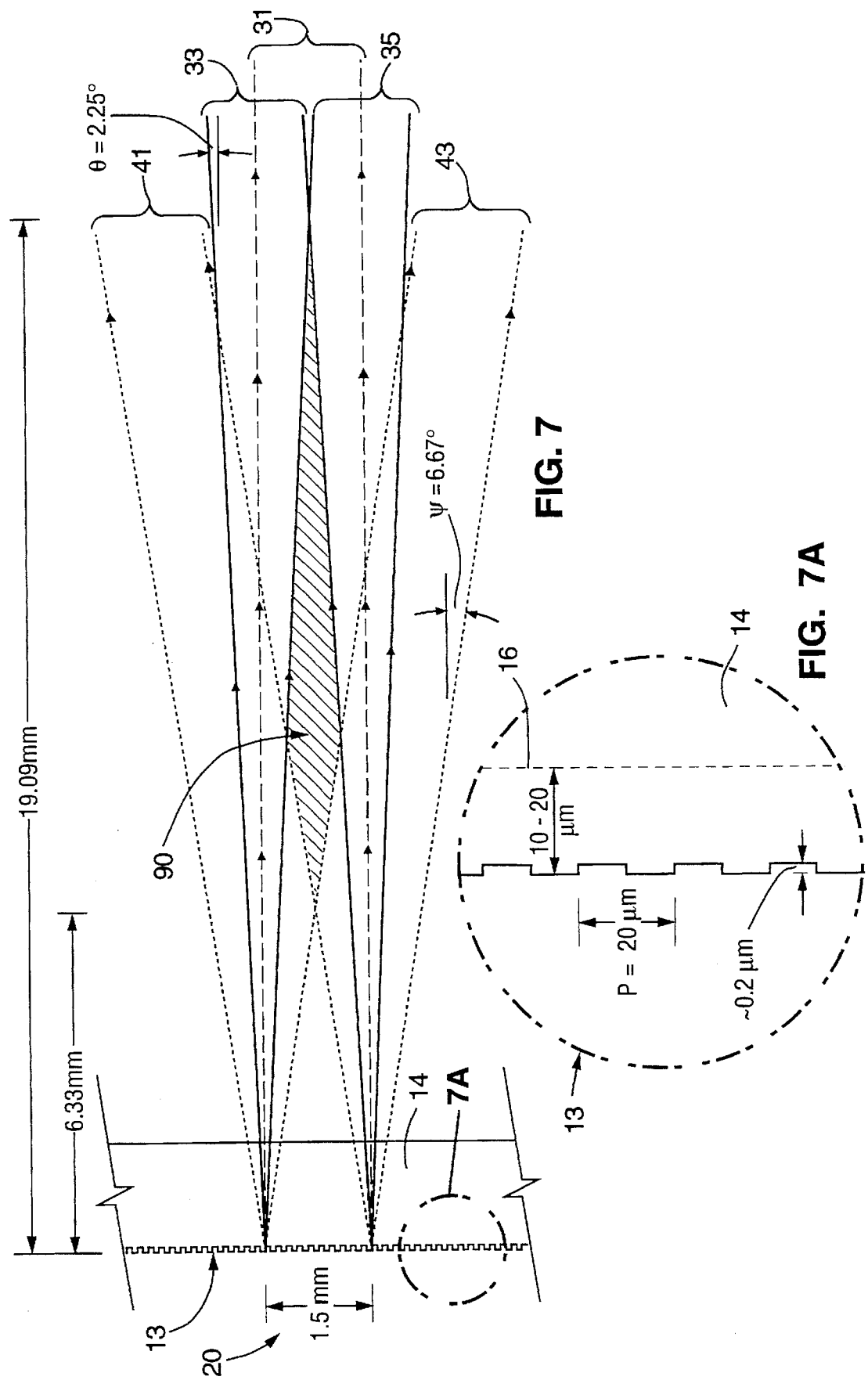

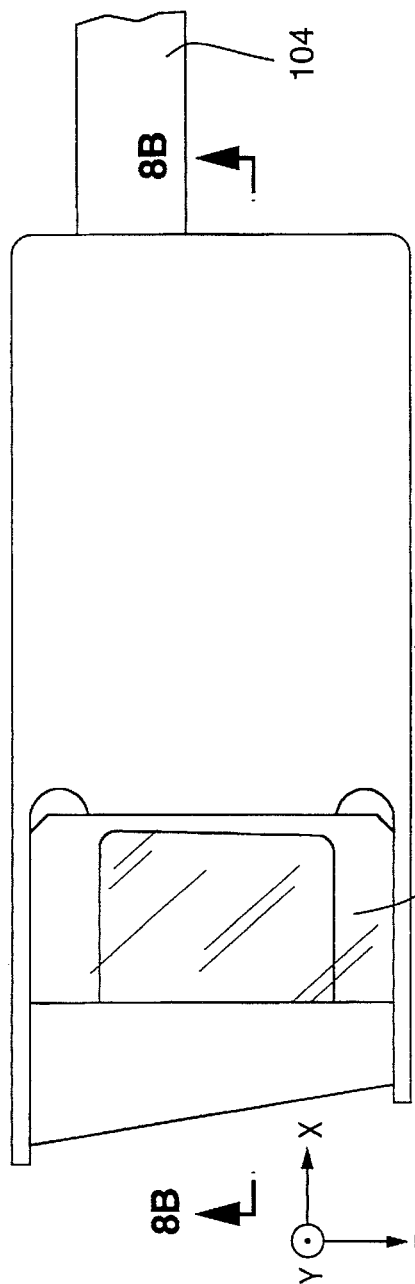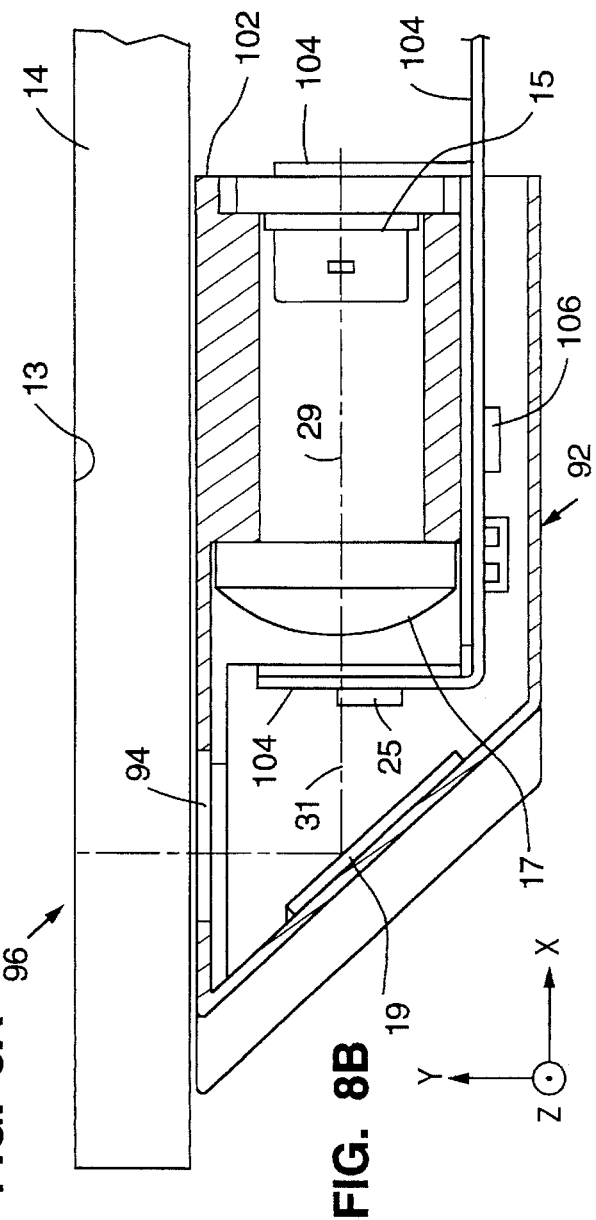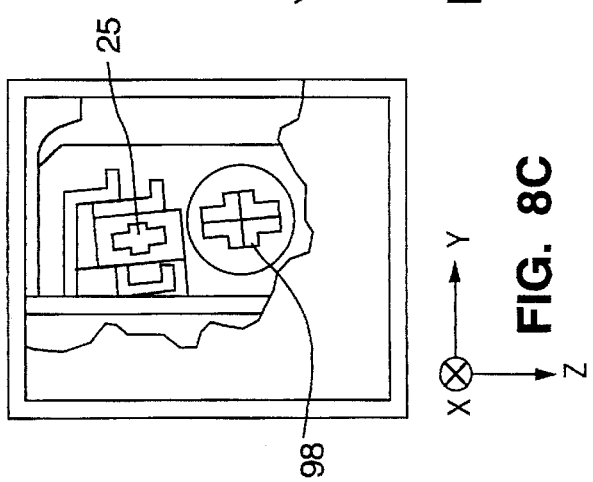

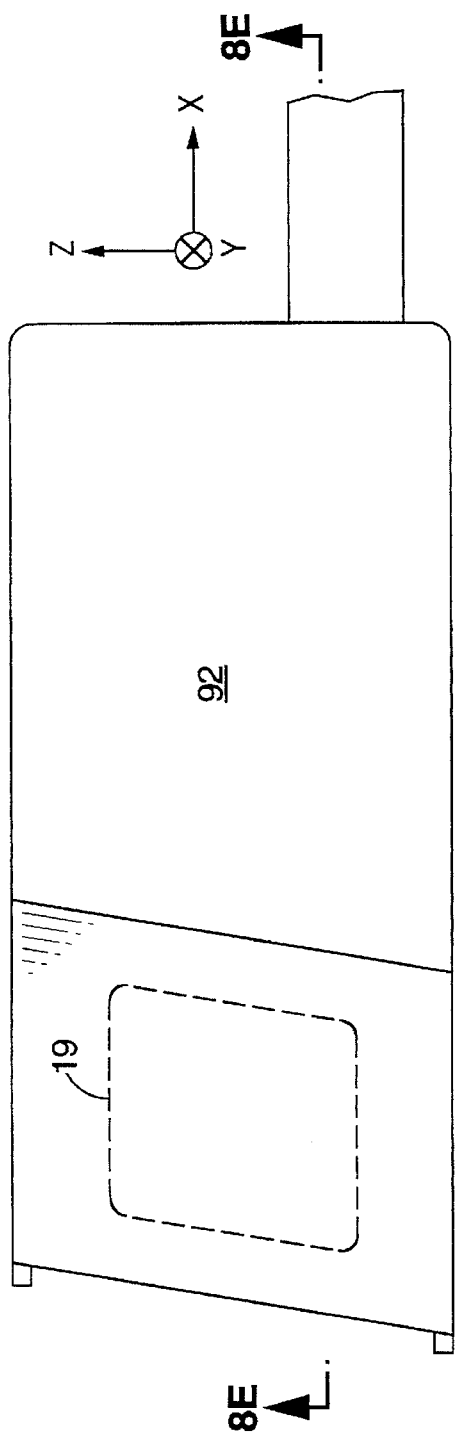
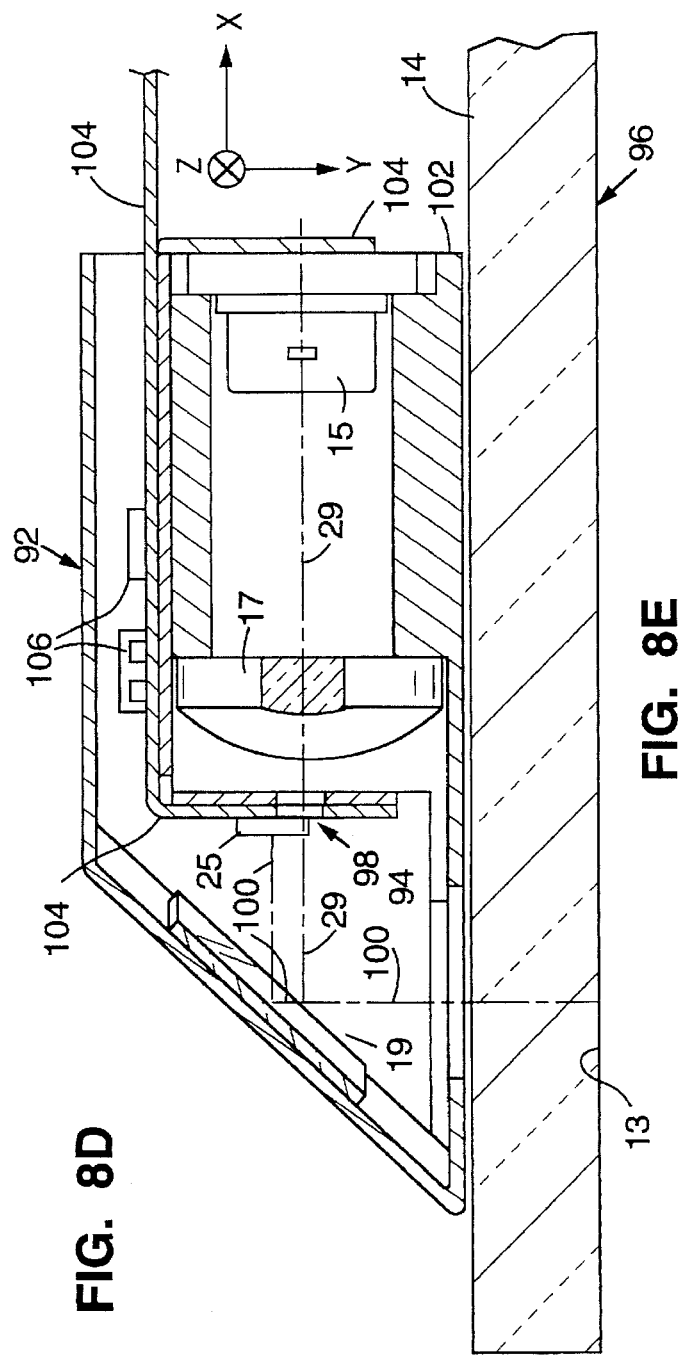
FIG. 8D
FIG. 8E

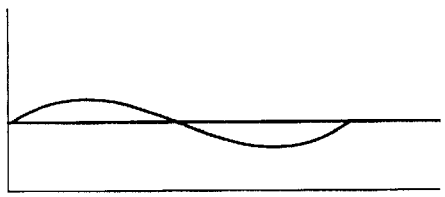
0TH AND 1ST INTERFERENCE
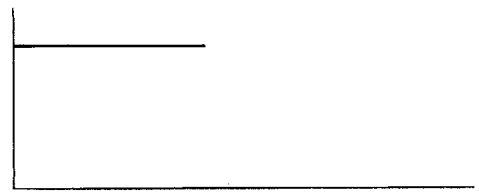
2X HARMONIC IS COMPLETELY FILTERED
AND ONLY INCREASES DC LEVEL
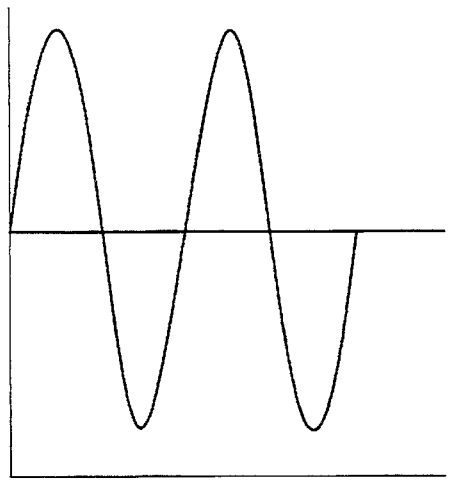
+/- 1ST INTERFERENCE
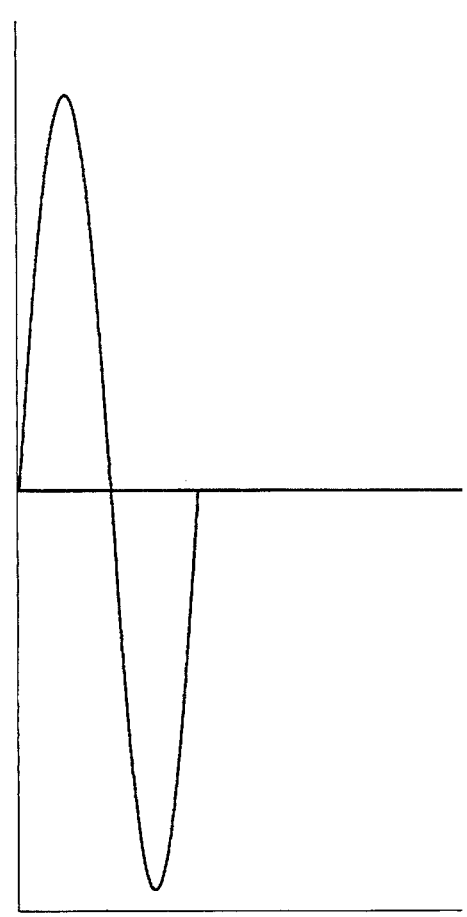
DESIRED FREQUENCY IS SUMMED
BY THE NUMBER OF QUADRANTS
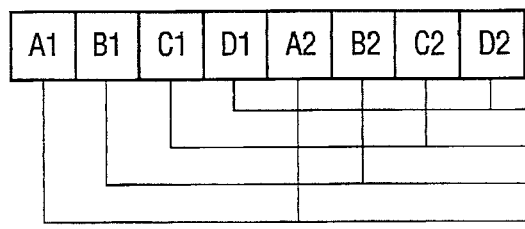
TWO DETECTOR QUADRANTS
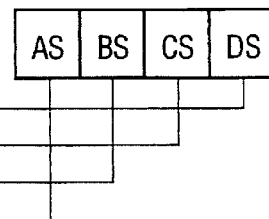
SUMMED DETECTOR OUTPUT
FIG. 11D

| TRANSITION # | X |
|---|---|
| 1 | 121.9 |
| 2 | 172.4 |
| 3 | 211.2 |
| 4 | 243.9 |
| 5 | 272.6 |
| 6 | 298.7 |
| 7 | 322.6 |
| 8 | 344.9 |
| 9 | 365.8 |
| 10 | 385.6 |
| 11 | 404.4 |

| TRANSITION # | X |
|---|---|
| 12 | 422.4 |
| 13 | 439.6 |
| 14 | 456.2 |
| 15 | 472.2 |
| 16 | 487.7 |
| 17 | 502.7 |
| 18 | 517.3 |
| 19 | 531.5 |
| 20 | 545.3 |
| 21 | 558.8 |
| 22 | 571.9 |

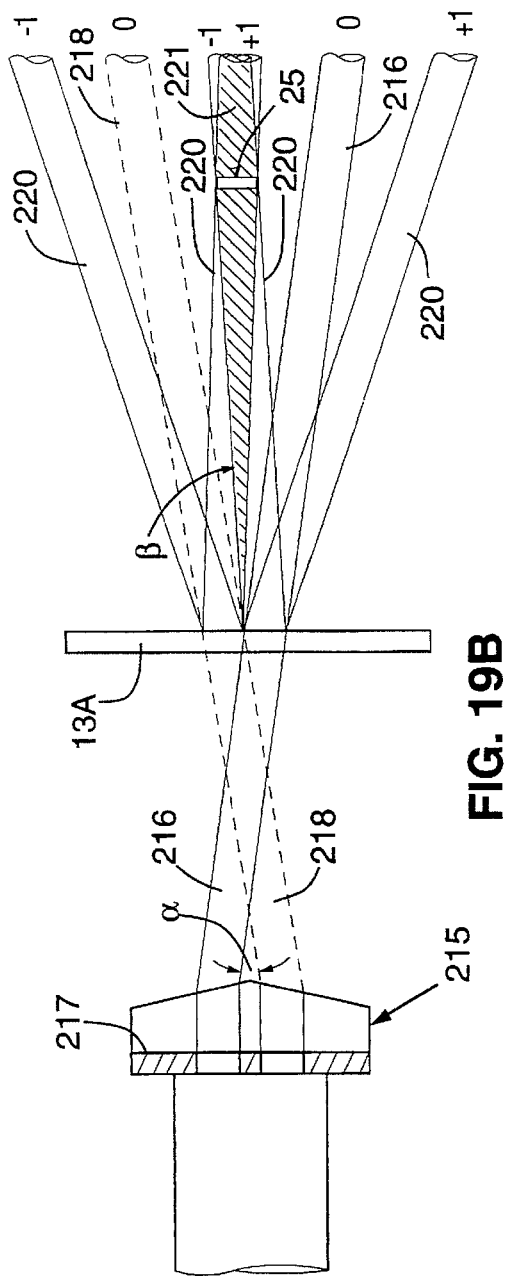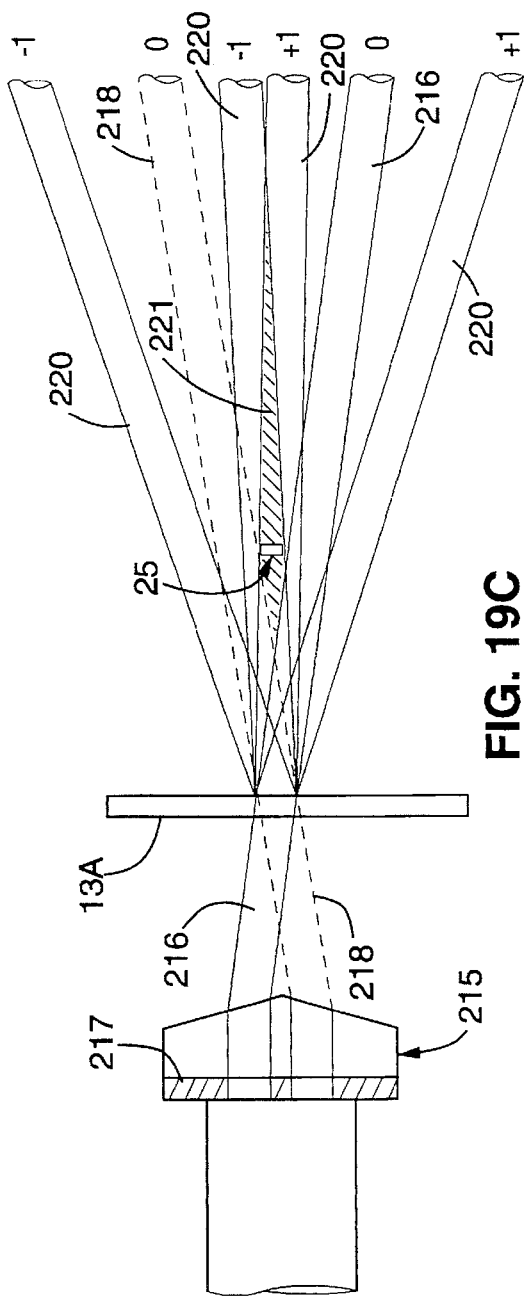

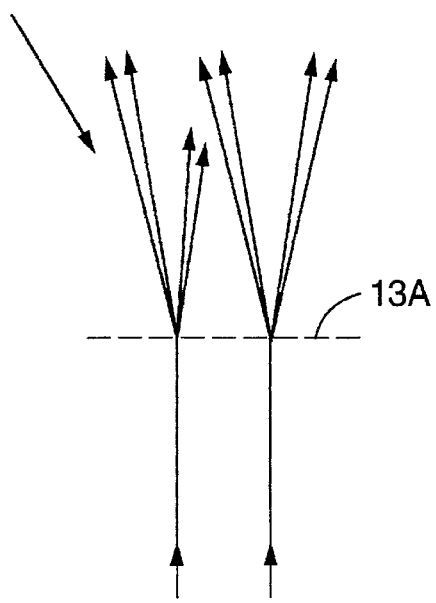
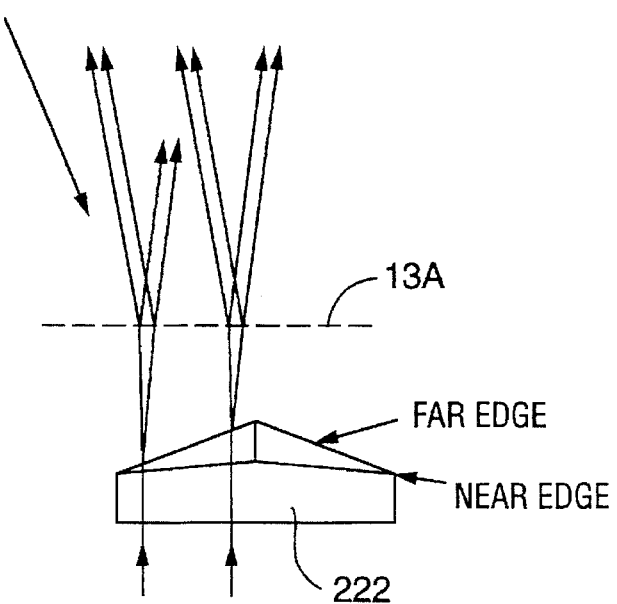
FIG. 21A  FIG. 21B
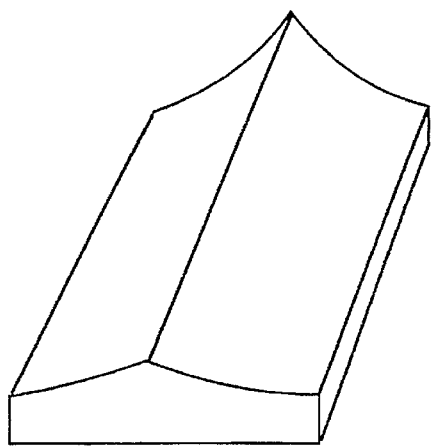
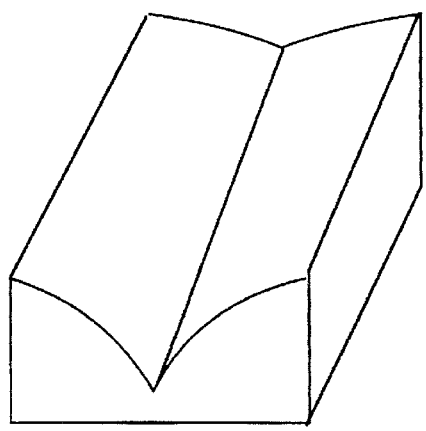
FIG. 22A  FIG. 22B

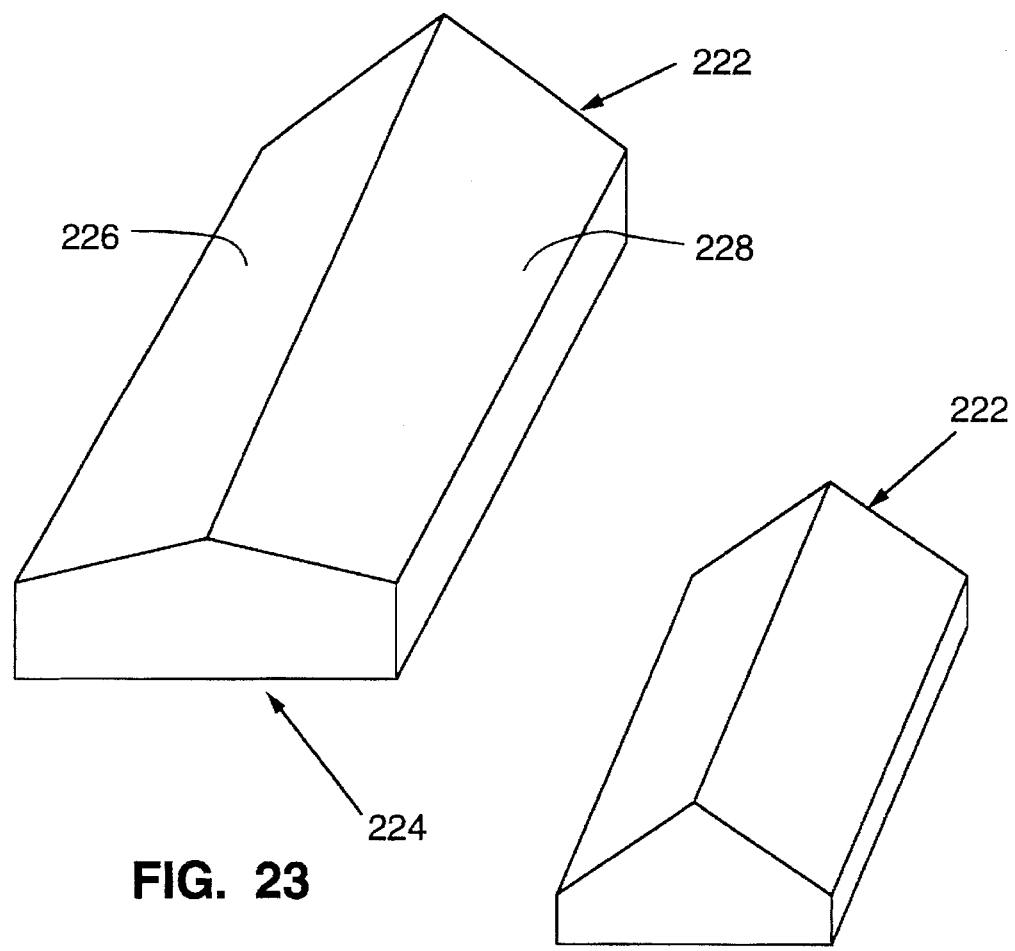
FIG. 23
FIG. 24
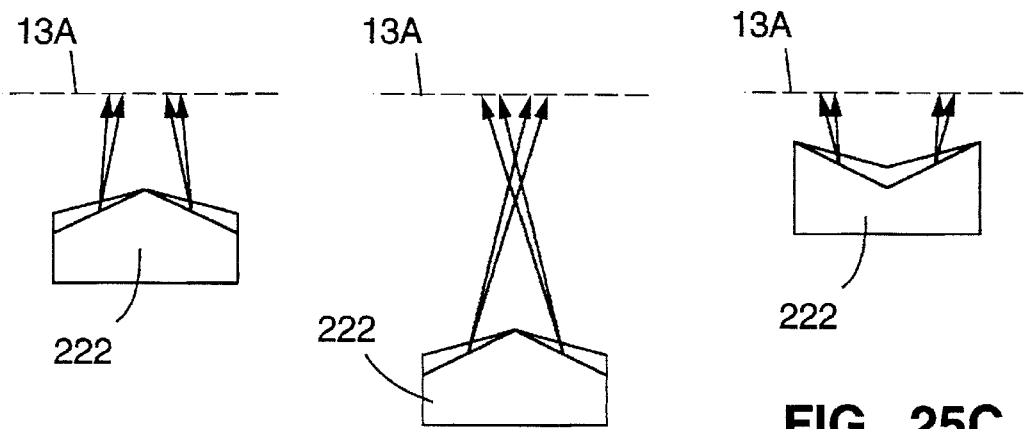
FIG. 25A
FIG. 25B
FIG. 25C

RELATIVE MOVEMENT DETECTING APPARATUS USING A DETECTOR POSITIONED IN A REGION OF NATURAL INTERFERENCE

This is a continuation of application Ser. No. 08/394,224, filed Feb. 24, 1995 of Donald K. Mitchell, et al. for APPARATUS FOR DETECTING RELATIVE MOVEMENT WHEREIN A DETECTING MEANS IS POSITIONED IN A REGION OF NATURAL INTERFERENCE, now U.S. Pat. No. 5,486,923, which is a file wrapper continuation of prior complete application Ser. No. 08/250,666, filed on May 27, 1994, by Donald K. Mitchell, et al. for APPARATUS FOR DETECTING RELATIVE MOVEMENT WHEREIN A DETECTING MEANS IS POSITIONED IN A REGION OF NATURAL INTERFERENCE ADJACENT TO A GRATING ELEMENT, now abandoned, which is a continuation-in-part of application Ser. No. 07/878,494, filed on May 5, 1992 for APPARATUS FOR DETECTING RELATIVE MOVEMENT, now abandoned.

BACKGROUND OF THE INVENTION

The present invention relates to an optical instrument for measuring displacement and more particularly to such an instrument which utilizes diffraction of monochromatic light from a grating which is movable relative to a light source or sensing head.

A number of systems have been proposed heretofore for measuring relative displacement utilizing diffraction of light from an optical grating. Examples of such prior art systems may be seen in the Pettigrew U.S. Pat. No. 4,776,701; the Kanayama et al. U.S. Pat. No. 4,815,850; the Taniguchi et al. U.S. Pat. No. 4,676,645; and the Wijntjes et al. U.S. Pat. No. 5,098,190. A commercially available system of this type is sold by Optra, Inc. of Beverly, Mass. under its trademark "Nanoscale" U.S. Pat. No. 5,098,190 is believed related to the "Nanoscale" product. Each of these prior art systems, however, involves magnification or separation of the different diffraction orders obtained back from the diffraction grating which are then brought back together and interfered. Typically, fairly large numbers of optical components are required and the several components must be accurately spaced and aligned in order for the instruments to perform in accordance with their respective designs.

In many high-tech industries products are manufactured and/or operated under "clean room" conditions. For example, the progress made in miniaturizing mechanical systems, or in obtaining ever increasing densities in integrated circuits, has been due in part to the quality of such "clean rooms". On the other hand, clean room requirements are costly to implement, can complicate manufacturing procedures, and can increase the cost of test equipment and components which might be needed in the clean room. It is desirable to have a method and apparatus which permits controlling the movement of components within a closed space from a point outside of the closed space.

Among the several objects of the present invention may be noted the provision of apparatus for detecting relative displacement which employs a minimum of components; the provision of such a system in which tolerance of spacing and alignment of system components is relatively great; the provision of such apparatus which is easily manufactured; the provision of such apparatus in which sensing components can be implemented using integrated circuit techniques; the provision of such apparatus which can provide measurement with high accuracy; and the provision of such apparatus which is highly reliable and which is of relatively simple and inexpensive construction. Other objects and features are in part apparent and in part pointed out hereinafter.

SUMMARY OF THE INVENTION

The apparatus of the present invention utilizes a grating which, for a preselected wavelength, diffracts light primarily into the positive and negative first orders. The grating is relatively movable with respect to a source providing monochromatic light of the selected wavelength and which illuminates a region of the grating having a width W along the length of the grating. A poly-phase periodic detector is spaced close to the grating so that each detector phase or element responds principally to interference between the positive and negative first orders diffracted from the grating without intermediate reflection or magnification.

An important feature of the present invention is that there are no diffraction-altering components downstream of the grating. This permits the present invention to be used in many widely varying designs using the same simple parts.

A preferred embodiment of the present invention utilizes a wave front correction structure upstream of the grating to pre-condition the light from the light source, so that the characteristics of the natural interference produced downstream of the grating can be tailored to accommodate predetermined detector characteristics, or to compensate for a wide range of grating characteristics.

In accordance with one aspect of the present invention the optical techniques of the present invention are used to optically lock to a detector which is located outside of a closed space to a component located within the closed space, where the component is capable of being moved by a motor or actuator located within such space. A servo loop is formed among the internal component, the external detector, and the component actuator, so that the internal component is controlled to follow in lock step the movement of the external detector. Thereafter, by precisely controlling the position of the external detector by an external precision positioner, the position of the component within the closed space can be precisely controlled.

In accordance with the present invention, a diffraction grating fragment is positioned on the internal component. A window is provided in the enclosure which defines the closed space so that the diffraction grating fragment is "visible" to an externally positioned interference fringe detector over the range of movement of the component. The movement of the component is controlled so that a selected output is maintained out of the externally positioned interference fringe detector.

In turn, the position of the interference fringe detector is controlled by a precision positioner, which employs an optical encoder or a laser interferometer and which has an axis of movement which is co-axial or parallel with the axis of movement of the internal component.

The characteristics of the diffraction grating fragment are selected so that interference fringes are produced by the fragment when it is illuminated by light of a wavelength λ at points external to the enclosure, so that the interference fringe detector can be positioned external to the enclosure to detect the produced interference fringes. A particular point in the interference fringes is selected as a "home position" and the internal component is then controlled as a function of the output of the interference fringe detector for that home position so as to keep the interference fringe detector output the same, i.e. locked to that home position, even while the position of the interference fringe detector is changed by movement of the precision positioner. A differential position feature of the present invention permits the internal component to be optically locked to the interference fringe detector so that the internal component is differentially offset by a designatable amount from the home position.

In this manner, the internal component is optically locked to the interference fringe detector so that the internal component has the same position as, or a position which is offset by a designatable amount from, the position of the interference fringe detector. In turn, by using a precision positioner, to precisely control the position of the interference fringe detector, the internal component can be precisely moved across within the closed space. Contamination is thereby reduced, and clean room requirements are lessened. Furthermore, the grating fragment need not be of high precision, and therefore can be of low cost, since it is used only to assist in locking the internal component to the interference fringe detector. A calibration step prior to moving the internal component may be used to reduce the impact of manufacturing variations in the grating fragment.

From another point of view, two servo-loops are employed in accordance with this embodiment of the present invention. An internal servo-loop optically locks internal component to a detector positioned externally to the closed space. The detector detects interference fringes generated externally of the closed space by an interference generating structure positioned on the internal component within the closed space. The position of the detector is precisely controlled by an external servo loop, therefore, because the internal component is optically locked to the detector, the position of the internal component is precisely controlled. All of this is possible without having to physically enter the closed space, or to have a position detector within the closed space.

It is therefore another objective of the present invention to provide a method and apparatus for controlling the movement of a component located inside a closed space from a location outside of the closed space.

It is a further object of the present invention to provide a component position control method and apparatus which reduces clean room space requirements during device manufacture or operation.

A still further object of the present invention is to provide a method and apparatus in which component in a closed space is optically locked to an externally located, precisely positionable, optical detector.

Another object of the present invention is to provide method and apparatus in which a diffraction grating segment, positioned on a component within a closed space generates interference fringes outside of the closed space, and in which the generated interference fringes are detected by an external interference fringe detector and employed to optically lock the component in the closed space to the interference fringe detector so that the component moves in lock-step with the interference fringe detector.

BRIEF DESCRIPTION OF THE DRAWINGS

FIG. 7 is a diagram illustrating natural interference between different diffraction orders in regions close-in to a diffraction grating employed in a working prototype embodiment of the apparatus of FIG. 1.

FIG. 8A is a plan view of a head which houses the laser diode, collimating lens, mirror, detector and processing electronics of a working prototype of the present invention which employs a reflective grating, with the view taken from the side of the head which faces the grating.

FIG. 8B is a cross-section view of the working prototype head of FIG. 8A, taken along lines 8B–8B, and also illustrating the orientation of the grating with respect to the head.

FIG. 8C is an end-on view of the working prototype head of FIG. 8A.

FIG. 8D is a plan view of the side of the working prototype head of FIG. 8A which is opposite the grating.

FIG. 8E is a cross-sectional view of the working prototype head of FIG. 8D, taken along lines 8E—8E.

FIGS. 11A, 11B, 11C and 11D illustrate the poly-phase detector and masking employed in a working prototype of the FIGS. 11A, 11B, 11C and 11D illustrate the poly-phase present invention.

FIGS. 19A, 19B, and 19C, and FIGS. 20A, and 20B illustrate examples of wave front correction layouts using diffractive and refractive structures with FIGS. 20A and 20B providing examples of geometries and grating spatial frequencies that can be obtained once wave front compensation is added.

FIG. 21 depicts one side of an input beam passing through a refractive optic for pre-correcting for "twist" due to a radial grating.

FIG. 22 illustrates variations in the shape of the faces of the refractive optic to compensate for the other effects of radial gratings.

FIG. 23 shows an optical element that can be used upstream of the grating 13A to pre-correction for radial grating effects due to variations in grating period transverse to the grating pattern.

FIG. 24 illustrates a reflective wave front correction structure for use with a linear detector.

FIG. 25 illustrates how the angling of the faces of the refractive optic, and the distance which separates the refractive optic from grating 13A, influences the separation and angles at which the beams strike grating 13A.

Corresponding reference characters indicate corresponding parts throughout the several views of the drawings.

DESCRIPTION OF THE PREFERRED EMBODIMENT

Figure 1:
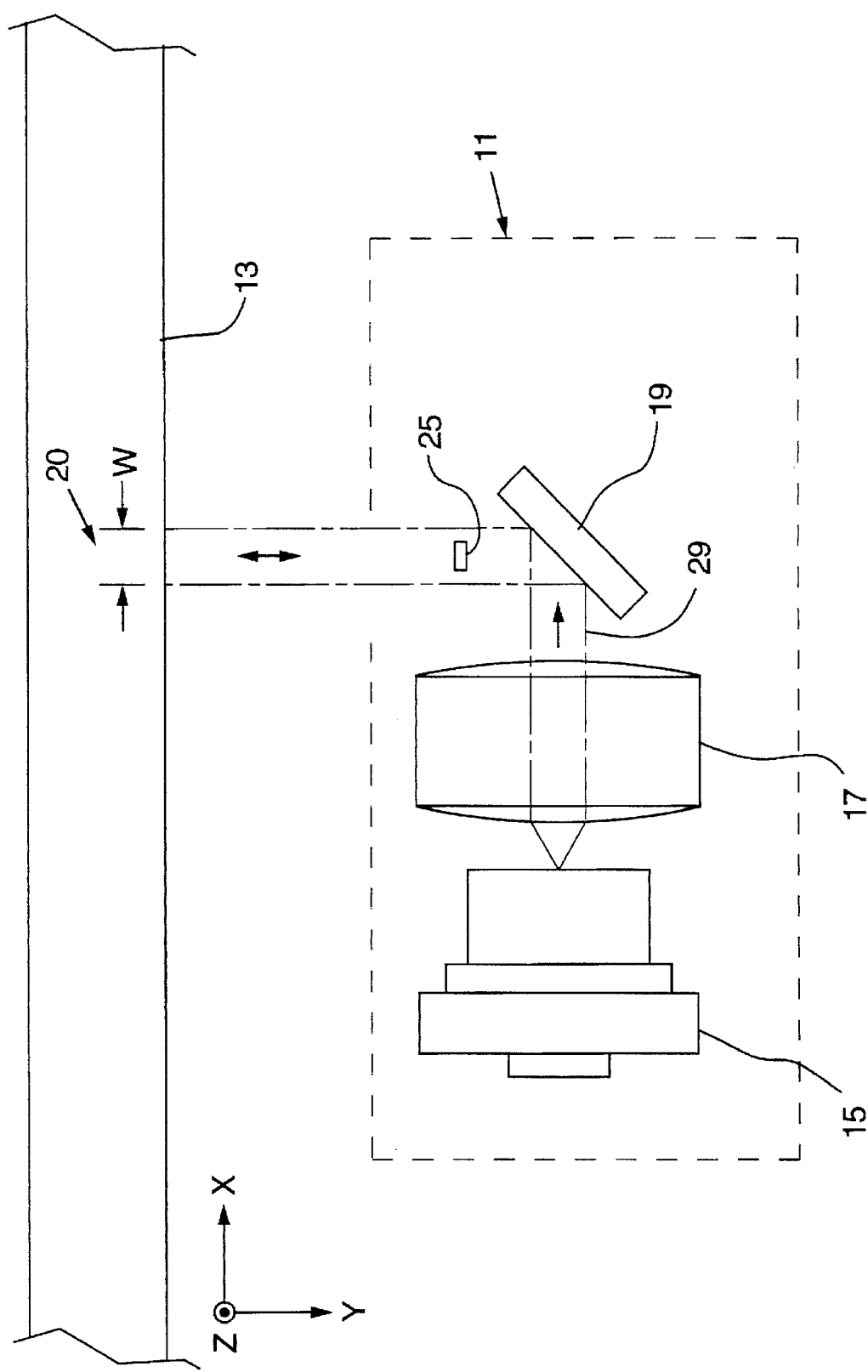
FIG. 1 is a top diagrammatic view of displacement sensing apparatus in accordance with the present invention.

For convenience in description, FIG. 1 is described as being a top view although, as will be apparent to those skilled in the art, the apparatus can be operated in any orientation. As indicated previously, the apparatus of the present invention operates to detect or sense relative movement or displacement between a sensing head, designated generally by reference character 11, and a grating 13. The sensing head 11 incorporates a monochromatic light source, preferably a semiconductor laser as indicated by reference character 15. Semiconductor laser 15 provides essentially monochromatic coherent light having a wavelength designated $\lambda$. Again, for convenience in description only, the direction of relative movement is designated the X-axis, this being along the length of the grating, while distance from the face of the grating is considered to be measured along the Y-axis. Correspondingly, the Z-axis is considered to be vertical or orthogonal to the plane of the drawing. The grating 13 is ruled parallel to the Z-axis.

Figure 3:
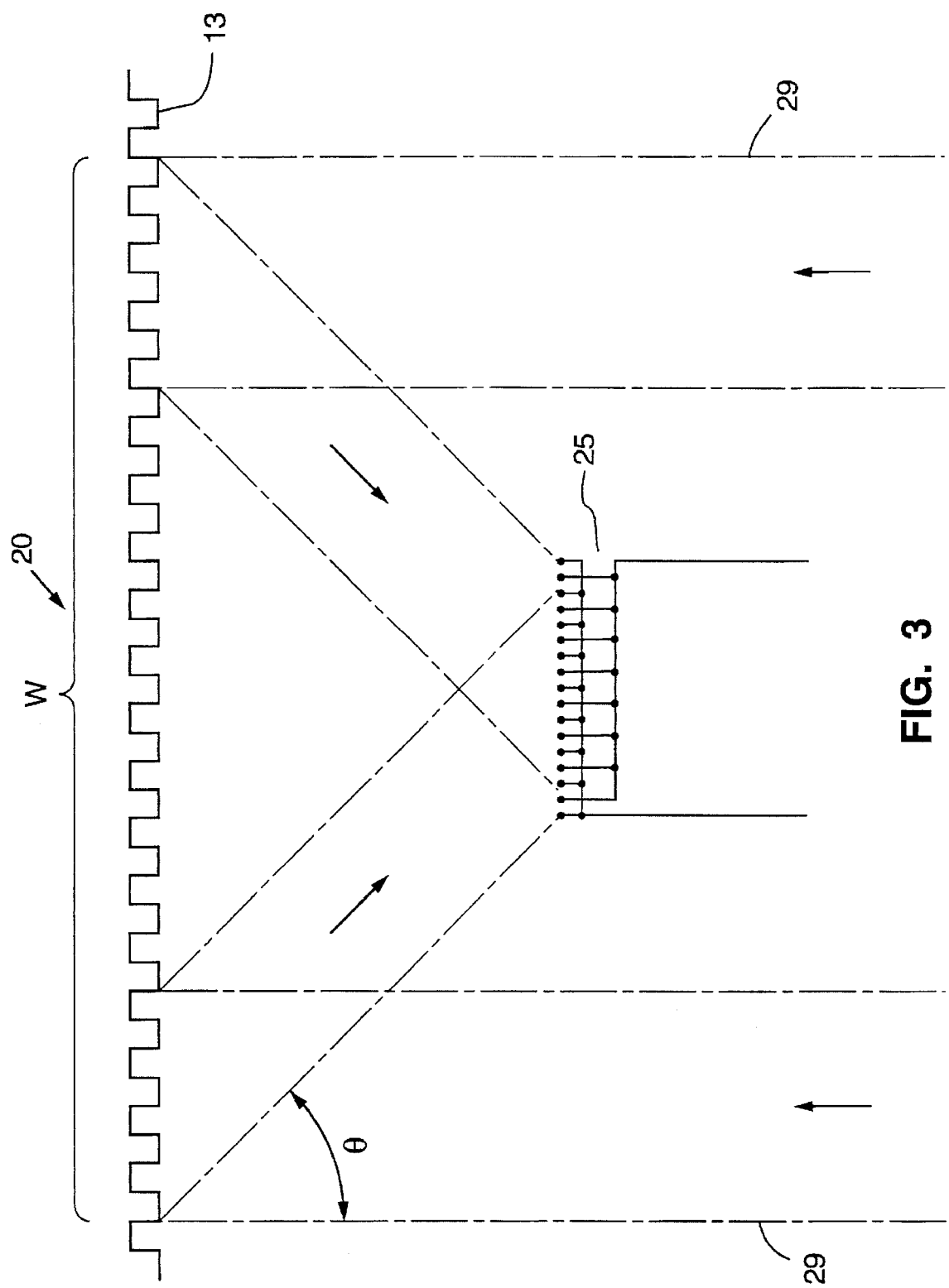
FIG. 3 is a diagrammatic illustration, with exaggerated grating spacing and diffraction angles, illustrating the operation of a periodic multi-phase detector employed in the apparatus of FIG. 1 in relation to light diffracted from a grating.

As will be apparent from the description following, the grating 13 employed in the embodiment illustrated operates in reflection and is tailored to diffract light at a selected wavelength primarily into the positive and negative first orders and to minimize the zeroth order. As is understood by those skilled in the art, such a characteristic is obtained principally by employing a depth which is $\lambda/4$, i.e. a quarter wavelength, as well as by shaping the surface as is shown in FIG. 3 to have a step profile. It should be understood that an essentially equivalent grating can be designed to operate in transmission with a phase retardation of $\lambda/2$.

Light from the semiconductor laser 15 is essentially collimated by a lens 17 and directed by a mirror 19 approximately orthogonally toward the face of the grating 13 illuminating a region 20 having a width W along the length of the grating. Light diffracted and reflected back from the grating 13 is detected by a poly-phase periodic detector 25. The period of the detector along the X-axis corresponds to the period of the interference pattern generated by interference of the positive and negative first orders diffracted from the grating 13 and is thus equal to P/2. The width of the active area of the detector 25 is preferably substantially smaller than the width of the illuminated region on the grating 13, for example small enough to allow for installation tolerances of approximately ±½° The ideal point occurs where the third order diffraction has diverged away from the plus and minus first order diffraction, and the plus and minus first order diffraction beams are as overlapped as possible. For the example, this occurs at the 50% overlap point of the plus and minus first orders. Thus, for a detector having approximately a 400 μm width, an overlap area of approximately 600 μm would be appropriate. This leads to a spot size of approximately 1.2 mm. While the detector 25 is shown as though being in the path of the light beam proceeding from the mirror 15 to the grating 13, it can in fact be located above or below the beam since exact orthogonality of the beam to the grating surface in the Z direction is not required.

Figure 2:
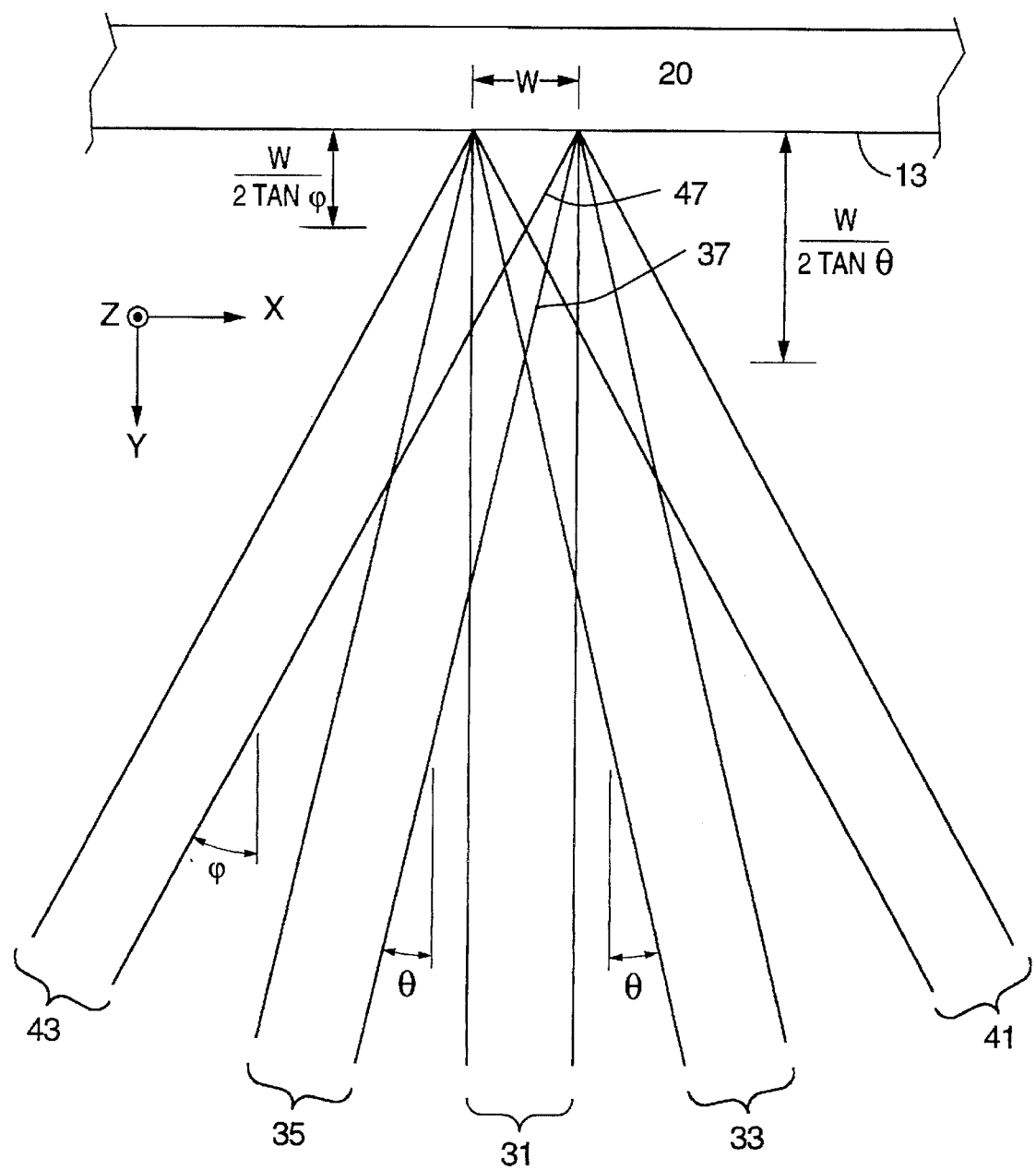
FIG. 2 is a diagram illustrating where different orders interfere in regions close to a diffraction grating employed in the apparatus of FIG. 1.

Referring now to FIG. 2, a region of width W along the length of the grating 13 is illuminated by the collimated beam 29 from the laser light source. The zeroth order is reflected essentially directly back, this beam being indicated by reference character 31. The positive first order is illustrated as being diffracted at an angle θ to the right, this beam being indicated by reference character 33 while the negative first order, designated by reference character 35, is diffracted to the left by the same angle. As is understood by those skilled in the art, the angle 8 is defined as $$\theta = \sin^{-1}(\lambda/P) \qquad (1)$$

where P is the period of the grating along the X-axis.

As can be seen in FIG. 2, there exists a triangular region, designated by reference character 37, where the positive and negative first orders will interfere directly without any intermediate reflection or magnification. This region extends to a distance from the grating equal to $$W/(2 \tan \theta) \qquad (2)$$

and may be considered a region of near field interference. To avoid confusion with the term "near field interference" in the Fresnel interference sense, the region of interference utilized in the present invention is more accurately described as a natural interference, i.e. interference before the plus and minus orders diverge. In this region, the plus and minus orders interfere directly. In accordance with the present invention, the detector 25 is located within this region 37.

While the grating characteristics can be tailored to substantially eliminate the zeroth and even orders of diffraction from the grating 13, some appreciable energy will typically remain in the odd orders. With reference to FIG. 2, the positive and negative third order beams are designated by reference characters 41 and 43, respectively. As is understood by those skilled in the art, the angle from normal at which each of these beams depart is $\phi$ where $$\phi = \arcsin(3\lambda/P) \quad (3)$$

There correspondingly exists a triangular region of natural interference of the positive and negative third orders, this region being designated by reference character 47. This region extends from the grating for a distance of $$\frac{W}{2\tan\phi} \quad (4)$$

Figure 34:
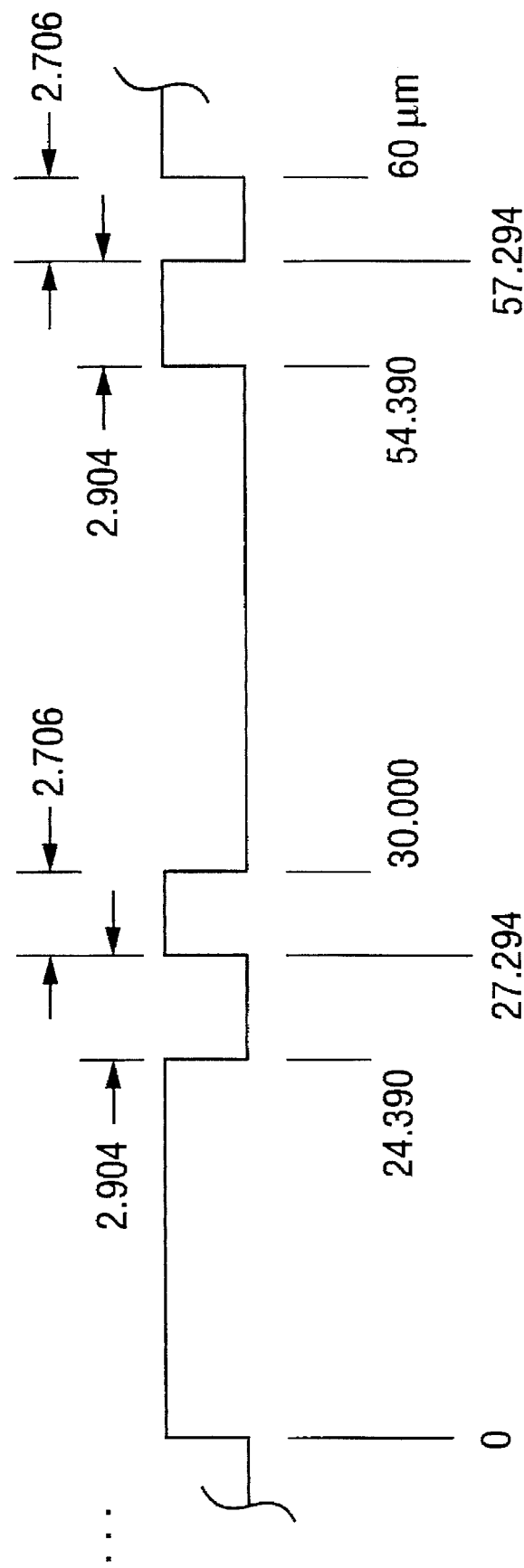
FIG. 34 is an example of a higher order suppressing diffractive grating design.

Preferably, the detector 25 is located further from the grating than the region of natural interference between the positive and negative third orders so that the signals obtained correspond most closely with the sine wave characteristic of the pure first order interference pattern. Preferably, the detector 25 is located just outside of the apex of the region 47 so as to allow maximum detector width. As will be apparent, the whole active area of the detector should be within the region of the desired interference. Higher orders of diffraction can be suppressed through the use of more complex grating patterns, which in turn permits the detector to be moved closer to the grating 13 up to the point where the first unsuppressed orders have diverged outside the natural interference of the plus and minus first orders. FIG. 34 illustrates the cross section of a higher-order suppressing grating which is capable of suppressing all higher orders through the 7th. A grating of this design is presently best suited for coarser gratings since the step widths are limited by the state of the lithographic art. Furthermore, since divergence angles tend to be "flatter" with coarser gratings, the use of a higher-order suppressing design in such coarse gratings will allow significant improvement in grating location.

The region where there is only interference between the plus and minus diffraction orders is an optimal location for the detector 25. If the detector 25, or portions of it, are positioned outside of this optimal region, there will be contributions from higher orders which degrade the signal provided by detector 25. This degradation is gradual, and not a failure of function. As the spot size, W, grows larger, the optimal region for the detector 25 moves away from the grating 13. Such a relationship between the optimal location of the detector and the size of the illumination of the grating 13 provides a significant design freedom in devices built in accordance with the present invention, because the detector 25 can be placed at different locations away from the grating 13 to satisfy different design requirements merely by changing the size of the spot, W, illuminating the grating 13.

More particularly, a significant advantage of the present invention over traditional geometric position encoder designs is that the natural interference between the positive/negative orders is orthogonal to the grating 13 and the detector can be placed anywhere within this natural interference and still accurately measure displacement. The natural interference fringes are everywhere sinusoidal. In contrast, traditional geometric encoders depend on precise depth control, since the signal profile changes with depth variation thereby making accurate interpolation very difficult to achieve.

As indicated previously, the width of the active area of the detector 25 is smaller than the width of the illuminated region on the grating. Thus, as illustrated in FIG. 3, positive first order diffraction from a region on the left hand side of the region 20 can meet and interfere with negative first order diffracted light from a zone on the right hand side of the region 20 and the meeting light components can interfere at the sensing plane of the detector 25.

As indicated, the dimensions and angles are exaggerated in FIGS. 2 and 3 for the purpose of explanation. Dimensions and angles for a practical design may, for example, be as follows. The light source is a semiconductor laser providing light at a wavelength of 780 nanometers. The grating 13 is ruled at 424 lines per inch (16.64 lines per millimeter) so that the period P is 60 microns. Accordingly, the angle of first order diffraction $\theta$ is 0.74°, and the angle of third order diffraction $\phi$ is 2.2°. Assuming that the width of the illuminated region is 1.0 millimeter, the natural first order region of interference extends 38.5 millimeters from the grating while the natural third order region of interference extends 12.8 millimeters from the grating.

In the embodiment of the present invention where grating 13 is a higher-order suppressing grating such as in FIG. 34, the useable region of natural interference between the plus and minus first orders begins significantly closer to the grating. More specifically, the location of the 9th order interference would represent the inner limit. Equation (3) yields an angle of 6.72°. In turn, equation (4) indicates that such 9th order interference will extend outwards to a distance of only 4.25 millimeters. Note that without the higher-order suppressing grating the minimum distance is 12.8 millimeters, as defined by the location of the 3rd order interference.

Figure 4:
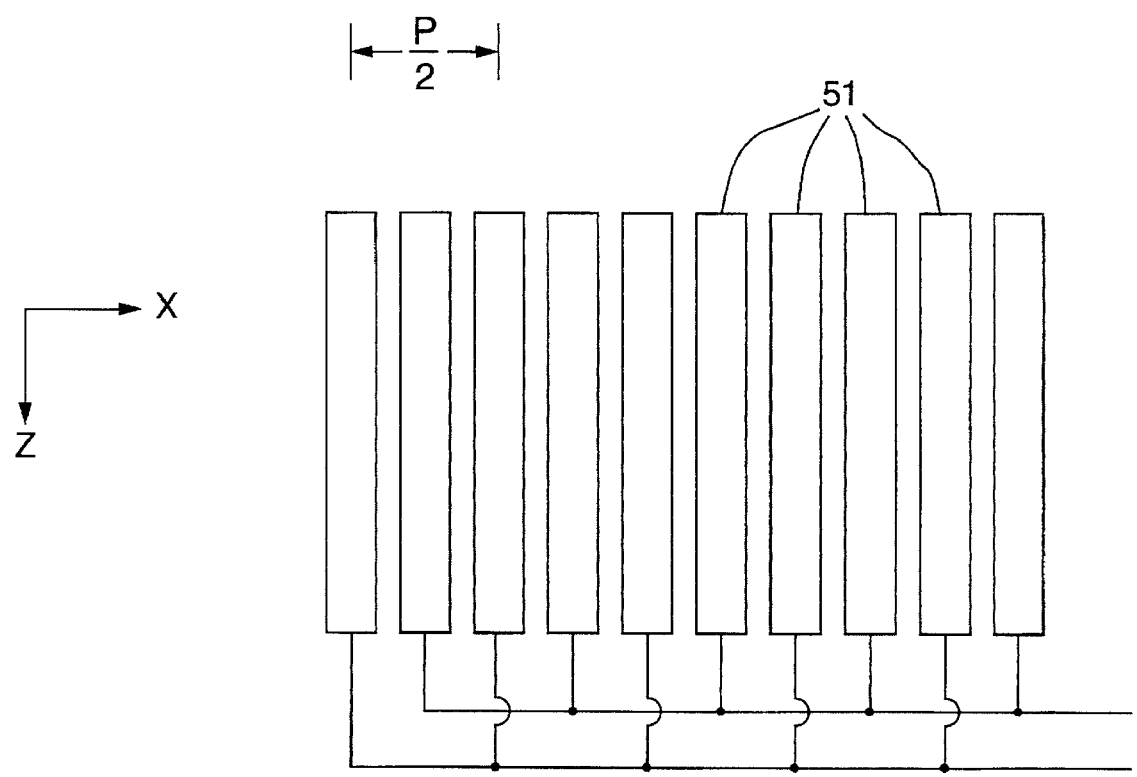
FIG. 4 is a diagram of the face of the detector of FIG. 3.

As is understood by those skilled in the art, the pattern of light intensity produced by interference of the positive and negative first order diffraction components will have a periodicity which is twice that of the grating itself. The detector 25 is constructed to have a matching periodicity, i.e. P/2, so that the contributions from the several elements in each phase of the detector combine additively. Preferably, the detector 25 is constructed as an integrated circuit comprising an array of narrow elongate photodiodes. Such an array of photodiodes is illustrated in FIG. 4. The individual photodiodes are indicated by reference character 51. As indicated previously, the array should be poly-phased. For example, two arrays providing quadrature signals could define the relative displacement. Interleaving of the arrays has an important benefit of averaging spatial variations in the intensity of the light incident upon the arrays. An arrangement simpler to fabricate can be implemented by offsetting the two phases in the Z-axis direction so as to simplify the interconnection of the various photodetector elements. Another alternative is to employ relatively large area photodetectors, each of which is provided with a respective mask for admitting light of the appropriate phase. Again, while this construction is simpler to implement, it is less efficient in the utilization of the available light energy.

A still further alternative is to provide a lenticular screen at the sensing plane which disperses the different phases at different angles after interference at the sensing plane so that spaced apart detectors can be utilized. The lenticular screen will thus have a periodicity of P/2 along the X-axis. In this case, the photo-electric detectors themselves need not be placed within the so-called region of natural interference 37 but, rather, the sensing plane and the point of interference is at the lenticular screen which is within the region.

Similarly, while it is preferable that pure first order interference be achieved so as to provide the purest possible sinewave out of each of the detector phases, some interference by other orders will not be overly objectionable in some applications and, by use of matching pattern tables, sufficiently accurate interpolations may be provided.

While the embodiment disclosed by way of example provides for sensing along a single axis, it should be understood that the technique of the present invention can be applied to a combined two-axis sensing device by utilizing a grating ruled in orthogonal directions, together with a respective detector for each direction. A single light source can serve both axes. Due to the orthogonality, there will be minimal interaction between movement along one axis with the sensing signals generated by movement along the other axis.

If the detectors and gratings are properly shaped to provide matching curvatures for the diffracted signal, or sufficiently narrow gratings were used, this invention can be effectively applied to a rotary encoder.

In accordance with a further aspect of the present invention, a wave front correction structure can be placed upstream of the grating 13 to pre-condition the light striking the grating 13. As will be described in greater detail in a following section, such pre-conditioning can be tailored to alter the characteristics of the interference produced by grating 13. For example, wave front correction structures will be described which permit linear detector arrays to be used with rotary encoder type gratings (radial gratings); or which permit detectors of coarse periodicity to be used with gratings of relatively high resolution.

Dual Beam Embodiment

Figure 5:
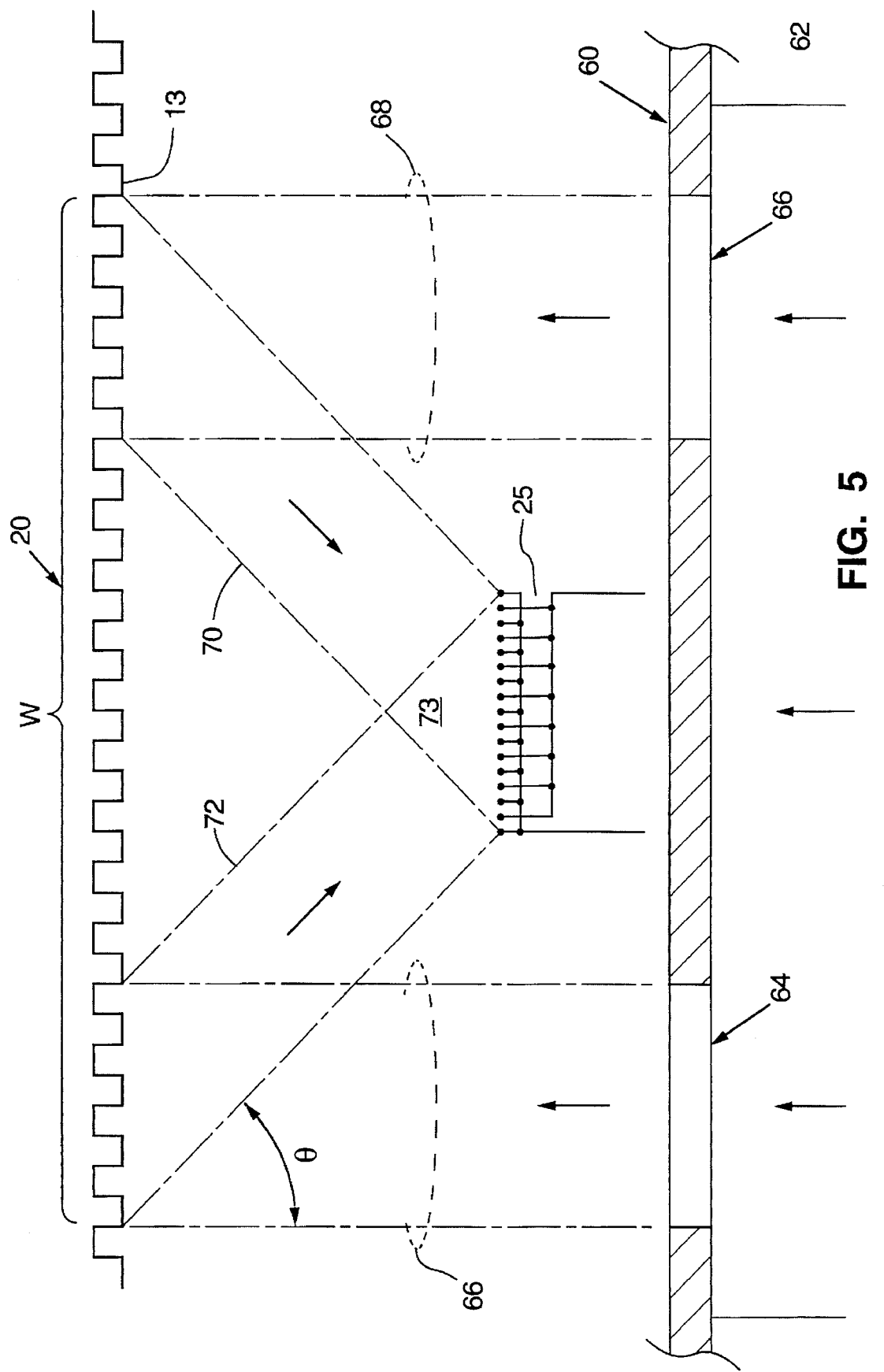
FIG. 5 is a diagrammatic illustration, with exaggerated grating spacing and diffraction angles, of a dual beam version of the present invention.

Referring now to FIG. 5 a dual-beam embodiment of the present invention will now be described. While a two-array detector 25 is shown in FIG. 5, it is to be understood that other detector configurations, such as those described hereinafter, are equally suitable for use in the dual-beam embodiment.

An aperture structure 60 is shown positioned between the incident beam 62 and grating 13. The aperture structure 60 has two separate apertures 64 and 66 which split the incident beam 62 into two separate and distinct beams 66 and 68, with the distance between beams 66 and 68 being slightly greater than the width of detector 25. With such a configuration there will be no zeroth order incident on detector 25.

Preferably, the apertures are apodized. That is, the edges of the aperture are modified to provide a gradual, as opposed to abrupt, transitions between opaque and transparent, in order to reduce unwanted interference between edge-produced diffraction and the desireable ± first diffractive orders.

As can be seen from FIG. 5, the negative first order 70 from beam 68 and the positive first order 72 from beam 66 interfere in natural region 73. When detector 25 is placed within this natural region 73, relative movement between the grating 13 and detector 25 can be measured.

An advantage of the dual-beam embodiment is that it provides total suppression of the zeroth order. The dual-beam embodiment is an alternative to the use of a phase-grating to suppress the zeroth order, and can be used in conjunction with such a phase-grating to ensure the full suppression of the zeroth order.

One of the disadvantages of the dual-beam approach is that, in effect, a wider beam is used. Since the split beams are separated by the width of the detector, they will typically result in first order beams which are spaced farther apart than in the single beam approach. This means that the region of natural interference between the first order beams will be spaced at a greater distance from the grating than in the single beam case. In turn, the size of the apparatus will be larger. Of course, a grating with a smaller period could be used to increase the diffraction angles, and thereby cause the natural interference region in occur closer to the grating. In such case, the resolution of the detector would need to be increased commensurately.

Dual Beams Using Binary Collimating Lens

A binary collimating lens 74 can be used in place of aperture structure 60 to split up the beam. A binary collimating lens is an attractive alternative because nearly all of the incident light can be utilized. In contrast, with an aperture, only the light passing through the aperture is used, with the remainder being wasted. Binary collimating lenses can be designed which provide in a single optical element, a collimation intensity profile, smoothing, apodizing, and wave front compensation.

Figure 6:
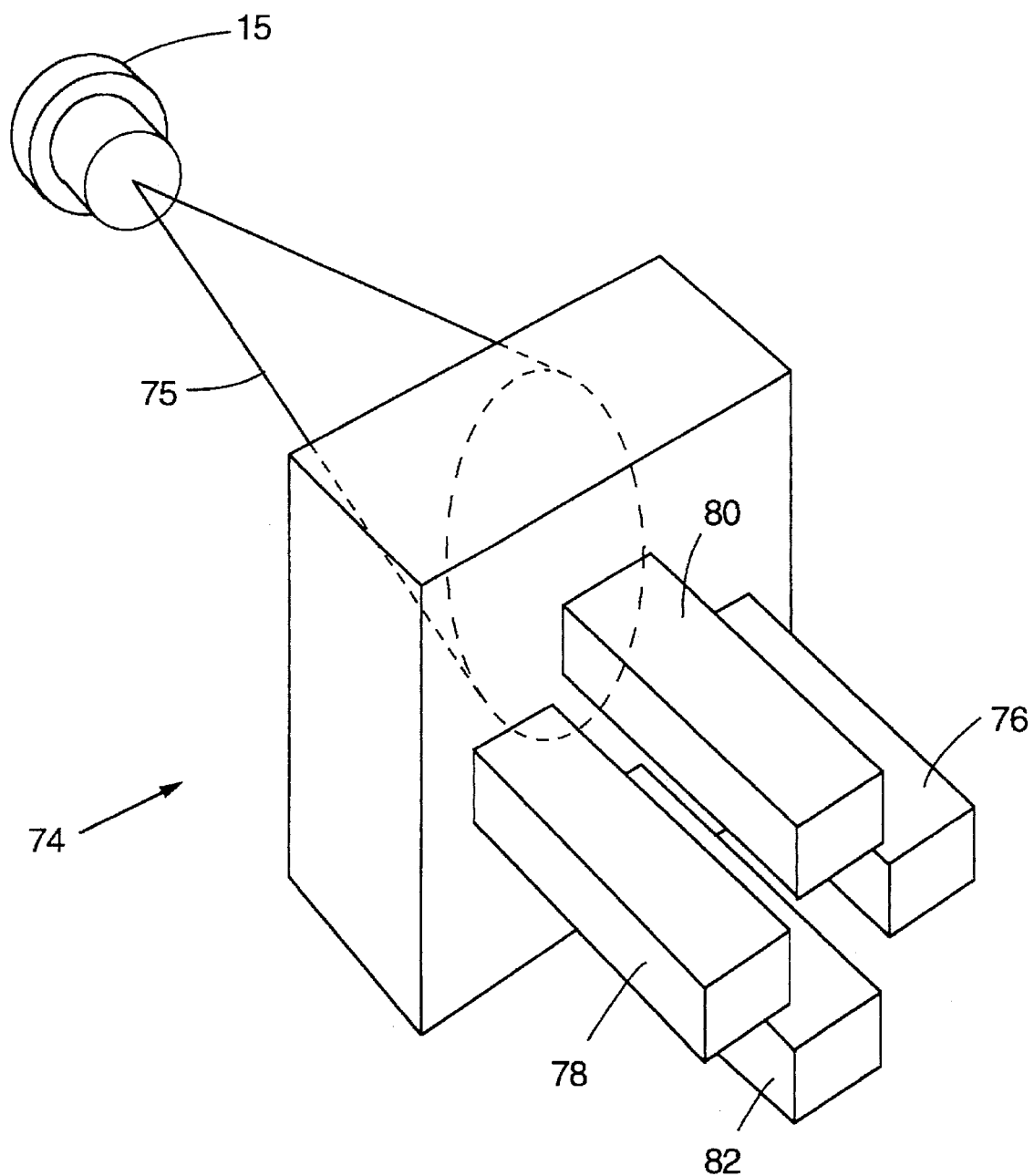
FIG. 6 illustrates a binary collimating lens which can be used in the dual-beam embodiment of the present invention as illustrated in FIG. 5.

Referring now to FIG. 6 a binary collimating lens is illustrated. Binary collimating lens 74 is a diffractive optical element which provides beam shaping and collimation of the output from a laser source such as semiconductor laser 15. FIG. 6 is a perspective view of binary collimating lens 74 which provides four separate beams: beams 76 and 78 as the measurement beams to be incident upon the grating 13, and beams 80 and 82 for use in indexing.

Working Prototype—Reflective Embodiment (w/o WFC)

Turning now to FIGS. 7 through 13, a description will be provided of a working prototype of one embodiment of the present invention which does not employ wave front correction. Wave front correction embodiments of the present invention will be discussed in detail in later section of this specification.

FIG. 7 illustrates pertinent parameters for the grating, diffraction angles, and natural interference region for this prototype. As in FIG. 2, the zeroth order is indicated by reference numeral 31, the positive and negative first orders by reference numerals 33 and 35, and the positive and negative third orders by reference numerals 41 and 43. The cross hatched region 90 depicts the portion of the region of natural interference between the positive and negative first orders 33 and 35 which is free of third order interference.

As indicated in FIG. 7, the operating wavelength $\lambda$ is 785 nm, with the period, P, of the grating 13, selected to be 20 μm. This results in a first order diffraction angle, $\theta$, of 2.25°, and a second order diffraction angle, $\psi$, of 6.76°. The spot width 20 is selected to be 1.5 mm.

As a result, region 90 extends from a point 6.33 mm from grating 13 up to a point 19.09 mm from grating 13. That is, the natural, first order interference ends at a point 19.09 mm from the grating, and the natural third order interference ends at a point 6.33 mm from the grating. The optimum detector position in the working prototype was determined to be 10.58 mm from the grating.

Grating 13

Also to be noted from FIG. 7 is that the grating is reflective, and is positioned on the far side of the supporting structure 14. This latter feature serves to protect the grating from damage by head 92, and also reduces the overall physical dimensions of the prototype by including the supporting substrate 14 within the optical path of the various beams. Typically supporting structure 14 is formed of glass.

Reflective grating 13 has a period of 20 μm, and step depth of $\lambda/4$, or 0.196 μm. In practice, grating 13 can be a grating which is ion milled, or stamped by pressing a grating master into a ductile material, or replicated by casting, or by using a precision thickness of photoresist. In another embodiment of the present invention, a low cost alternative is to replicate the grating through a process offered by American Bank Note Holographics of Elmsford, N.Y.

Precision photoresist coatings can also be used to form diffraction gratings which are suitable for use in connection with the present invention. For example, to form a grating such as that illustrated in FIG. 7, photoresist is first precision coated onto the backside of substrate 14 to a depth equal to the desired step depth, e.g. 0.356 µm. Substrate 14 can be a glass material. The photoresist is then contact printed with a mask which provides the desired grating pattern. The photoresist is then processed to remove the unexposed areas, leaving a photoresist pattern with the desired step depth.

A 0.356 µm step depth is preferably selected to provide zeroth order suppression. The photoresist being used has an index of refraction of 1.64, therefore the wavelength in the medium is reduced to 0.467 µm. Because $\lambda/4$ for that wavelength is too thin to be practically applied to glass, the same suppression of the zeroth order can be achieved by making the depth $3\lambda/4$ or 0.356 µm.

Thereafter, the photoresist is encapsulated. For a reflective grating, the encapsulation is preferably aluminum. For transmissive gratings the encapsulation is preferably an anti-reflective layer of magnesium flouride, e.g. having a thickness of $\lambda/4$. Preferably, the encapsulation is performed at a temperature no greater than the hard-bake temperature of the photoresist to avoid degradation of the photoresist grating.

A further encapsulation may be provided by a second plate which forms a sandwich with the substrate 14, with the photoresist in the middle. The sandwich is hermetically sealed around the edges.

It is to be understood that either positive or negative photoresists can be used within the spirit of the invention. Dashed line 16 represents the interface between substrate 14 and grating 13 for gratings which are replicated by casting. It is to be noted that the thickness of such a grating 13 is indicated to be between 10 and 20 µm to allow for the waviness of the substrate 14. The interface is a fully wetted surface, and the index of refraction of the substrate and the grating are almost equal. Gratings 13 formed by precision photoresist or ion milling will not have such an interface 16.

Head 92

Referring now to FIGS. 8A, 8B, 8C, 8D and 8E, a non-WFC, reflective working prototype embodiment will now be described in greater detail. A head 92 supports laser diode 15, collimating lens 17, mirror 19, and detector 25, and processing electronics 106.

As was the case in FIG. 1, the collimated light beam 29 from laser diode 15 travels initially in a direction parallel to the grating 13. Mirror 19 is used to bend collimated beam 29 so that it strikes grating 13 at the proper angle, preferably at a right angle to grating 13 in the X-Y plane indicated in FIG. 8B. FIG. 8B shows mirror 19 to be angled relative to the Y-axis at about 45°, so that the incoming collimated beam 29 strikes grating 13 at approximately 90° with respect to the X-axis.

Upon leaving mirror 19, collimated beam 29 passes through a window 94 which is supported by head 92. The collimated beam 29 then travels through substrate 14 to the far face 96 where the grating pattern 13 is located.

In the working prototype embodiment, a step grating is used, with the depth of the step being set at $\lambda/4$ to suppress the zeroth order in reflection. The positive and negative first orders are thus reflected back toward mirror 19 for routing to detector 25.

As can be seen from FIG. 8B, mirror 19 is shown angled slightly, approximately 5°, relative to the X-axis. This permits the natural interference, and hence detector 25, to be positioned at a point outside the path of the collimated beam 29. This can be seen more clearly in FIG. 8C where aperture 98 is shown spaced a short distance below detector 25. Aperture 98 shapes the collimated beam 29 as it emerges from collimating lens 17 on its way to mirror 19.

The angling of mirror 19 and the path 100 of the natural interference can be seen more clearly in FIG. 8E. The path of incident collimated beam 29 and the path 100 of natural interference between mirror 19 and grating 13 both lie within the Y-Z plane where they are angled with respect to one another.

Unlike FIG. 1, the detector 25 of the working prototype of FIGS. 8A–8E is positioned on the laser diode side of the mirror 19. However, mirror 19 merely bends the path 100 of the natural interference between the positive and negative first orders, and does not change the relative directions of travel between the positive and negative first orders 33 and 35.

As can be seen in FIGS. 8B and 8E, head 92 provides a tube-like structure 102 which supports laser diode 15 at one end, and collimating lens 17 at the opposite end. Tube-like structure 102 also supports a flex circuit 104, which in turn supports detector 25, and processing electronics 106 supplies power to laser diode 15.

Alternate Head Layout

Figure 9:
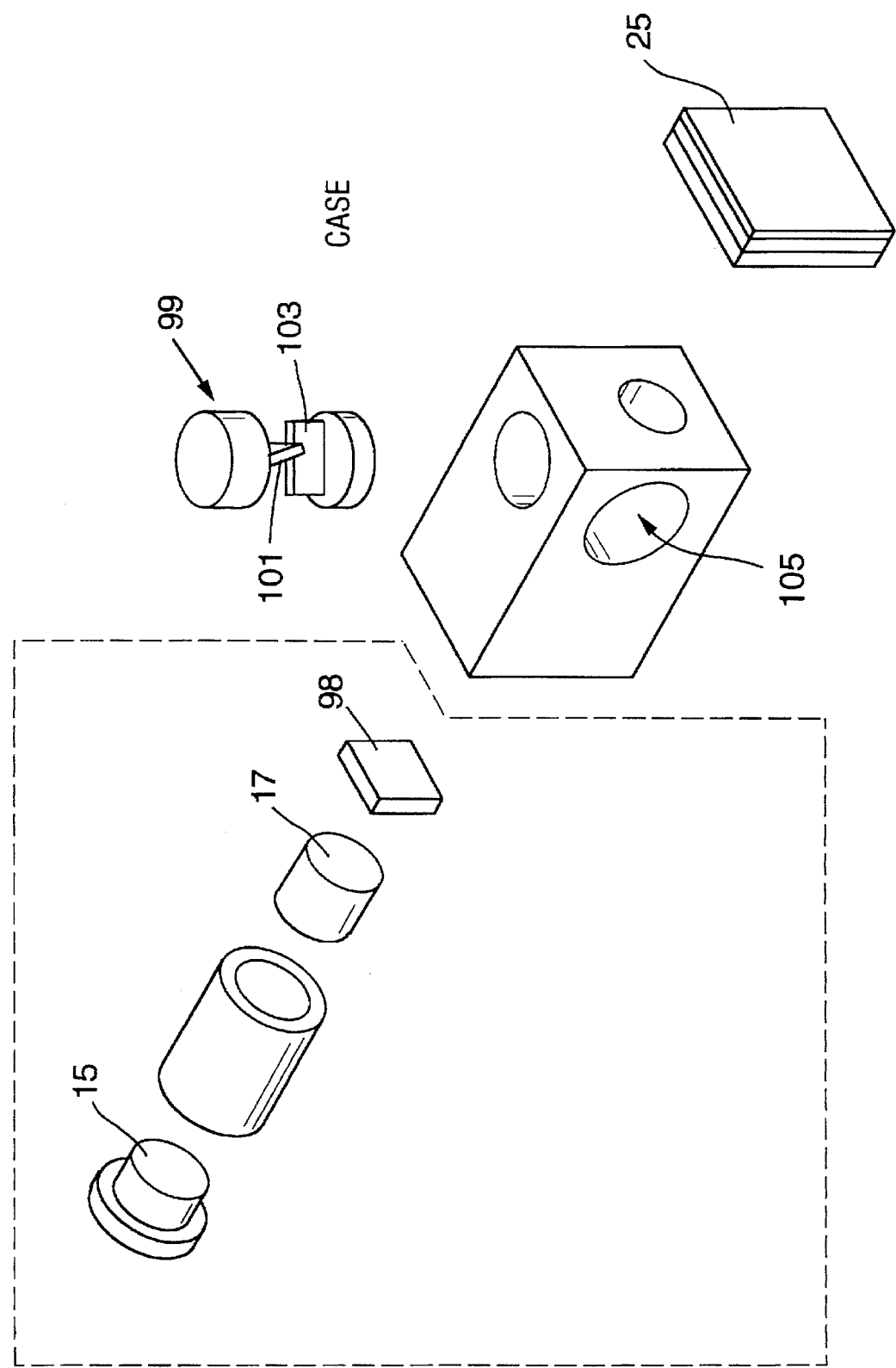
FIG. 9 illustrates an alternative layout for a reflective embodiment of the present invention.

FIG. 9 illustrates an alternative layout for a reflective embodiment of the present invention. It is to be understood that while a wave front correction (WFC) structure is not indicated in FIG. 9, such a structure could easily be added without significant impact upon the layout. In the layout of FIG. 9, mirror subassembly 99 is assembled into the case through the upwardly facing opening, and includes two mirrors, 101 and 103. Mirror 101 receives the collimated and shaped beam from aperture 98 and directs the beam through opening 105 onto the grating (not shown). The resulting diffraction beams are bent by mirror 103 so that the natural interference fringes are directed onto detector 25 via opening 107.

It is further to be understood that the embodiments of FIGS. 8A through 8E, and 9, can be converted into transmissive formby positioning the on the opposite side of grating 13, by constructing grating 13 to operate in transmission, instead of reflection.

Working Prototype—Transmissive (w/o WFC)

Figure 10:
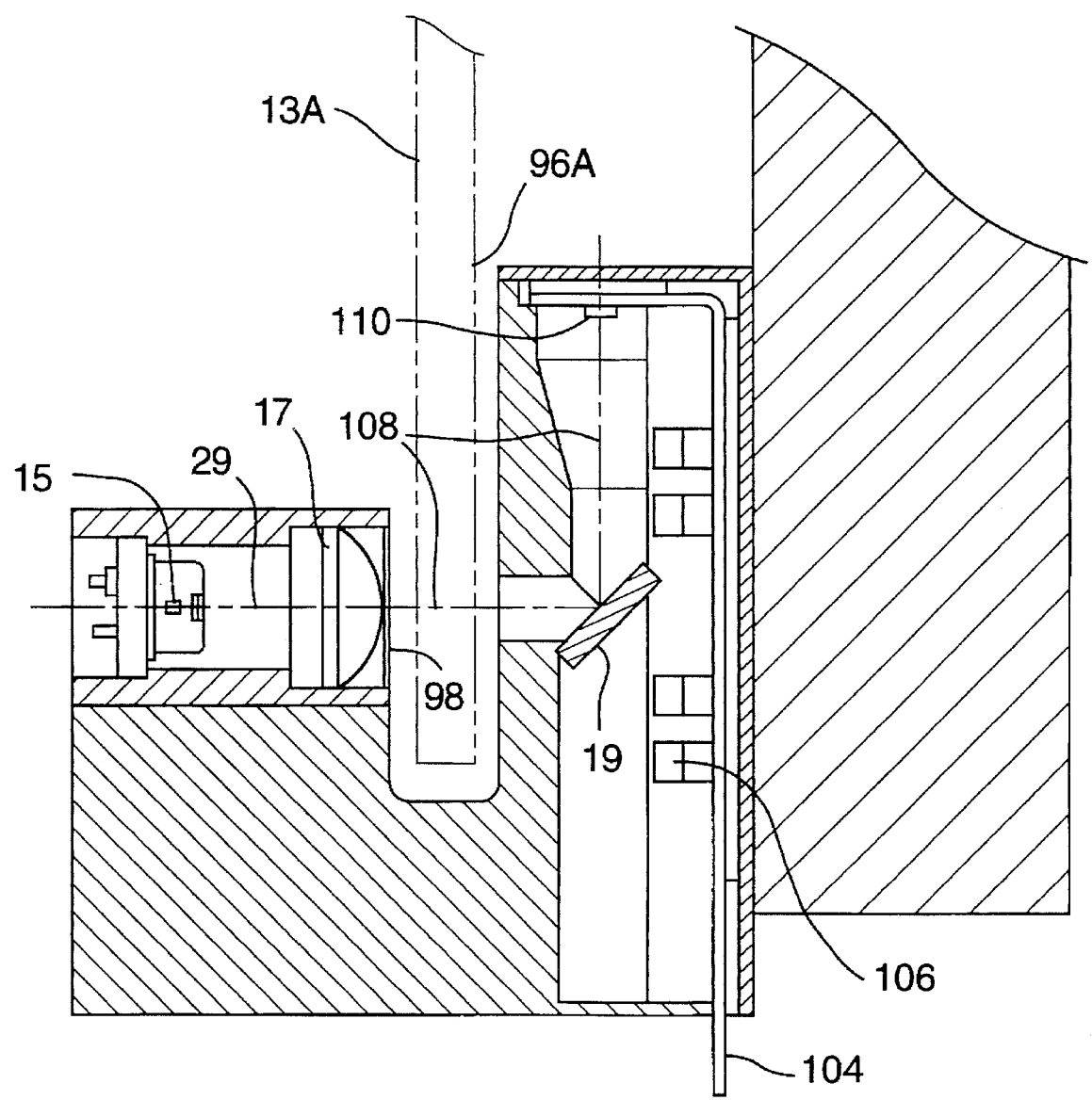
FIG. 10 is a cross-sectional view of an embodiment of the present invention which employs a transmissive grating.

Prior to describing the features of the working prototype of FIGS. 8A–8E in greater detail, a second working prototype will be described briefly with reference to FIG. 10. The working prototype of FIG. 10 is a transmissive embodiment of the present invention. Grating 13A has a step profile similar to that shown in FIG. 3, but with a depth that is selected to permit the grating 13A to operate in transmission with phase retardation of $\lambda/2$, i.e. a 0.39 µm depth for an operating wavelength of 785 nm. Thus, the light from laser diode 15 is collimated by collimating lens 17, passed through aperture 98 and then on to grating 13A. There, the grating profile generates the positive and negative first orders which interfere with one another. This natural interference is indicated by reference numeral 108 and occurs in the region between side 96A of grating 13A and detector 110.

As with the reflective embodiment of FIGS. 8A through 8E, grating 13A has its step profile positioned on side 96A, namely the side opposite the laser diode 15.

A mirror 106 is used to bend the natural interference 108 so that it has a path parallel to the axis of grating 13A. Detector 110 is positioned along this parallel path and within the region of natural interference between the positive and negative first orders.

The same flex circuit 104 as in the embodiment of FIGS. 8A–8E can be used to support detector 110 and processing electronics 106 in the transmissive version of FIG. 10. Note, however, that the portion of flex circuit 104 which supports detector 110 is folded at a 90° angle to the top surface of the rest of the flex circuit. In contrast, in FIG. 8E, the detector supporting portion is folded at a 270° angle. This dual purpose design contributes to lowering the cost of manufacturing the transmissive and reflective embodiments of the present invention.

An alternative to the flex circuit design of FIG. 10 is to package the detector and processing electronics together in hybrid form in a ceramic package. This reduces the space required for the detector and processing electronics, and well as simplifies assembly of the head.

A different reference numeral 110 is used for detector in the transmissive embodiment of FIG. 10, since this embodiment will typically be used with a rotary encoder. As such, the detector 110 may be shaped to have a curvature which matches the curvature effects which are present by virtue of the rotational characteristics of the grating 13A.

Alternatively, the same linear detector array as described earlier can be used with a rotary encoder pattern when a wave front correction structure is employed upstream of the grating 13A to compensate for the twisting imparted by the grating 13A to the produced diffraction orders. Such wave front correction structures are described in greater detail in a following section herein.

Detector Pattern

In the various working prototype embodiments of the present invention a polyphase detector is used which includes a plurality of parallel, elongated interdigitated detector segments. These segments are spaced from one another by the same amount, with each group of four consecutive segments representing a separate detector Thus, if eight segment are used, there will be two detector quadrants, the first represented by the first four segments, and the second quadrant represented by the remaining four segments.

Within a quadrant, each segment will provide a signal which has a different phase from the signal provided by the other segments within the quadrant. In the conventional use of such quadrant detectors, the physical width of the quadrant corresponds to one cycle of the signal to be detected. Therefore, the first segment in the quadrant will provide a signal which is 90° ahead of the second segment, and the second segment, in turn, will provide a signal which is 90° ahead of the third segment, and so on.

When multiple quadrants are employed, corresponding segments in each quadrant are connected together. Thus, for example, where eight quadrants are concatenated, the first segment in each of the quadrants are connected together, the second segment in each of the quadrants are connected together, and so on, to provide four summed signals: 1) a first segment summation, 2) a second segment summation, 3) a third segment summation, and 4) a fourth segment summation. Any DC offset can be eliminated by subtracting the third segment summation signal from the first segment summation signal, and subtracting the fourth segment summation signal from the second segment summation signal, thereby providing the sine, cosine signals in quadrature.

Prime X Detector Spacing

Processing lithography constraints place a practical limit on how narrow the segments of detector 25 can be made, and hence upon the smallest period which can be accommodated by a quadrant of detector segments. A methodology referred to herein as the "Prime X Methodology" permits coarse detectors to be used with relatively fine gratings. In accordance with the Prime X Methodology, the period of each detector segment (including both active and inactive portions) is selected to span 270° of the interference fringe pattern to be detected. In this manner, four consecutive detector segments will span three interference fringe periods and provide signals separated by 270°. The additional 180° of phase may be disregarded and the signals summed in precisely the same way as the previously described detector. This 180° phase shift simply means that the sine and cosine are reversed and the direction of signals from the detector will be opposite to that of a 90° phase shift detector.

When the above described Prime X methodology is used, the period of the modulation pattern can be three times that of the detector pattern. The same effect may be obtained with a 5× and 7× fringe to detector spacing, resulting in phase shifts of 450° and 630°, respectively, between adjacent detectors.

A disadvantage of such an approach is that the signal modulation levels obtained are lower because such a large amount of phase is being detected by each detector segment. While appropriate masking of the detector segments can increase the modulation obtained, such masking adds complexity, reduces yield in the fabrication of the detector, and reduces the amount of incident light available for use by the detector, thereby limiting bandwidth.

Detector IC

Figure 11A:
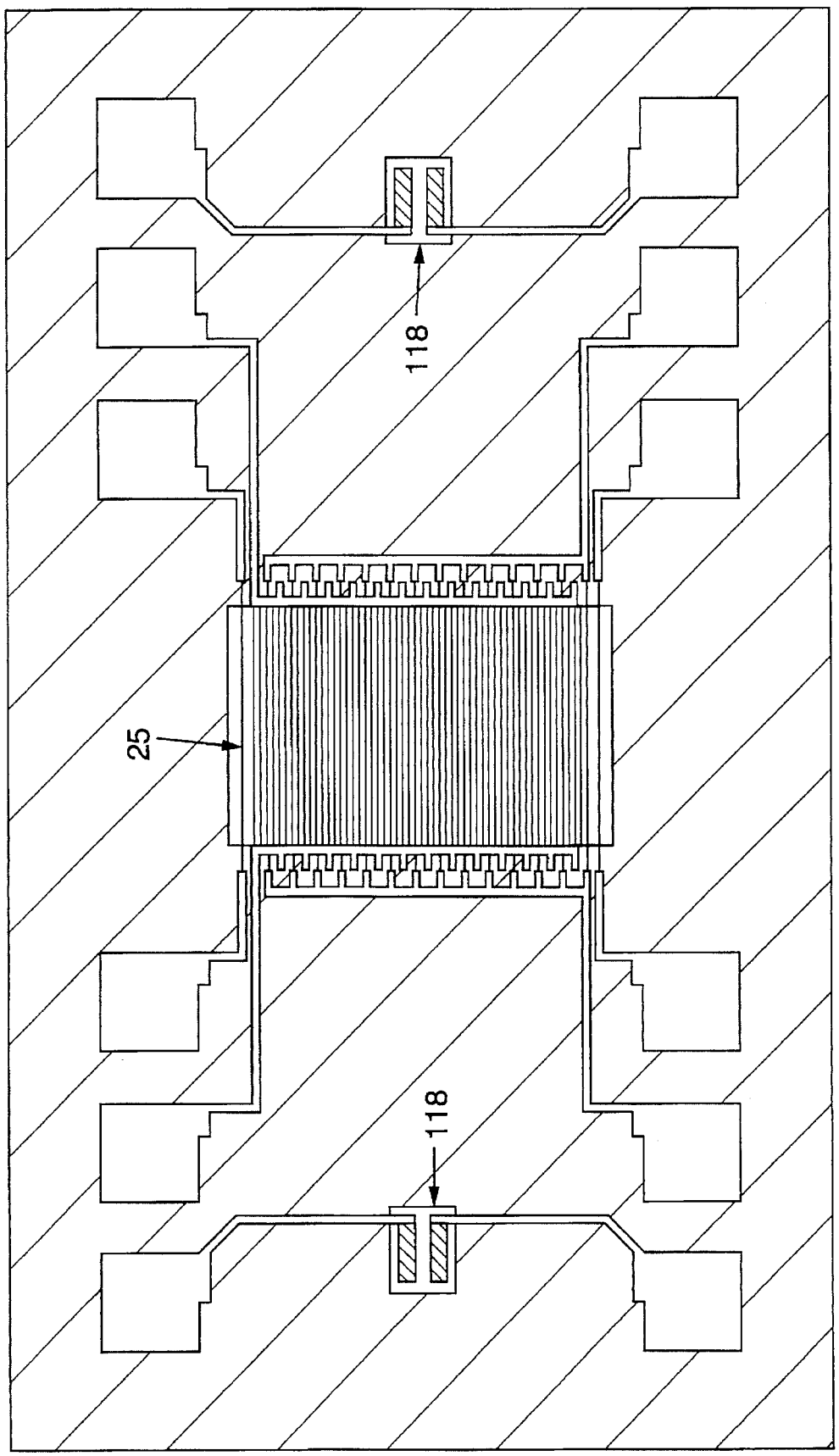
Figure 11B:
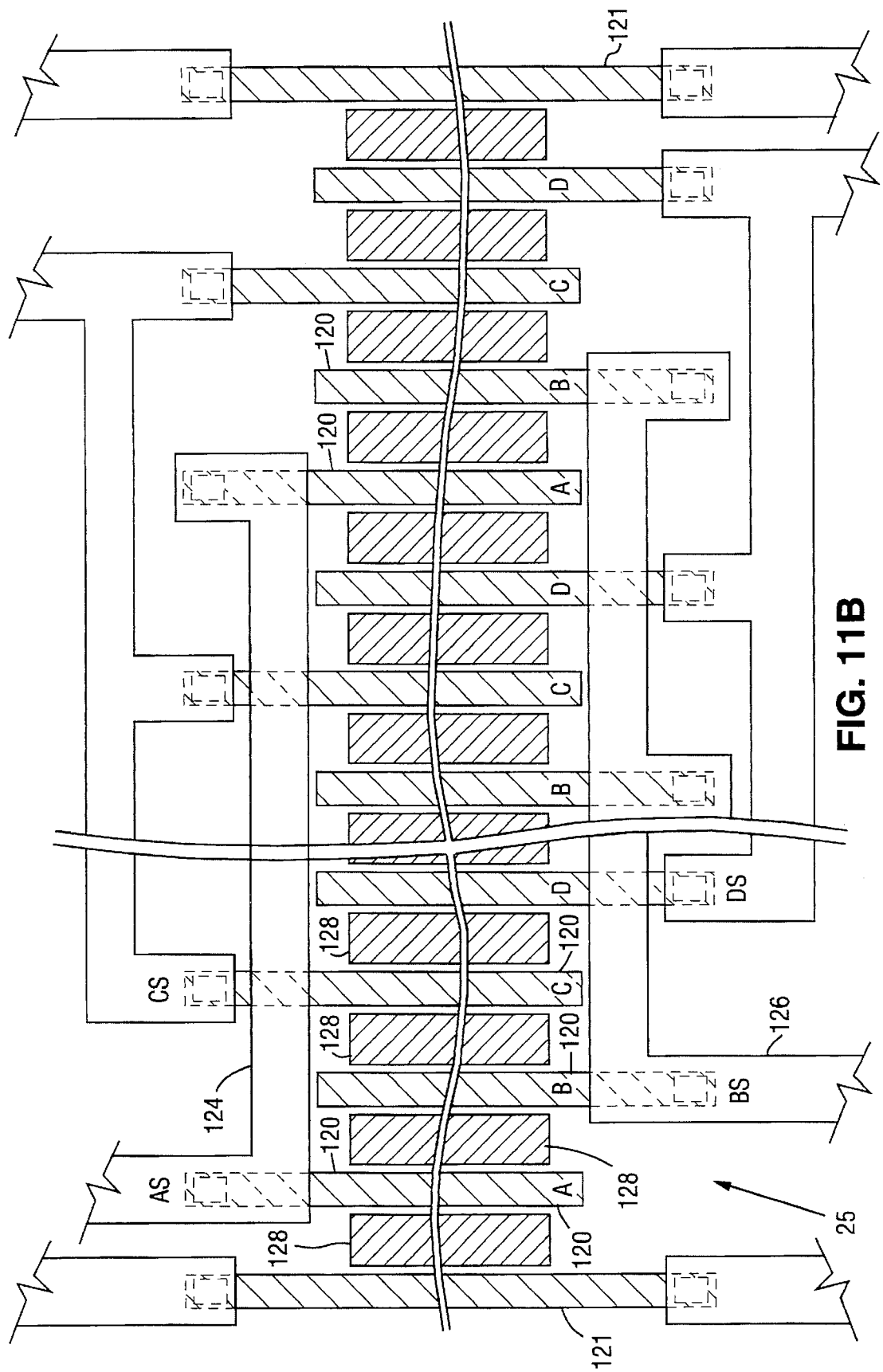

Referring now to FIGS. 11A and 11B, the detector 25 of the present invention will now be described in greater detail. Detector 25 is preferably embodied in the form of an integrated circuit. Thus, the detector 25 is shown in FIG. 11A formed on a semiconductive substrate along with index segments 118.

Referring to FIG. 11B, an expanded view is shown of the detector segments 112 which make up detector 25. Detector 25 is preferably formed of an array of elongated active regions 120 which are separated by inactive regions 122. Positioned at each end of the array are elongated active segments 121 which are not used. These are called "dummy" segments and are used to compensate for leakage effects at the ends of the array.

As can be seen from FIG. 11B, every fourth segment is connected together by a metal trace. This sums the signals from each of these interconnected segments. This interconnection produces phase shifted signals which are summed over an area for spatial averaging.

Thus, trace 124 is connected to each of the elongate segments 120-A and provides signal AS. Likewise, segments 120-B are connected together by trace 126 so that a signal BS is provided by trace 126. In the preferred embodiment, a wave front correction structure and the period of the grating 13 are selected so that the modulation produced by the positive and negative first order interference has a 30 pm period, and the elongate segments 120 in FIG. 11B are arranged in quadrants which are 30 μm wide. In the current working prototype, the period of the detector segments 120 is preferably 7.5 μm. The grating period is 10 μm and the wave front correction structure of FIGS. 18, 19A, 19B, or 19C, is used to provide natural interference between the positive and negative first order having a period of 30

μm. Within each detector segment cycle of a quadrant, the active portion 120 is preferably 2.5 μm wide, while the inactive portion is 5.0 μm wide. The length of each segment 120 is approximately 400 μm.

Detector Masking

Masking can be used to block out light from the photodetector array 25. This masking is shown in FIG. 11B as the closely cross-hatched regions 128 between the active segments 120, and in FIG. 11A by way of the coarsely cross-hatched region surrounding the detector 25 and the index segments 118.

Masking of the areas around the detectors can help to improve the modulation levels obtainable by the detector because such masking has been found to be effective in controlling the amount of phase captured by the detector segments. Although the regions between the active segments 120 of the detector array 25 are called "inactive", at least 80% of the light that strikes the "inactive" area will release an electron-hole pair that will migrate to an "active" area and contribute to the signal which is output.

Figure 11C:
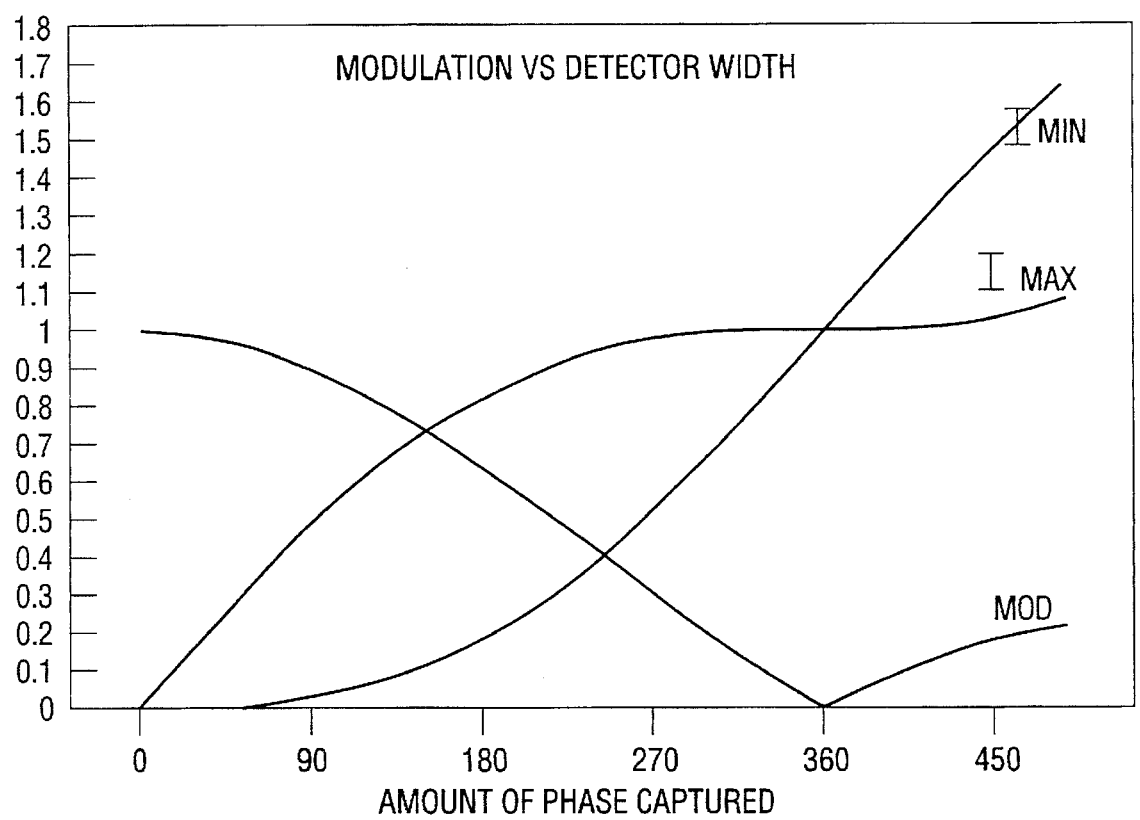

The graph of FIG. 11C shows the relationship between the amount of phase "captured" by a detector segment, the resulting "modulation", and the signal or intensity peaks and minimums. The optimum phase capture for maximum modulation is 0°, however the corresponding signal strength will be zero. For maximum signal strength the optimum phase capture is 180°. If more than 180° is captured, both signal and modulation are reduced, until only a DC signal level is detected (at 360° of phase capture). An unmasked detector captures exactly 90° of phase in a conventional quadrant configuration described earlier so that the attainable modulation is about 85% A detector which is masked as shown in FIG. 11B, will capture about 45° of phase for a modulation level of about 95% of maximum.

When the prime X configuration is used, an unmasked detector cell would see 270° of phase and produce a very weakly modulated signal. The detector in the working prototype which employs the Prime X Methodology uses a mask which covers approximately 50% of the detector area to limit the captured phase to about 126°. In the preferred embodiment of the present invention, the region between the active segments 120 are formed to have high resistivity and biased so as to minimize the crosstalk from one segment to the other. Use of high resistivity material raises the breakdown voltages of the junctions.

Due to sensitivity to light of the insulating regions around the "active" segments 120 of the detector, the ends segments exhibit greater sensitivity than the interior segments. This causes an elevation in the signal levels in the A and D channels. If the outer segments were masked in the same manner as the inner segments, they would exhibit reduced sensitivity since leakage currents from those outer segments would be greater than those inside the array. With a masked "dummy" cell added to each end of the array, there is some reduction of the leakage effects. In the detector of the working prototype, the "dummy" cell was added, but was left unmasked. Further, the gain on the A and D channels was elevated by 2.6% over the B and C channels.

Another variation of the detector of the present invention is to vary the magnitude of masking around the active segments 120 at each end of the array in place of the use of "dummy" segments 121.

Spatial Filtering

A further benefit of the phased-array configuration of the detector which is employed in the working prototype of the present invention is that it can be effective in removing zeroth order components from the natural interference between the first and second diffraction orders. When detector 25 is a poly-phase interdigitated detector, its periodicity can be selected to reduce zeroth order effects. FIG. 11D illustrates the spatial filtering which has been achieved by the phased-array configuration of the detector. Such results have been achieved when the phase of the detector and the interference fringe are precisely matched. Capturing of 180° will suppress all higher order harmonics which are integer multiples of the primary.

In the preferred embodiment of the present invention, wave front correction techniques are used to angle the zeroth order away from the detector 25. However, other embodiments may permit some zeroth order component to strike the detector, in which case spatial filtering by the phased array can be of help in reducing zero order effects on the detector.

Figure 12A:
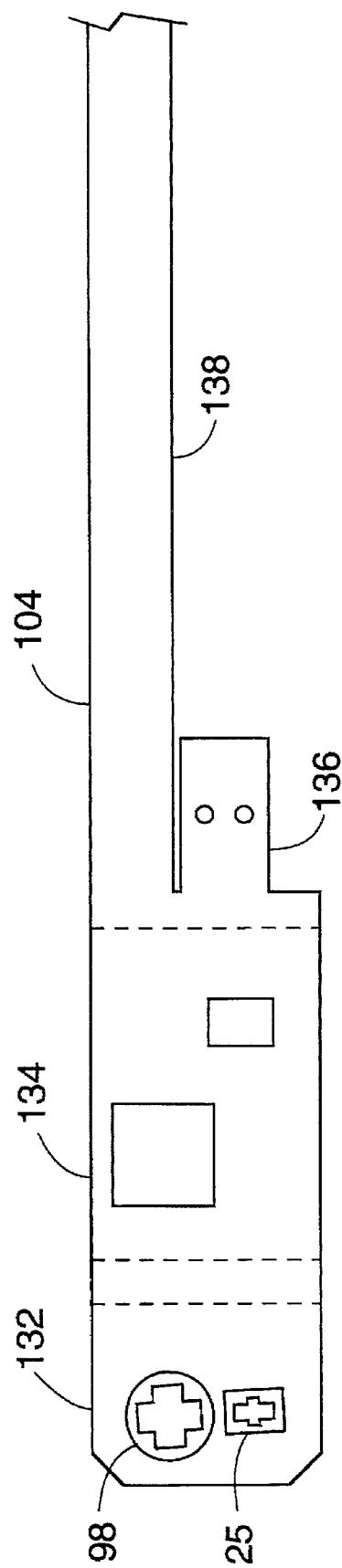
FIGS. 12A and FIGS. 12B illustrate a flex-circuit structure employed in a working prototype of the present invention.
Figure 12B:
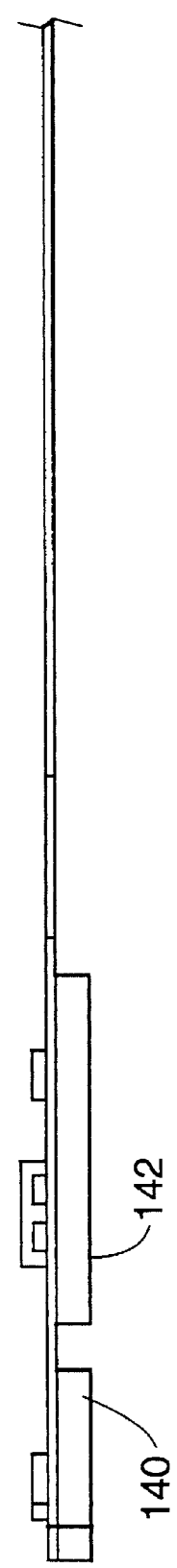

Referring now to FIGS. 12A and 12B, the flex cable 104 is shown in a state before it is bent and installed in head 92. Portion 132 supports the aperture 98 and detector 25, while portion 134 supports the processing electronics 106. Portion 136 provides electrical power to the laser diode 25 and finally, portion 138 provides the electrical leads to bring power and signals. FIG. 12B shows how a portion 132 and 134 are supported by substrate 140 and 142. These are preferably constructed of printed circuit board material, such as FR4 epoxy, and provide structural rigidity to the flex cable 104.

Figure 13A:
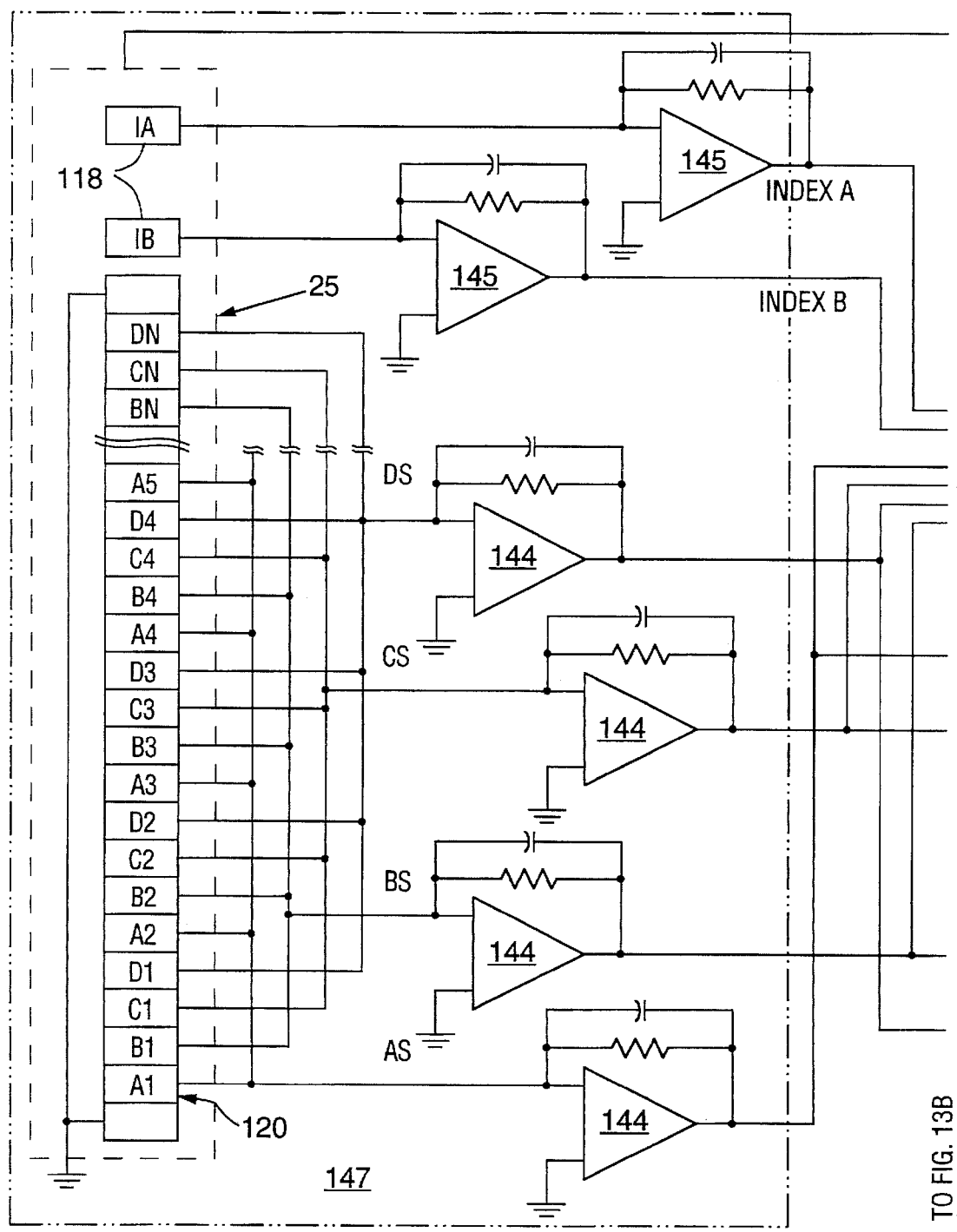
FIG. 13 illustrates the processing circuitry employed in a prototype of the present invention.
Figure 13B:
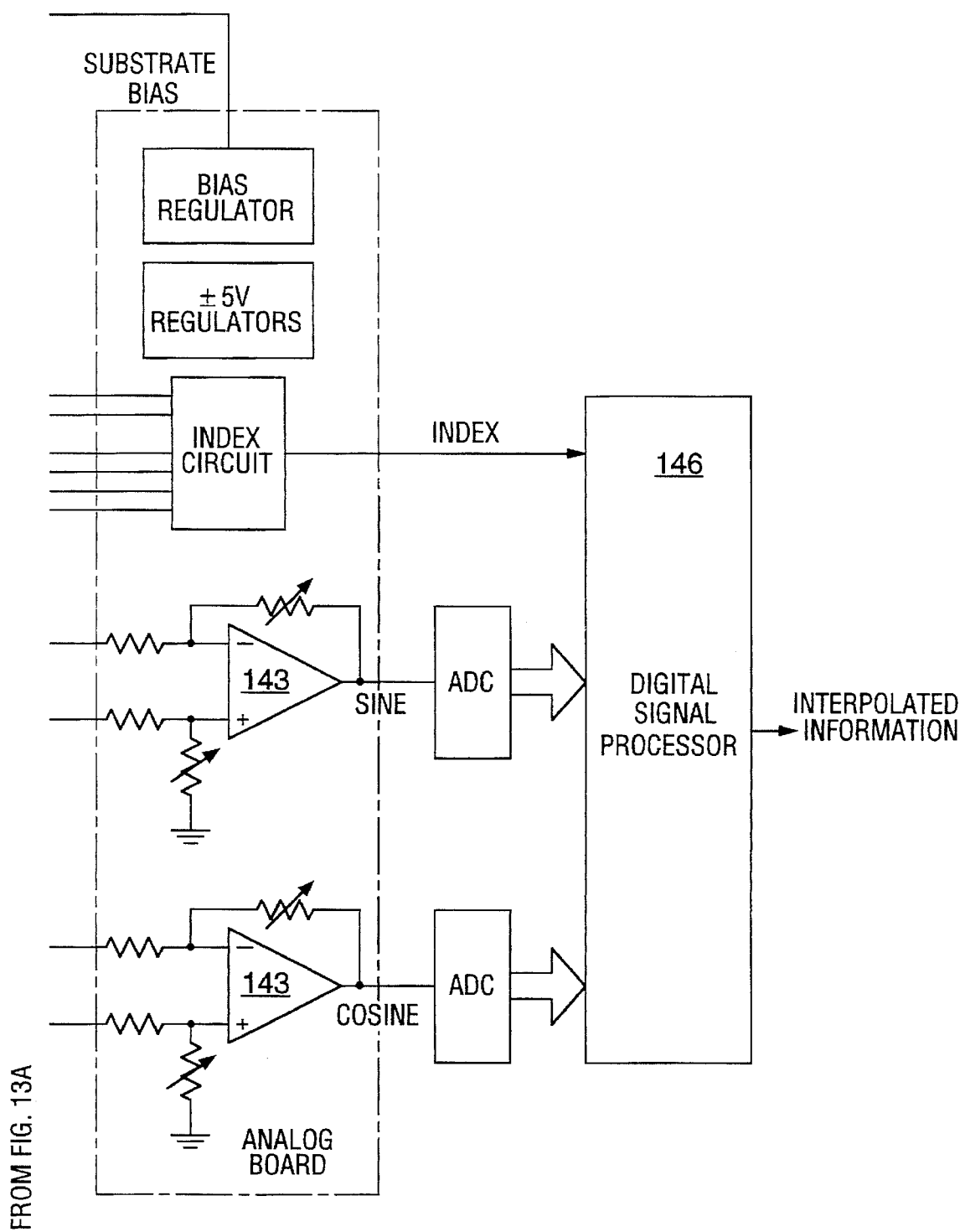

Referring to FIG. 13, the processing electronics will be described in greater detail. The left side of the figure illustrates how the individual elongated segments from the detector 25 are connected together to provide summation signals AS, BS, CS and DS. Each of these signals is provided to a preamplifier 144 which conditions and amplifies the signal.

Difference amplifiers 143 take the difference between signals CS and AS, and between DS and BS, to generate sine and cosine signals. These sine and cosine signals are thereafter are applied to a digital signal processor (DSP) based interpolator 146, or an interpolation chip, forms an interpolation operation on the signals. For high end interpolation, the DSP chip can be an Analog Devices ADSP 2100 series DSP chip, or for mid-range interpolation, it can be a 40× interpolator chip which is used in products sold by the Computer Products Division of the assignee of the subject application. Finally, the processing for 4× quadrature outputs can be accomplished using a quadrature chip device number ET9580 manufactured by East Texas Integrated Circuits of Dallas, Tex.

FIG. 13 also illustrates the components located on the hybrid circuit 147 in the preferred embodiment of the present invention. This includes the detector chip 25, and preamplifiers 144 and 145. Note that preamplifiers 145 are provided to condition signals from the index detector segments 118 (IA and IB), and provide outputs "Index A" and "Index B". Preamplifiers 144 and 145 can be device numbers TLC272C manufactured by Texas Instruments of Dallas, Tex. Finally, it is to be noted that hybrid 147 includes a substrate bias input for use in applying bias signals to detector chip 25, as discussed earlier, to reduce crosstalk.

Difference amplifiers 143 are located on an analog board, along with an index circuit which generates an index signal based upon the Index A, Index B, AS, BS, CS, and DS signals from preamplifiers 144 and 145. Also located on the analog board is a bias regulator which generates the substrate bias signal for the detector chip 25. Finally, the analog board also includes a conventional laser driver, a conventional pulsing circuitry to keep the emitted laser output below Class 1 levels when necessary, and conventional ±5V regulator circuitry.

Diffractive Zone Lens for Index

Figure 14:
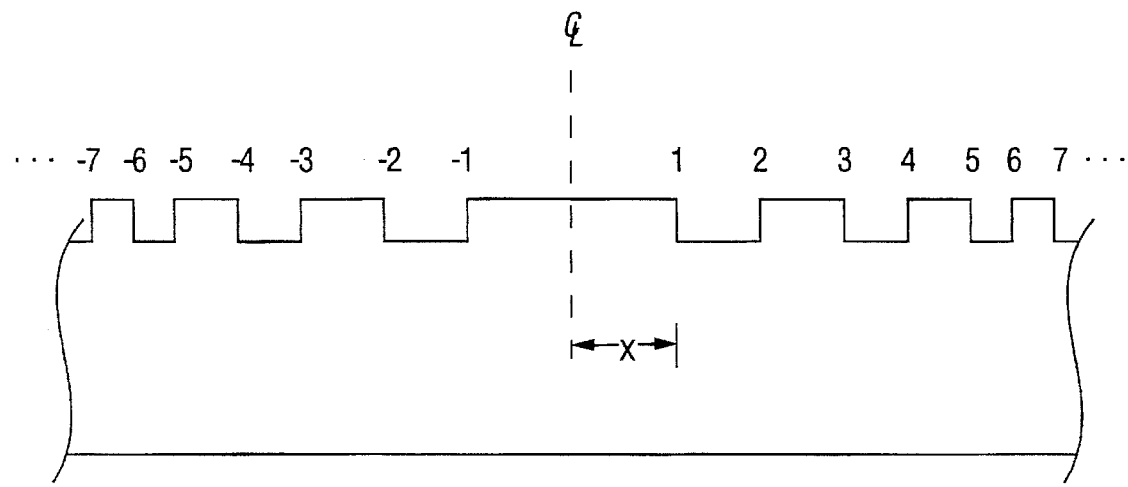
FIG. 14 illustrates the cross section of a zone lens formed in a glass substrate which is suitable for use in generating the 20 μm stripe for use in generating an index for use in the present invention.

In the present invention, an index pulse is generated using a binary zone lens that focuses light onto a stripe 20 µm wide and over a depth of ±0.5 mm. Two detectors 118, FIG. 11A, are used to gate the index pulse. See also FIG. 13, and amplifiers 145. FIG. 14 illustrates the cross section of a zone lens formed in a glass substrate which is suitable for use in generating the 20 µm stripe. This zone lens is formed in the grating 13 above the primary reference grating at the time of manufacture. Collimated beam 29 overfills the grating and strikes the zone lens which can be located above and/or below the primary reference grating. The zone lens focuses the light into a 20 µm stripe which strikes the index detector cells 118 on the detector 25.

In FIG. 14, when the lens is used with radial gratings, the dimensions correspond to the positions of each transition at the radial center of each index binary, such that the lines are radial, not linear. When the diffractive zone lens is used in an embodiment of the present invention in which wave front correction is used to pre-compensate the collimated light for use with a radial grating, the zone lens design should take into consideration the need to "untwist" the pre-compensation. The wavefront compensating structure can be shaped to exclude the region of the zone lens so that normally incident light strikes the zone lens. Or, the zone lens can be designed to accommodate the two beams from the wavefront compensating structure.

Apodized Apertures

Figure 15A:
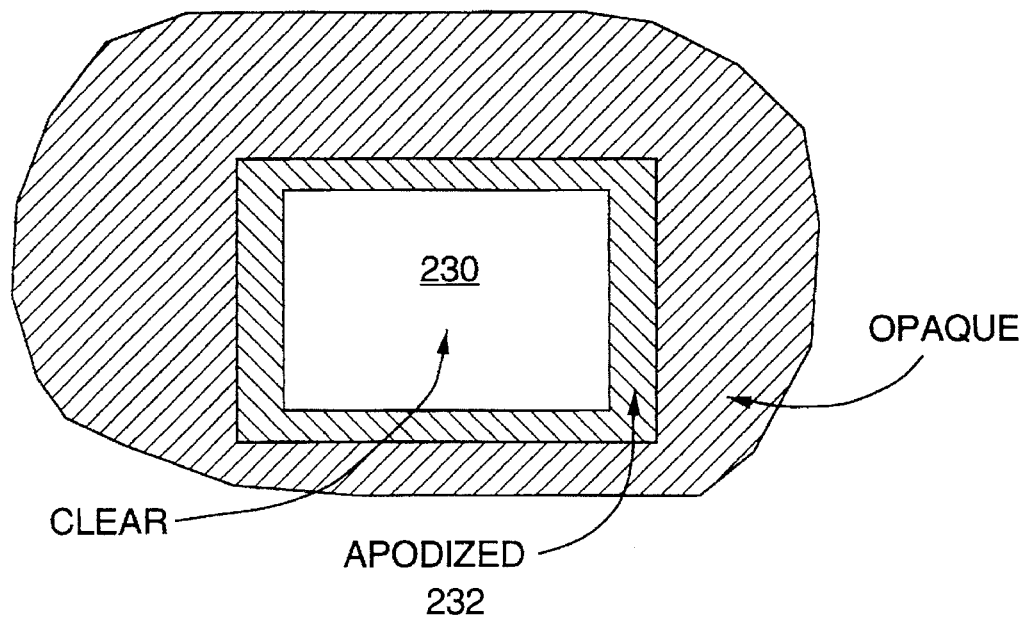
FIGS. 15A and 15B illustrate the apodizing of the apertures used in the present invention.

As described earlier in this specification, apertures are sometimes employed to shape beams of light, and to clearly define the size of the beam. Because of the wavelength of light and the size of the apertures employed in accordance with the present invention, edge diffraction from an aperture can seriously degrade the optical signal which is presented to the detector 25, and can also reduce alignment tolerances. It has been found that by "softening" the edges of the aperture with a varying pattern, such as a dot pattern, edge diffraction effects can be reduced. FIG. 15A illustrates an aperture 230, and an apodized region 232 formed along the edges of the aperture, including the corners. For apertures having dimensions in the 1000 to 2000 µm range, the apodized region should be about 100 µm wide.

Figure 15B:
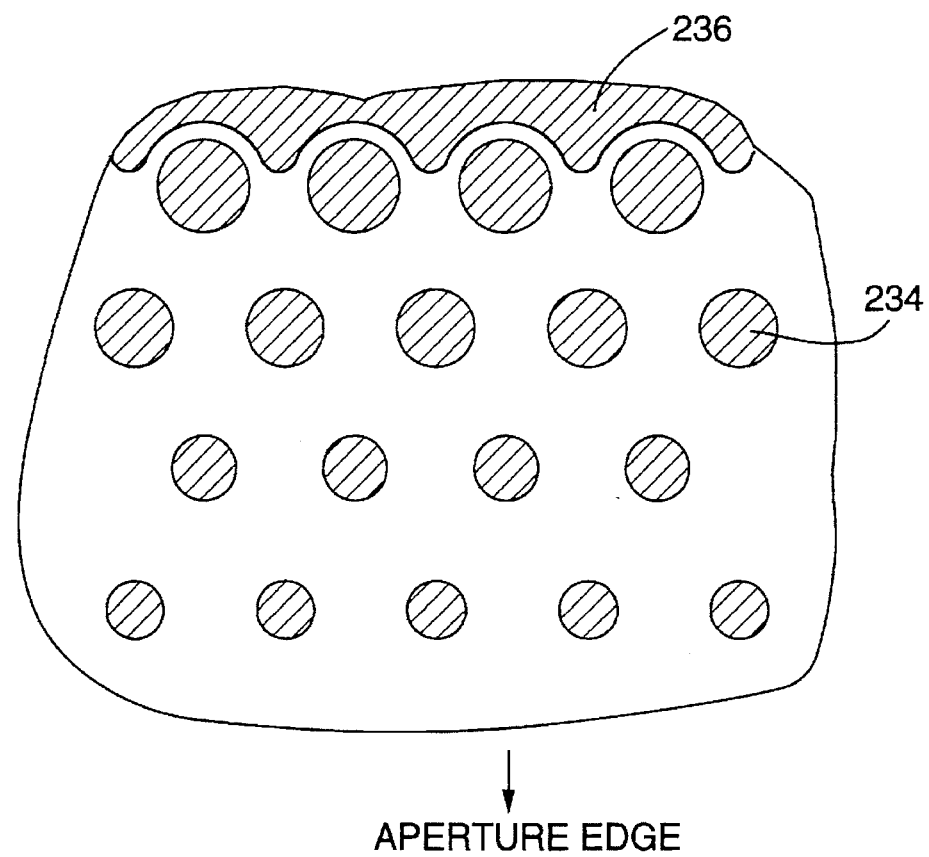

FIG. 15B illustrates the manner in which a dot pattern is used to provide a smooth transition from opaque to clear. As the aperture edge is approached, the diameter of the dots decreases, and/or the density of the dots is decreased. Preferably the transition in transmission provided by the apodizing should follow sine-squared function. Alternatively, a super-gaussian function can be used.

Polarizing Beam Splitter Embodiment

Figure 16:
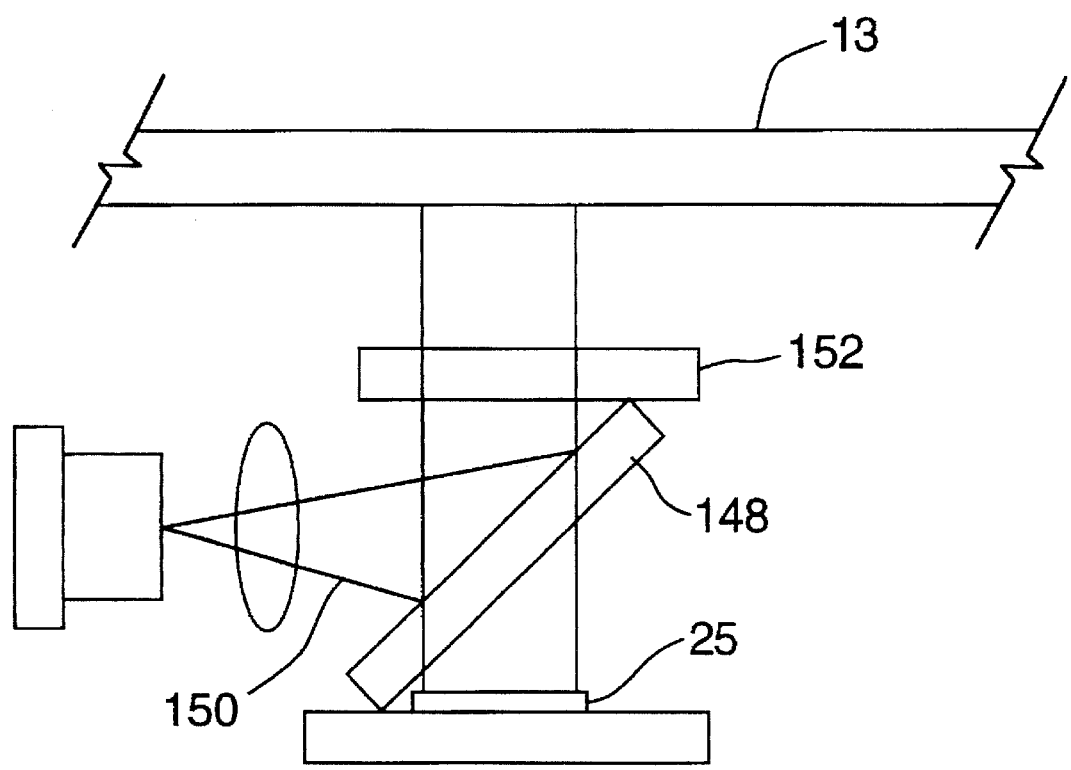
FIG. 16 illustrates a further embodiment of the present invention which employs a polarizing beam splitter and λ/4 wave retarder for normal incidence at the grating in a reflective design.

Referring to FIG. 16, an alternative embodiment of the present invention shown. This embodiment employs a polarizing beam splitter 148 and a λ/4 retarder 152 to direct the beam 150 along a path normal to the grating. This is accomplished as follows: The collimated beam 150 is linearly polarized as it emerges from the laser diode. The laser diode is oriented for a plane of polarization which is perpendicular to the plane of the paper in FIG. 16. Due to this polarization the beam splitter 148 reflects virtually all of the energies through the λ/4 retarder 152, which transforms the polarization into a circular form. This beam continues onto the grating 13, where it is incident at 0°. The first order diffractive beams travel back through the retarder where the light is transformed back into a linear polarized form, but at a polarization angle orthogonal to that of the outgoing beam. Due to this rotation and polarization, virtually all of the energy passes through the beam splitter and on to detector 25. Path lengths are chosen so that the natural first order interference is incident on the detector. This approach offers two primary advantages. The normal incidence at the grating minimizes sensitivity to grating runout, and the detector can be aligned with its active elements perpendicular to the grating lines as opposed to requiring a 5° detector rotation as in other embodiments. There are also manufacturing advantages to the polarizing beam splitter embodiment as all machined surfaces are orthogonal or 45°, reducing the number of setups in machining the housing that carries the components.

Wave Front Correction

As the period of grating 13A decreases, a practical consideration in the design of systems in accordance with the present invention is the availability and cost of polyphase detectors with periods small enough to accommodate the fringes being generated by the smaller grating period. As was discussed earlier, the interference fringes generated by the grating 13A typically will have a period which is one-half that of the grating 13A. As the grating period is reduced, the practical limits of detector fabrication begin to affect cost and performance of the system. Therefore, it is desirable to have a system architecture which is suitable for a wide variety of applications and a wide range of grating periods, and in which the detector design is fixed and uses a period which does not push the limits of detector fabrication.

Figures 17A, 17B:
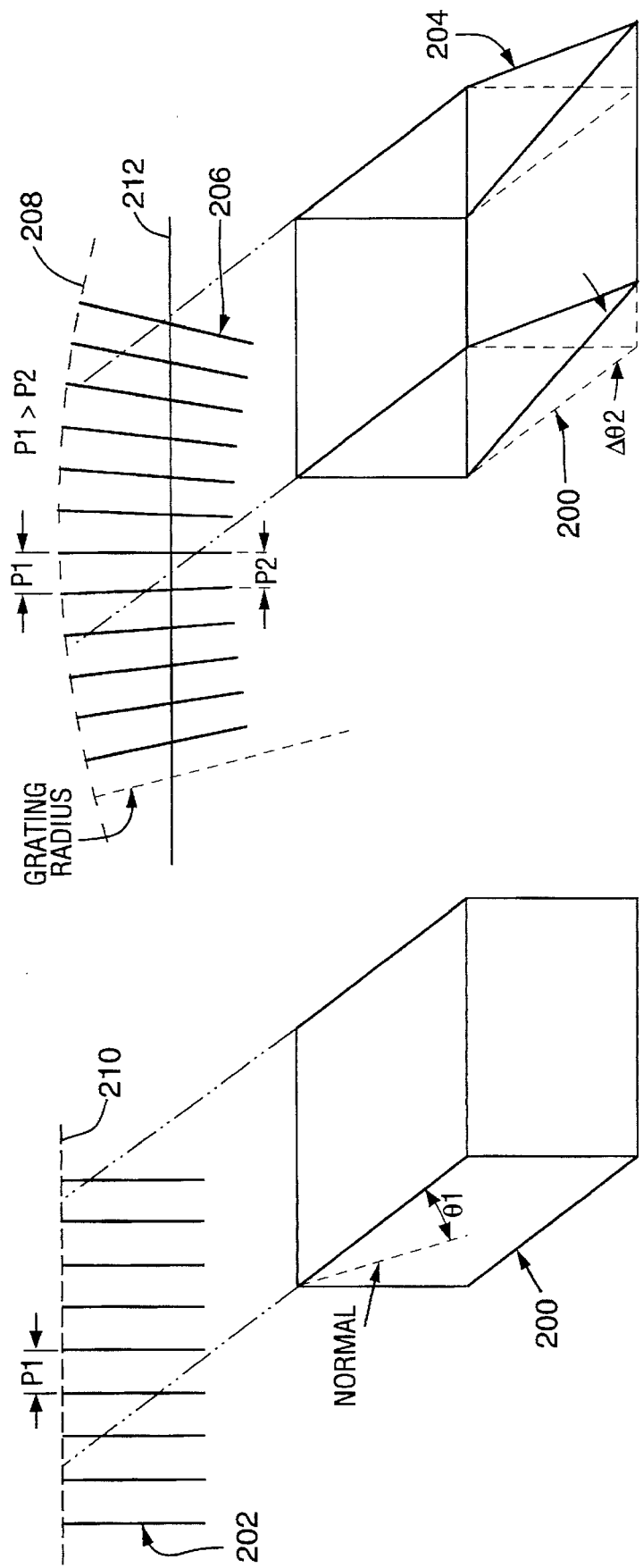
FIG. 17 compares first order diffraction from a linear grating, to a first order diffraction from a radial grating to illustrate one of the effects of a radial grating on the diffraction orders.

It is also recognized that detecting interference fringes from a radial grating using a linear detector array is difficult. This is because the diffraction provided by a radial grating is "twisted" as a function of the location along the radius of the grating pattern at which the diffraction originates. FIG. 17 compares first order diffraction 200 from a linear grating 202, to a first order diffraction 204 from a radial grating 206 to illustrate one of the effects of a radial grating on the diffraction orders. The first order diffraction 200 is shown to have an angle of θ1 from a line normal to grating 202.

On the right hand side of FIG. 17, the first order diffraction 200 from the linear case is shown superimposed in dashed lines on the first order diffraction 204 from the radial grating. The period, P1, of the radial grating at its outer most point is assumed to be equal to the period, P1, of the linear grating.

It can be seen that while diffraction orders from the outer portion of radial grating 206 depart at the same angle as for the linear grating case, the diffraction from the inner portion of the radial grating 206 departs the grating at a larger angle. In FIG. 17 the difference in these angles is indicated as Δθ2. This difference is present because the "period" of the grating changes as a function of the radius, with the period, P2, toward the inner portion of the grating being smaller than the period, P1, toward the outer portion. The larger the "period" of the grating, the smaller the angle. Conversely, the smaller the period of the grating, the larger the angle. It follows that for radial grating 206 the angle of the diffraction orders decreases with increasing radius, hence interference between such beams will have a fringe period which increases with increasing radius.

Another effect of a radial grating is that because the top edge of a radial grating pattern is positioned along an arc 208, while the top edges of the segments of a linear detector are arranged along a straight line similar to line 210 for linear grating 202, the radial grating will produce an interference fringe pattern on a linear detector which has a period which is smaller in the middle of the detector and larger at the ends of the detector. This can be appreciated by observing that the period of the grating varies along the straight line 212 in FIG. 17 which is parallel to a tangent to the arc 208. The period is smallest at the middle of the line and larger at either end.

A further effect is that when a spot illuminates the grating, the grating pattern at the left hand portion of the illuminated spot has a nominal NNW slant, while the right hand portion has a nominal NNE slant.

All of these effects add to the difficulty of using a rectangular linear detector array to detect interference fringes from radial gratings. It might therefore be assumed that the linear detector structures shown in FIG. 4 cannot be used to adequately process interference fringes from radial gratings.

In accordance with the present invention, a technique has been discovered which permits the period of interference fringes from a grating to be altered so that detectors with relatively coarse segment periods can be used with gratings having relatively small periods, and so that linear detectors can be used to detect interference fringes from radial gratings. In accordance with the present invention, a structure is provided upstream of the grating in a position which is fixed with respect to the light source. The structure pre-compensates or pre-corrects the collimated light from the light source before such light strikes the grating. This pre-compensation or pre-correction is selected so that the resulting interference fringes produced by the grating are linear and have the desired period.

The pre-compensation or pre-correction involves deriving two separate beams from the collimated light and directing the separate beams onto the grating 13A at selected angles. The selected angles are chosen to counteract the "twisting" imparted by a radial grating, or to modify the angle at which first order diffraction departs grating 13A. In accordance with the present invention, refractive, diffractive grating, and binary optic structures can be employed to provide the pre-compensation or pre-correction.

Figures 18, 18A:
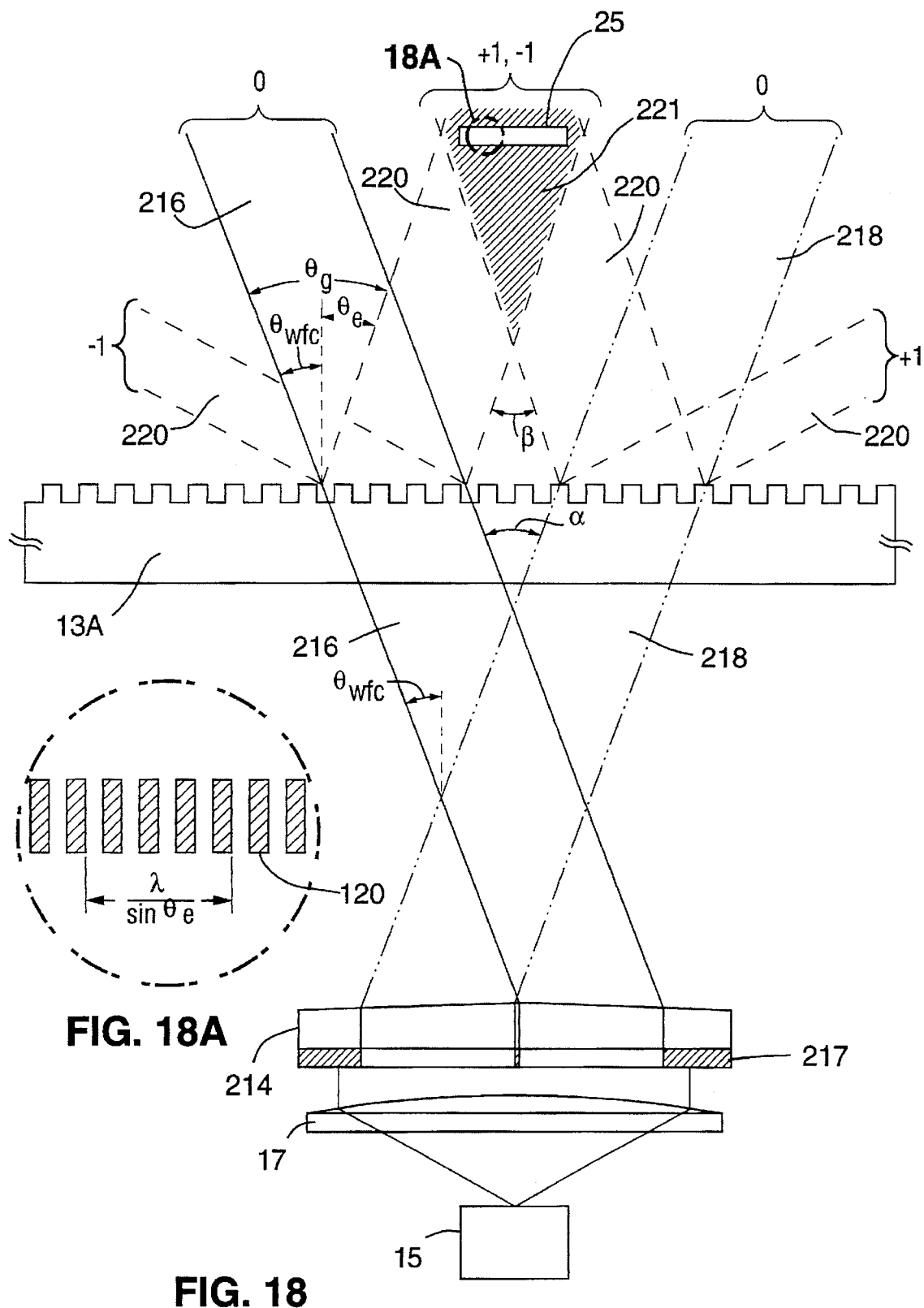
FIG. 18 illustrates the use of wave front correction in accordance with the present invention to modify the angle at which first order diffraction departs grating 13A.

FIG. 18 illustrates the use of wave front correction in accordance with the present invention to modify the angle at which first order diffraction departs grating 13A. Laser diode 15 provides coherent light which is collimated by lens structure 17. Wave front correction structure 214 is positioned upstream of grating 13A and provides two collimated beams 216 and 218 which are diffracted by grating 13A. The positive first order diffraction 220 from collimated beam 216 and the negative first order 220 from collimated beam 218 interfere with one another in the shaded region 221 between beams 216 and 218. Detector 25 is positioned in this interference region.

First, it should be noted that the zero order beams 216 and 218 are angled so that they miss the detector 25 entirely. Further, the higher diffraction orders are angled even more sharply so that the interference being sampled by detector 25 is substantially pure ± first order interference.

Second, the period of grating 13A no longer dictates the period of detector 25. As such, a designer can use a single, very well engineered detector, which can be purchased in high volumes, for a wide variety of grating periods and radii. The detector need not push the limits of the state of the art, so that attention can be paid to improving the detector performance, cost, and yield.

FIG. 18 illustrates how the wave front correction technique increases the interference fringe frequency from a linear grating which has a small period, e.g. 10 microns, so that a coarse detector, e.g. one suitable for a 30 micron fringe period, can be employed. According to equation (1), for a wavelength $\lambda=785$ nm, 30 μm interference fringes are produced by first order diffraction beams which are angled with respect to one another at an angle of $$\beta = 2\sin^{-1}\left(\frac{785 \text{ nm}}{60 \text{ μm}}\right) = 1.498°$$

Therefore, if the first order diffraction beams 220 from grating 13A have an effective angle of $\beta=1.498°$, the desired fringe period will be produced.

On the other hand, since grating 13A in FIG. 18 is assumed to have a 10 μm period, collimated light incident on grating 13A at 0° will produce first order beams angled at approximately 9.0° with respect to one another (4.5° with respect to a normal to the grating) and interference fringes with a 5 μm period.

As illustrated in FIG. 18, a function of wave front correction structure 214 is to adjust the angle at which the collimated light is incident on grating 13A so that the effective angle, $\theta_e$, of the first order beams from grating 13A is at the desired angle, e.g. 1.498°. While FIG. 18 shows a wavefrone correction structure 214 in the form of a refractive element, it is to be understood that a phase grating, as well as a binary optic can be used to provide such correction in accordance with the present invention.

Wave front correction structure 214 provides two distinct collimated beams of light, 216 and 218, which are angled with respect to one another at an angle $\alpha=2\theta_{wfc}$. Therefore, each of the collimated beams 216 and 218 is incident on grating 13A at an angle $-\theta_{wfc}$ and $+\theta_{wfc}$ from normal, respectively. Since grating 13A will provide first order diffraction at an angle $\theta_g = \sin^{-1}\lambda/d$ from the path of the incident beams 216, and 218, the effective angle, $\lambda_e$, of the first order diffraction 220 with respect to a normal to the grating 13A will be altered, namely:

$$\theta_e = \theta_g - \theta_{wfc} \quad (5)$$

or $$\beta/2 = \sin^{-1}(\lambda/d) - \alpha/2 \quad (6)$$

Where $\lambda$ is the wavelength of the collimated light, d is the period of grating 13A, $\beta=2\theta_g$, and $\alpha=2\theta_{wfc}$. Therefore, by appropriately adjusting $\alpha$, one is able to obtain the desired angular separation, $\beta$, between the first order diffraction beams from grating 13A which in turn will produce the desired interference fringe period at detector 25. A more precise equation is $$\alpha = 2\sin^{-1}((\lambda/d) - \sin(\beta/2)) \quad (7)$$

FIG. 18 also illustrates the relationship of the interference fringe period to the segments 120 of detector 25. As discussed in greater detail in connection with FIGS. 11A, 11B, 11C, and 11D, the preferred embodiment of the present invention uses an array of detector segments 120 in which every four consecutive detector segments represents a quadrant of the detector. The detector segments 120 are dimensioned so that a quadrant has the same width as the period of interference fringes to be detected. Thus, as is shown in FIG. 18, the total width of four segments 120 corresponds to $\lambda/\sin(\theta_e)$, the period of the interference fringes in region 221.

With such an arrangement, the level of signal modulation which can be obtained from detector 25 is 85%, a substantial improvement over other detector arrangements which have been considered by the inventors herein. Masking of the inactive portions of detector segments 120 to reduce the amount of phase captured to 45°, increases the maximum modulation obtainable to 95%. In most applications, however, an unmasked detector is sufficient, and increases yield, simplifies and reduces the cost of detector fabrication.

A further benefit of wave front correction in accordance with the present invention is the reduction of the effect on signal modulation due to local surface irregularities from reflective replicated gratings. This is because the wave front correction changes the angle of the diffraction orders so that the interference fringes are "expanded", but does not provide a corresponding increase in the effective size of the surface irregularities.

With the interference fringes "expanded" by wave front correction, a single four bar detector fabricated from commercially available detector cells can be used to detect the "expanded" fringes. It is anticipated that by using such larger commercial detectors, more bandwidth can be obtained.

Figure 19A:
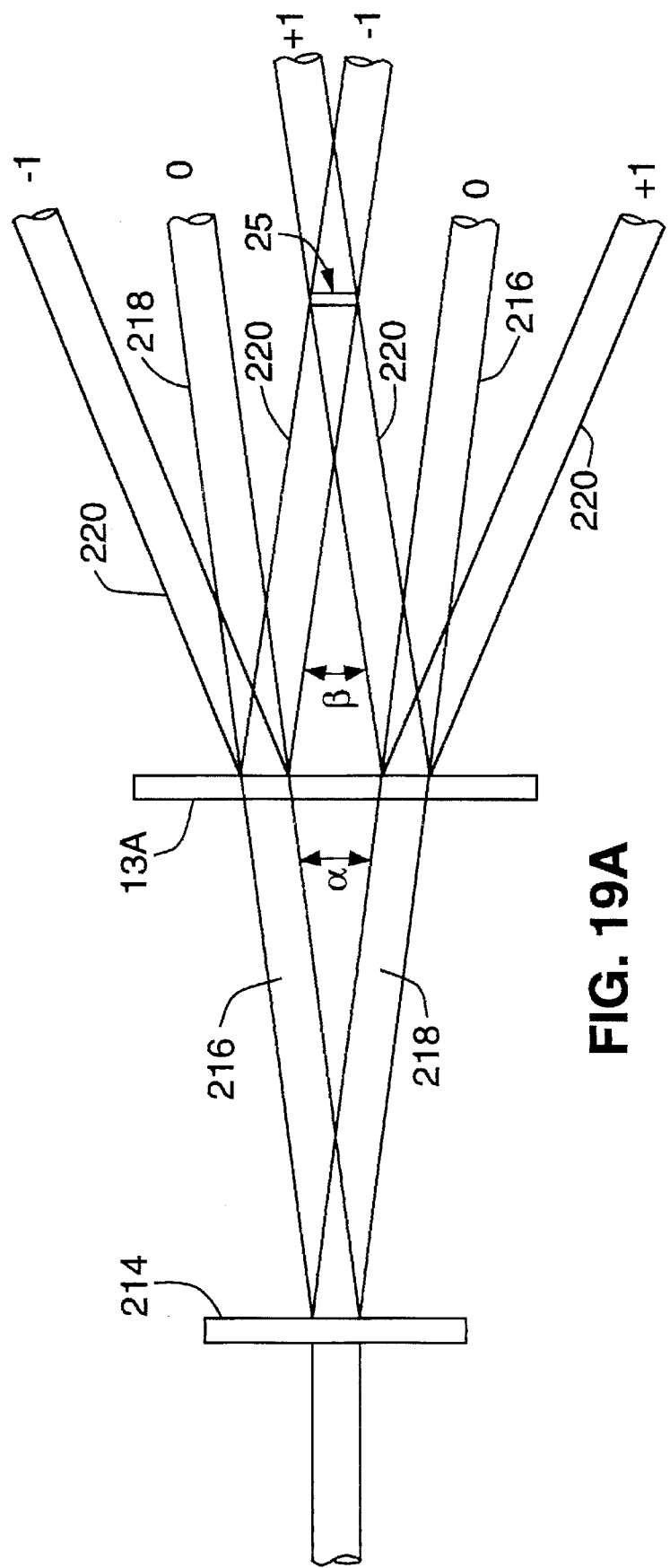
Figure 20A:
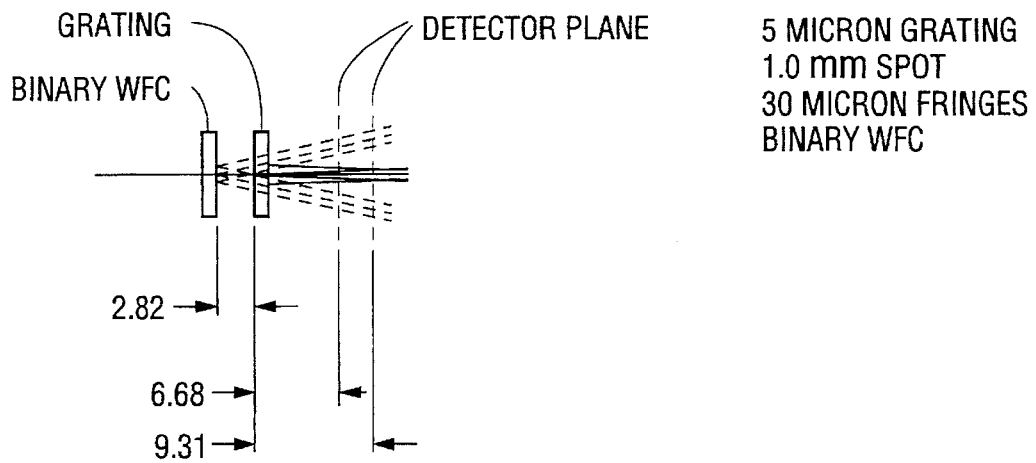

FIGS. 19A, 19B, and 19C, and FIGS. 20A, 20B, and 20C, illustrate wave front correction layouts using diffractive and refractive structures. FIG. 19A is a simplified version of FIG. 18, and illustrates the use of diffractive structure 214, with grating 13A being spaced from diffractive structure 214 so that collimated beams 216 and 218 do not overlap at the point they strike grating 13A. It is to be understood that grating 13A can be positioned at other distances from structure 214, for example, at a point where collimated beams 216 and 218 are totally overlapped, i.e. superimposed. Using a diffractive layout, with beams 216 and 218 superimposed, the grating can have a 5 µm period, the spot size can be 1.0 mm, and the interference fringe period can be 30 µm. The wave front correction structure 214 can be a phase grating with a period of approximately 5.45 µm. FIG. 20A provides an example of the relative separation between wave front correction structure 214, grating 13A, and interference region 221, in millimeters, which can be obtained with such an arrangement.

While a diffractive wave front correction structure using a simple binary step design can be less expensive to manufacture than a refractive one, residual zeroth order light which is present with such a design can produce optical noise on the signals from the detector 25 and degrade the degree to which the signals can be interpolated.

Figure 20B:
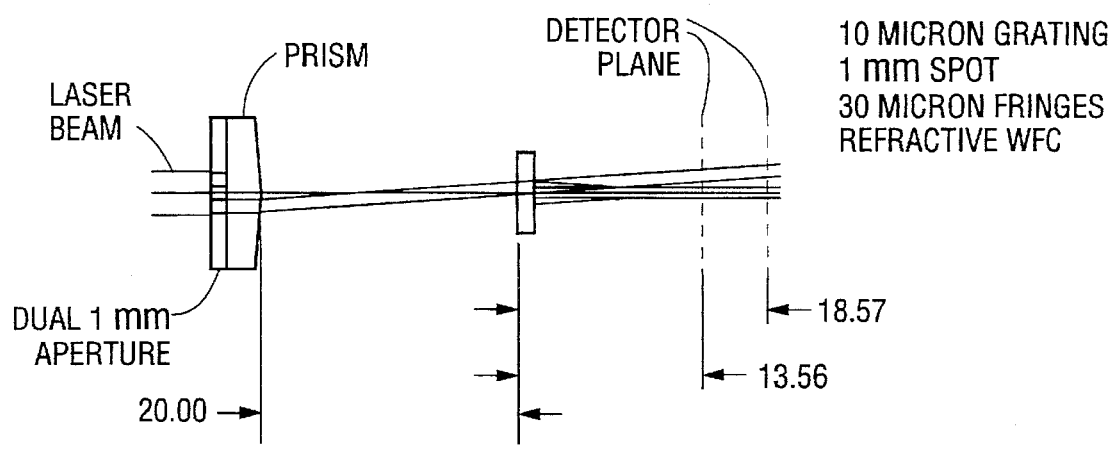

FIGS. 19B, 19C and 20B illustrate a refractive layout. Because this layout requires beams 216 and 218 to cross before they strike grating 213, there is a greater separation between components. Note, however, that a longer region of interference is obtained: approximately 5 mm (refractive) versus approximately 3 mm (diffractive). The refractive layout uses an optical element, such as a prism 215, and a dual aperture 217. The refractive wave front correction layout of FIG. 20B assumes a 10 µm period for grating 13A, a 1 mm spot size, and a prism 215 which angles the incident beams onto grating 13A so that interference fringes of 30 µm are generated in region 221.

FIG. 19C illustrates the impact of moving grating 13A in toward prism 215, including the reduction in the width of the interference fringe area 221.

Figure 20C:
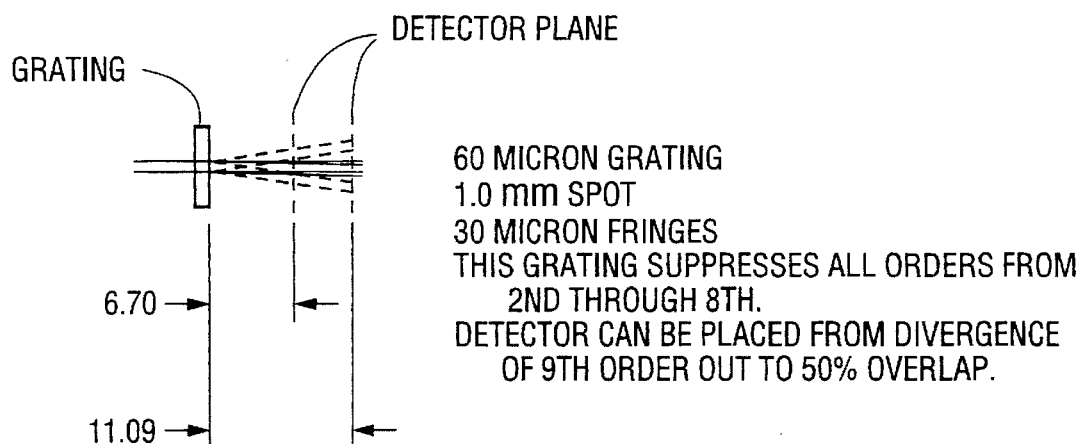
FIG. 20C illustrates the use of a higher order suppressing grating.

Finally, FIG. 20C illustrates a layout in accordance with the present invention which does not employ a wave front correction structure. As such, a much coarser grating period is used (60 µm) to generate the same 30 µm interference fringe period. Furthermore, the grating 13A is required to be designed to suppress all orders from 2nd to 8th, and the detector 25 can be placed from divergence of the 9th orders out to 50% overlap.

Radial Grating Wavefront Correction

Returning now to FIG. 17, the wave front correction structures for radial gratings will now be described in greater detail. The "twisting" of the diffracted beam 204 can be compensated by shaping the wavefront at the input to the grating in a similar, but opposite, manner. FIG. 23 shows an optical element that can be used upstream of the grating 13A to perform this function. The collimated beam enters the refractive optic 222 through the bottom face 224, and exists through the two "twisted faces" 226 and 228 on the other side. Note that the faces 226 and 228 of the refractive optic 222 have a low peak and small slope at one end which increases linearly to a high peak and steep slope at the other end.

FIG. 21 depicts one side of the input beam passing through an optic of this general type, and then passing through the grating 13A. In the drawing on the left side of FIG. 21, the "twist" in the diffracted beam is shown due to the radial grating. Note how the near and far edges of the first order beams emerge along different directions. The drawing on the right side of the figure shows how refractive optic 222 reverse twists the beams prior to their striking grating 13A to produce parallel diffracted beams.

FIG. 22 illustrates variations in the shape of the faces of the refractive optic to compensate for the other effects of radial gratings. Here, the slope of the faces is shown varying from left to right as well as top to bottom. For example, the left to right slope variation might be employed to correct for the change in the period of a radial grating along a line which is parallel to the periphery of the pattern. See line 212 in FIG. 17. Furthermore, the slopes of the faces can be selected to accommodate required incident beam separations for spatial filtering of the zero order, or optic-to-grating distances.

FIG. 24 illustrates a reflective wave front correction structure for use with a linear detector. The slope of the faces is chosen to produce the desired fringe period out of the grating, as was described earlier. FIG. 25 illustrates how the angling of the faces of the refractive optic, and the distance which separates the refractive optic from grating 13A, influences the separation and angles at which the beams strike grating 13A.

Figure 26A:
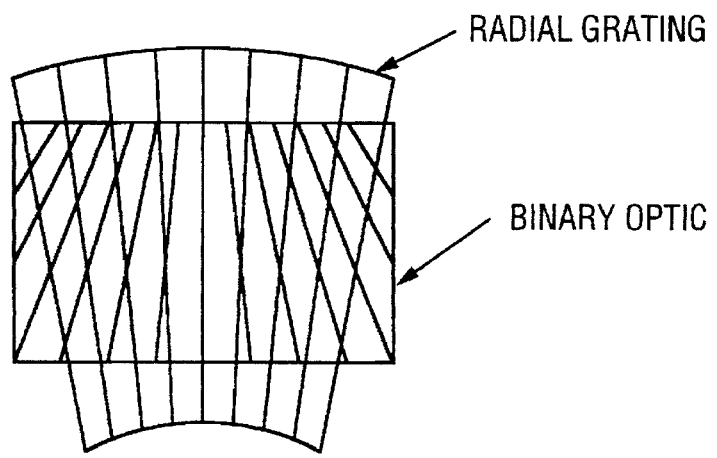
FIGS. 26A, 26B, and 26C illustrate a diffractive optical element for use in wave front compensation for radial gratings.
Figure 26B:
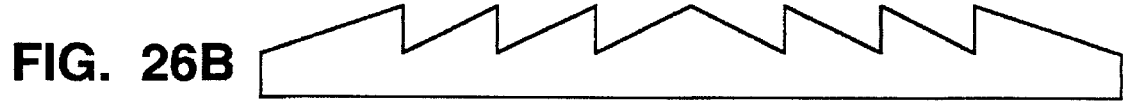
Figure 26C:
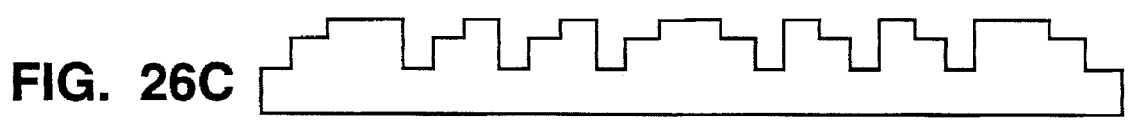

FIGS. 26A, 26B, and 26C illustrate a diffractive optical element for use in wave front compensation for radial gratings. FIG. 26A superimposes a radial grating pattern to a binary optic pattern which can be used. The binary optic pattern resembles an upside-down radial grating pattern. FIGS. 26B and 26C illustrate how the binary optic is preferably blazed or multi-stepped in order to keep efficiency high and to spatially filter unwanted orders. The spatial period of the diffractive pattern is a function of both the grating and detector array characteristic, an may be different from that of the grating.

It is envisioned that a binary optic pattern for wave front correction can be integrated with the collimator and apodized aperture so that one diffractive optical element accepts the diverging output from the laser diode 15, and produces two collimated and apodized beams of the appropriate dimensions, each with a top hat intensity profile.

WFC Reflective Embodiment

Figure 27:
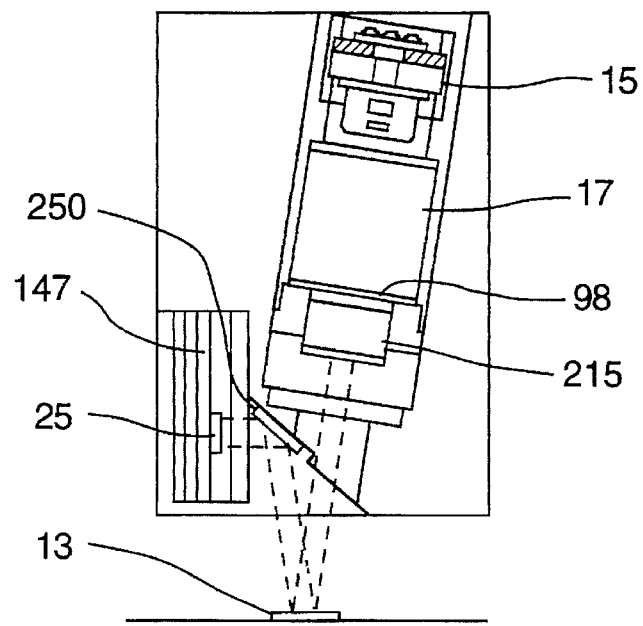
FIG. 27 depicts a reflective embodiment of the present invention which employs a wave front correction structure 215.

Referring to FIG. 27, a reflective embodiment of the present invention is shown which employs a wave front correction structure 215. Structure 215 is a refractive type and is positioned just ahead of aperture 98. The plane of FIG. 27 is assumed parallel to the steps of grating 13. The pre-corrected collimated beam from wave front correction structure 215 is then directed onto grating 13 at a slight angle as in the plane of FIG. 27 so that the reflected and diffracted orders are angled away from the incident collimated beam. Mirror 250 bends the diffracted orders onto detector 25. Detector 25 is shown positioned within the ceramic package of hybrid 147.

WFC Transmissive Embodiment

Figure 28:
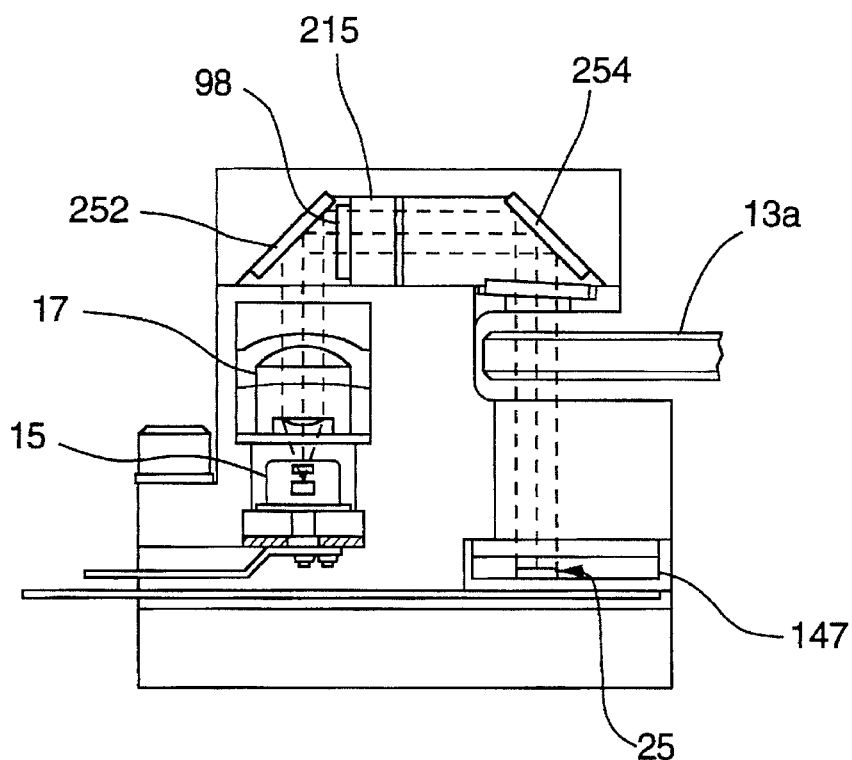
FIG. 28 illustrates a transmissive embodiment of the present invention which employs a wave front correction structure 215.

FIG. 28 illustrates a transmissive embodiment of the present invention which employs a wavefront correction structure 215. As in the case of the reflective embodiment, a refractive wave front correction structure 215 is positioned upstream of grating 13A and just ahead of aperture 98. The collimated beam from lens 17 is bent by mirror so that it is directed onto aperture 98. Mirror 254 bends the pre-compensated beam from wave front correction structure 215 and directs it through grating 13A so that the diffractive first orders are incident on detector 25 in hybrid 147. The double bending of the beams in this reflective WFC embodiment provides a compact head profile.

Transmissive WFC—Moving Stage

Figure 29:
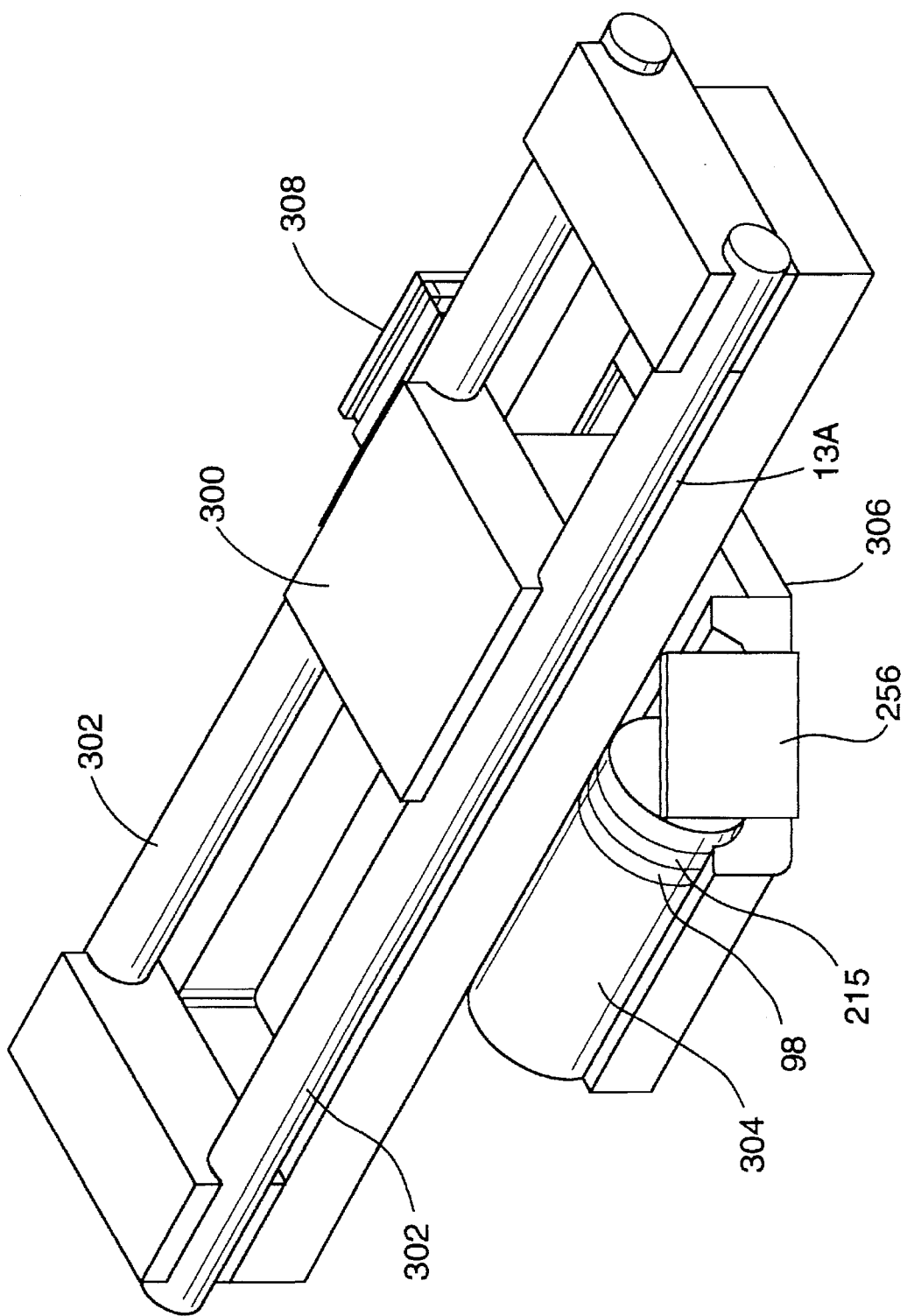
FIG. 29 illustrates a transmissive WFC embodiment of the present invention used to control the position of a moving stage 300.

FIG. 29 illustrates a transmissive WFC embodiment of the present invention used to control the position of a moving stage 300. The stage 300 is supported for motion along rails 302, with a transmissive grating 13A positioned beneath the rail 302 closest to the laser lens subsystem 304. Encoder bracket 306 is attached to stage 300 from the bottom, and supports the laser/lens subsystem 304 and sensor subsystem 308 for movement with stage 300. Encoder bracket 306 also supports the aperture 98 and wave front correction structure 215 so that a collimated, pre-corrected beam of light from wave front correction structure 215 is bent by mirror 256 and thereafter directed through transmissive grating 13A. The diffraction orders produced by transmissive grating 13A are then incident on sensor subsystem 308 on the other side of stage 300.

Optical Servo Control Within Closed Structures

Figure 30:
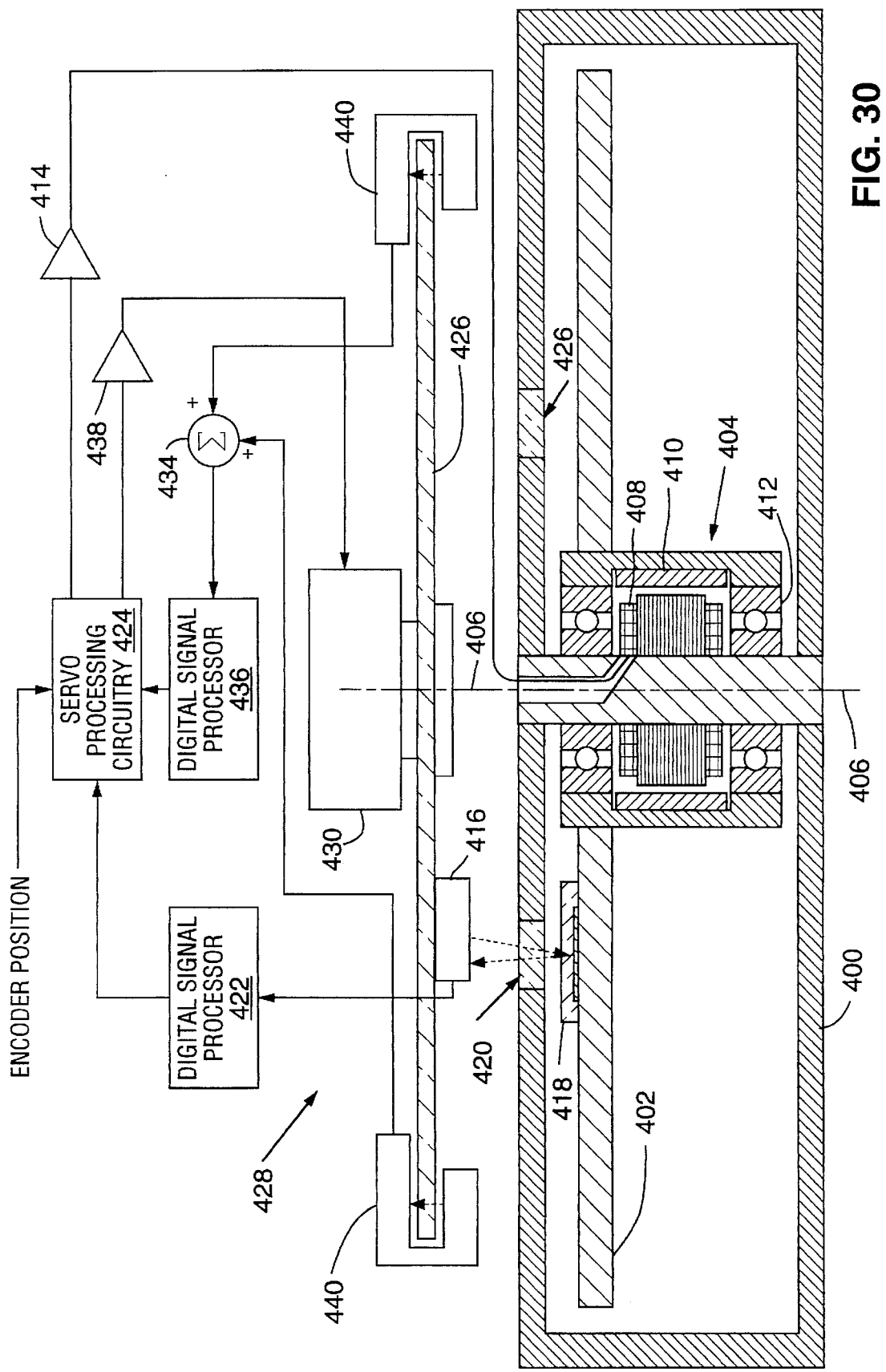
FIG. 30 is a simplified functional diagram of illustrating the optical servo control of a rotating component within a closed space in accordance with the present invention.

Referring now to FIG. 30 a simplified, functional diagram of the optical servo application of the present invention is provided. As discussed hereinabove, located within an enclosure 400 is a component 402, and a motor or actuator 404 which is capable of moving component 402. Component 402 rotates about an axis of rotation 406 in response to motive force supplied by motor 404. While component 402 is shown to be positioned symmetrically about motor 404, it is to be understood that the present invention applies as well to other component configurations which are rotatably moveable within enclosure 400.

In FIG. 30, for simplicity, only the coil portion 408, magnet portion 410, and bearings 412 of motor 404 are shown, it being understood that in an actual installation other motor components would be included to complete motor 404. The electrical signals which energize the coil portion 408 of the coil motor 404 are supplied by circuitry located externally to housing 400, and includes driver circuit 414. Other motor or actuator structures can also be used to rotate component 402 within the spirit of the present invention.

In accordance with the present invention, two servo loops are formed: an internal servo loop which optically locks component 402 to a sensor 416, and an external servo loop which precisely positions sensor 416 relative to the axis of rotation 406 to precisely control the position of component 402.

In accordance with the preferred embodiment of the present invention the internal servo loop is formed as follows. A grating fragment 418 is affixed component 402. In turn, a window 420 is formed in the enclosure 400 so that the grating fragment 418 is optically visible from the outside of enclosure 400 over the desired range of movement of component 402.

Grating fragment 418 is illuminated with light of wavelength $\lambda$ from sensor 416 located outside enclosure 400. Grating fragment 418 is constructed so that it produces natural, first order interference fringes through window 420 and outside of enclosure 400 so that sensor 416 can be used to detect the interference fringes.

For a selected target position on grating fragment 418 as detected by sensor 416, the internal servo loop operates to maintain the position of component 402, and hence the position of grating fragment 418 relative to sensor 416, so that the output from sensor 416 remains unchanged. Thus, as shown in FIG. 30, the output from sensor 416 is provided to a digital signal processor 422 which converts the output into position information. Servo processing circuitry 424 then uses this position information to control motor 404 via driver 414.

As is conventional, servo processing circuitry 424 compares the actual position information obtained from sensor 416 and digital signal processor 422 to the position information corresponding to the target position. In response to any variance of the actual position off of the target position the servo processing circuitry 424 issues a correction signal to motor 404 which urges component 402, and hence grating fragment 418, back into the proper position. In this manner, the internal servo loop optically locks grating fragment 418, and component 402 to sensor 416.

The external servo loop is formed to precisely control the position of sensor 416 about axis of rotation 406. FIG. 30 shows sensor 416 supported directly by the code disk 426 of a precision optical encoder 428. Optical encoder 428 is rotated by actuator 430. Alternatively, sensor 416 can be supported by an arm which is affixed to a shaft which has a common axis with actuator 430 so that sensor 416 rotates in the same manner as code disk 426.

While the position of sensor 416 is shown to be provided by a precision optical encoder, it is to be understood that other precision position sensors may be employed within the spirit of the present invention. For example, sensor 416 can be supported on an arm controlled by a Michelson laser interferometer.

The external servo loop controls encoder disk 426, and therefore sensor 416, to be positioned precisely at positions designated by a conventional controller (not shown). These designated positions are received by servo processing circuitry 424 and compared against the actual position information obtained from, for example, transmissive read stations 440, via summer 434 and interpolator 436. Servo processing circuitry 424 issues control signals to actuator 430, via driver 438, to modify the position of encoder disk 426 until the actual position information matches the designated position.

In the preferred embodiment of the present invention, sensor 416 and grating fragment 418 are of the type described earlier in this application. For example, the heads illustrated in FIGS. 8A–8E, and 9 can be used for sensor 416. It is to be understood, however, that the grating fragment 418 employed in this embodiment of the present invention need not be constructed as precisely as described in connection with the earlier embodiments illustrated in this application. This is because grating fragment 418 is used to indicate a change in position, instead of to precisely indicate the amount by which a position has changed. Because of this, the grating fragment can be low cost.

Preferably the position of code disk 426, is precisely determined using two transmissive read stations 440, such as the transmissive head of FIG. 10.

As described in connection with FIG. 13, the output signals (channels A, B, C, D) from the polyphase detector are amplified and processed in a conventional manner with the DC offset removed by subtracting channel C from channel A, and Channel B from channel D. This produces sine-cosine analog output signals. These sine-cosine signals are added together in a summer, and thereafter can be processed in a variety of ways to interpolate fine position information. See, for example, *Digital Linear and Analog Metrology*, 1992, published by Verlar with collaboration with Heidenhain, pages 23–28.

Preferably the digital signal processing and servo processing function for the external positioner 428 of FIG. 30 are provided by way of a commercially available digital signal processing servo board, Model No. MEI PC DSP, manufactured by Motion Engineering Inc. of Santa Barbara, Calif., running on an IBM compatible personal computer. With the supplied software, position resolution of 12 bits can be obtained.

Alternatively, position information can be obtained using arctangent multiplier functional blocks in place of the digital signal processors 422 and 436. Suitable arctangent multipliers include those which are incorporated into Optical Encoder Model RAL 24/158, manufactured by BEI Precision Systems and Space Division of Little Rock, Ark.

Preferably, the two transmissive read stations 440 are positioned 180° apart from one another to correct for any lack of concentricity of the disk 426. Disk 426 is preferably rotated by a rotary actuator 430, such as Model No. RA29-11-002A, manufactured by Kimco Magnetics Division of BEI Motion Systems Company, Carlsbad, Calif. In turn, rotary actuator 430 is driven by signals from amplifier 438, which can be model no. 12A8, manufactured by Advanced Motion Controls of Camarillo, Calif.

Linear Optical Servo Embodiment

Figure 31:
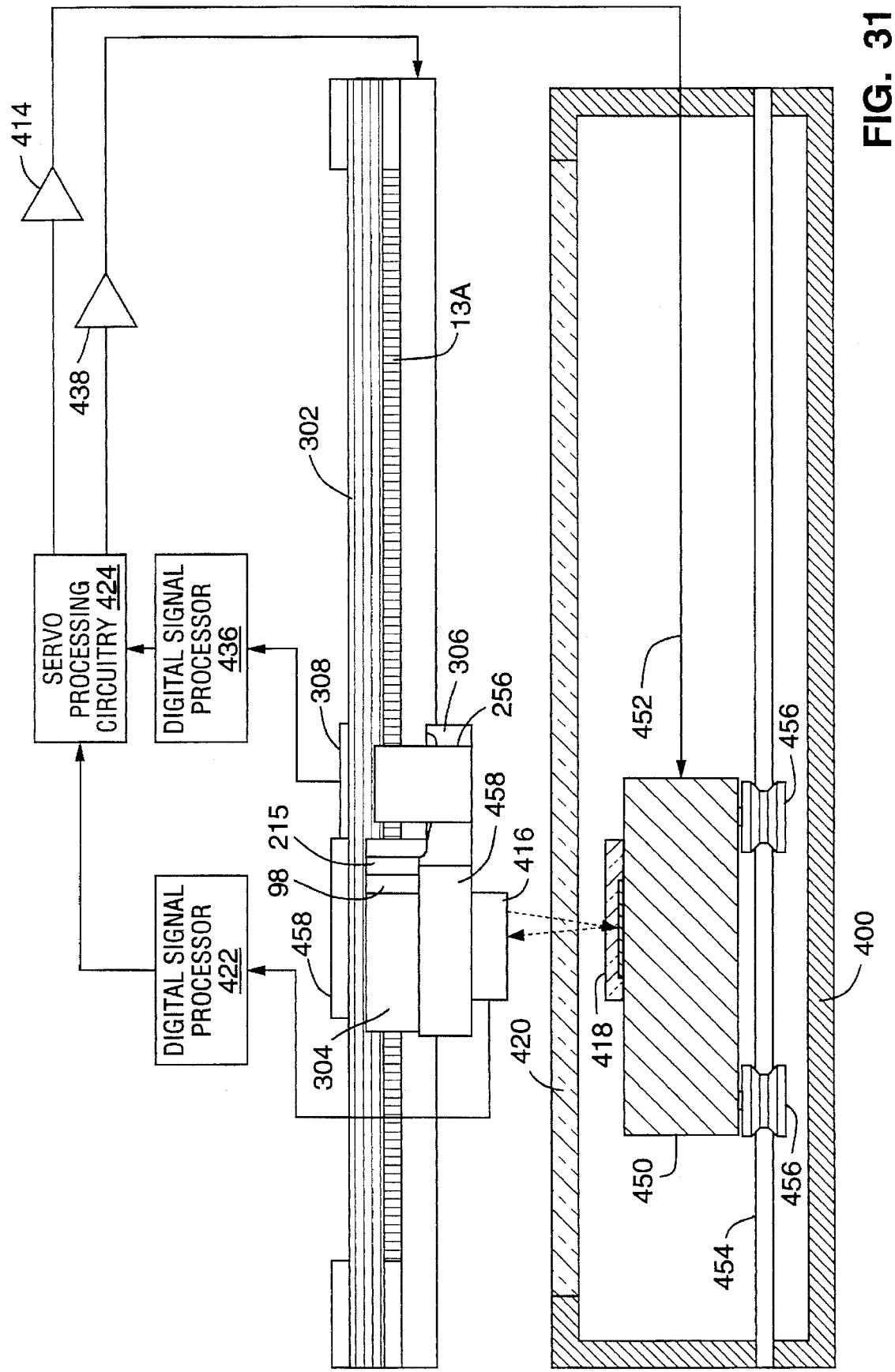
FIG. 31 is a simplified functional diagram of illustrating the optical servo control of a linearly actuated component within a closed space in accordance with the present invention.

Referring now to FIG. 31, a linear version of the optical servo embodiment of the present invention is illustrated. Where elements are the same as those used in the rotational embodiment of FIG. 30, the same reference numbers are used.

In FIG. 31, the component 450 located in the closed space of enclosure 400 is capable of being moved linearly. For example, component 450 can be a stage, and a conventional positioning mechanism (not shown) located within enclosure 400 and energized by signals provided on line 452 can be used to cause component 450 to move along a path defined by a set of rails, one of which is shown in FIG. 31 as rail 454. Suitable wheels 456 attached to component 450 roll along the rails and thereby cause component 450 to travel along a linear path. It is to be understood that the present invention is applicable to other arrangements by which a component is moved along a lineal path within a closed space.

A grating fragment 418 is shown positioned on component 450. Sensor 416 is shown projecting a beam of coherent light on grating fragment 418, through window 420, and detecting the natural interference generated by grating fragment 418.

Sensor 416 is shown mounted on a stage 458 which itself is precisely controlled to move along a lineal path. For example, the structure illustrated in FIG. 29 can provide a precision lineal positioner suitable for use in the embodiment of FIG. 31.

Differential Offset

Before describing the calibration methodology of the present invention as set forth in FIG. 33, the nature of the position information available from grating fragment 418 and position sensor 416 will first be described in connection with FIG. 32.

By way of example, a grating fragment 418 of approximately ⅜" in width can be used. When a grating with a period of 20 μm is illuminated with coherent light of approximately 785 nm wavelength, interference between the positive and negative first diffraction orders will produce an interference pattern with a 10 μm period.

Figure 32:
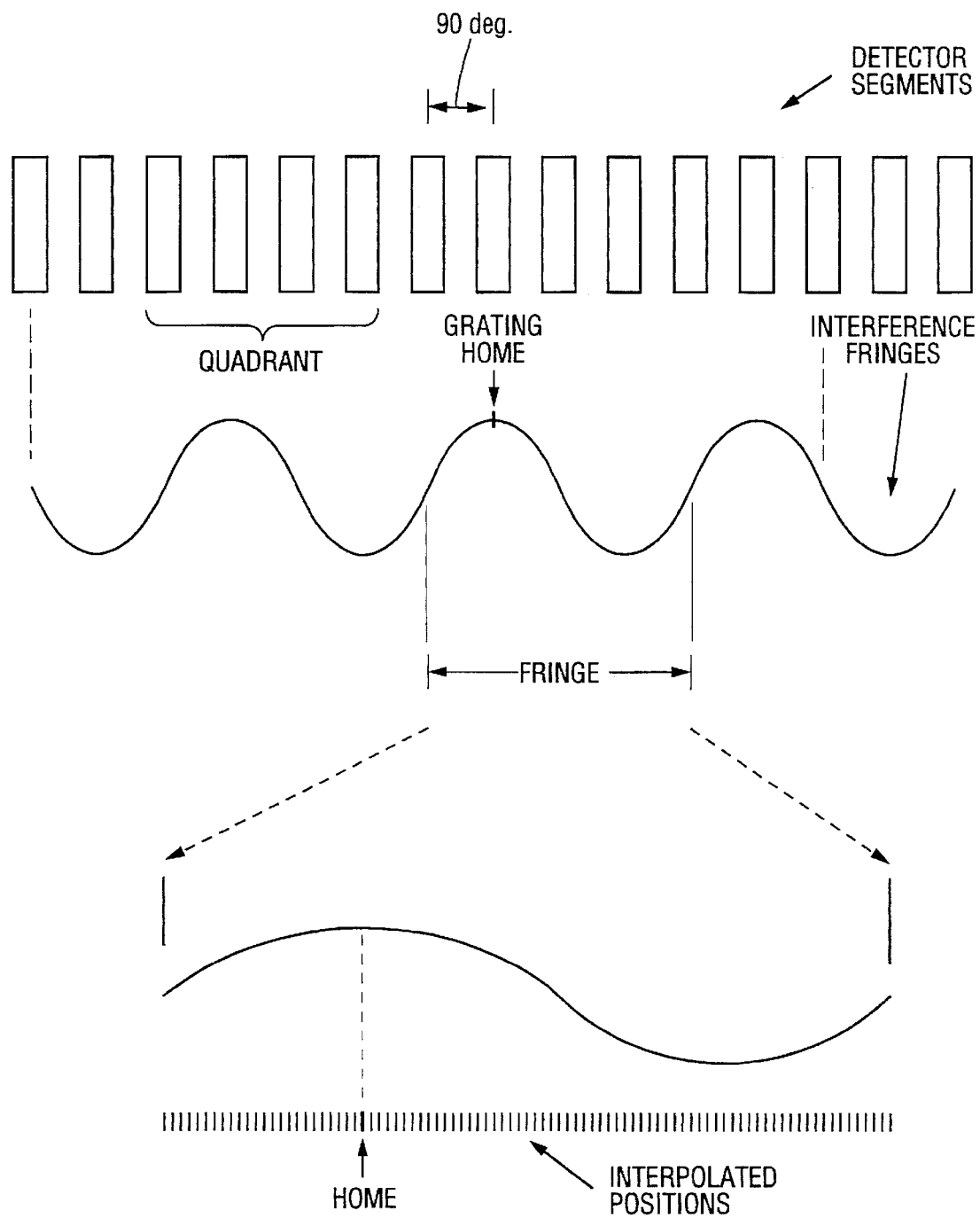
FIG. 32 illustrates the relationship between the interference fringes and detector segment spacing.

FIG. 32 illustrates three such interference fringes. Detector segments within sensor 416 are shown above the interference fringes with the approximate spatial relationship to the period of the interference fringes. In the preferred embodiment of the present invention a poly phase detector is employed in which the detector segments are spaced at 90° intervals relative to the interference fringe period, to form a group of four detector segments per cycle of the interference fringe. As described earlier herein, in connection with detector 25 and FIGS. 11A and 11B, the outputs of the detector segments are summed in a periodic fashion.

The outputs from the detector segments are processed using the DSP interpolator 422, or other suitable interpolator, to generate the interpolated positions shown at the bottom of FIG. 32. For purposes of illustration, the resolution of the interpolated positions shown in FIG. 32 are much coarser than would be produced in an actual system.

For example, a geometric or mathematical interpolation of each fringe can be performed to a resolution of twelve bits, to yield 4096 positions for each fringe. Thus, the component 402 (450) can be optically locked not only to a particular point in a fringe, but also to any of 4096 different interpolated positions on either side such point.

Furthermore, because in this example there would be approximately 3,000 fringes available across the width of the grating fragment 418, the position of the component 402 (450) can be accurately offset up to about 750 fringes on either side of a home position of the grating fragment 418. In other words, an offset can be applied to the internal servo loop so that the relative position of the component 402 (450) with respect to the sensor 416 is offset from the nominal home position which the internal servo loop would normally maintain between them. By using such an offset the internal servo loop would optically lock, for example, onto a position ten (10) interpolated increments away from the grating home position shown in FIG. 32.

This differential offset feature is desirable, for example, when the external precision positioner has less stiffness or greater mass than the object 402 within enclosure 400. As such, it would be desirable to maintain the position of the external positioner and differentially offset the component 402 in relation to the external positioner. The internal component 402 would thus be moved with much greater speed than if both internal and external positioners were merely optically locked together, and both were required to move together for each and every movement of the internal component 402.

Calibration

Figure 33:
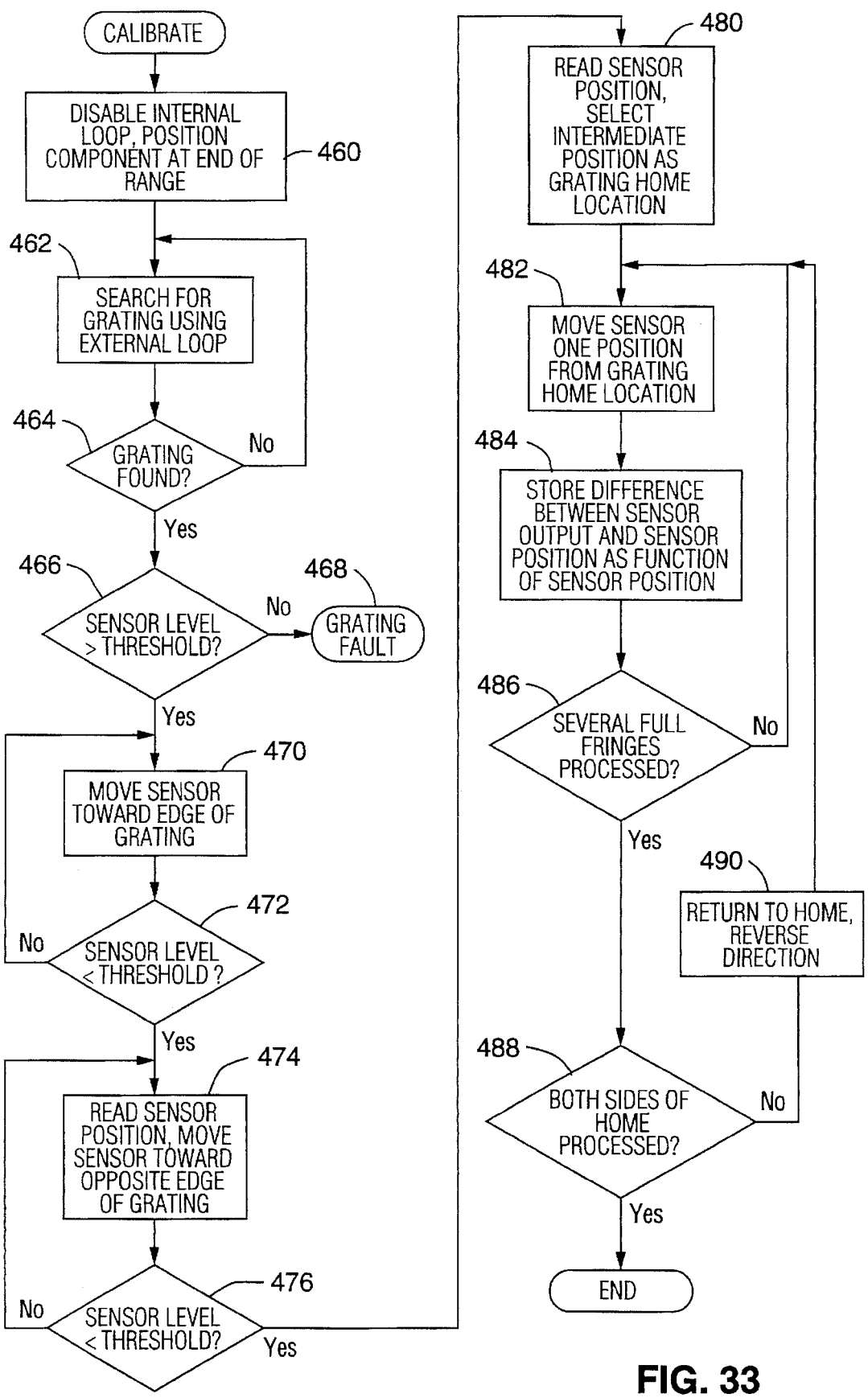
FIG. 33 provides an illustrative flow diagram for calibrating the optical servo embodiment of the present invention.

Referring now to FIG. 33 the calibration process will be described in greater detail.

In FIG. 33, the calibration procedure begins with step 460 in which the internal servo loop is disabled, and the component 402 (450) is positioned against a stop at one end of its range of movement. Next, in step 462, the external loop is used to sweep the sensor 416 across the range of positions at which the component 402 (450) might be found to search for grating fragment 418. In the absence of a grating fragment 418, the output level from sensor 416 will be very low. Once sensor 416 begins detecting interference fringes from grating fragment 418, a discernable output will be provided by sensor 416. In step 464 the presence of such an output will result in the execution of step 466.

Step 466 determines whether the output from sensor 416 exceeds a certain minimum threshold. An output level less than this threshold can indicate a grating fault 468, such as a mispositioned or defective grating.

On the other hand, if the output of sensor 416 exceeds the threshold, step 470 is processed to move sensor 416 toward one edge of grating fragment 418. Step 472 is used to determine when an edge is reached by determining when the sensor level drops below a selected threshold. Once that point is reached, the sensor position as indicated by the external servo positioner is read and noted in step 474. Also in step 474 sensor 416 is then moved toward the opposite edge of grating fragment 418. Step 476 detects when the opposite edge is reached, and then step 480 reads and notes the position of sensor 416 for the opposite edge. Then, also as a part of step 480, a grating home position is selected which is intermediate the edge position. This home position is then used as the null or center position of the grating fragment 418. Alternatively, a peak detection scheme can be used where the largest fringe in the middle of the modulation envelope from the grating fragment 418 is detected and used for the home position.

Steps 482 through 490 are provided to tabulate the correspondence between position signals being provided by sensor 416, as indicated by the output of DSP interpolator 422, and the corresponding position of the external servo loop, as indicated by the output of DSP interpolator 436. In the radial optical servo of FIG. 30, where the external servo loop positioner employs a diffraction grating positioned along a path having a diameter different from the diameter of the path for the grating fragment 418 and sensor 416, the resolution of the external servo loop positioner will be different than that of sensor 416 as a function of the ratio of these two diameters. Thus, there will be a different number of fringes on the path of sensor 416 as compared to the path of the external servo positioner. This difference should be taken into account during this tabulation process.

In step 482, starting from the home position of grating fragment 418, the position of sensor 416 is changed by a predetermined amount relative to grating fragment 418, for example by an amount which will provide 256 corrections over four fringes on each side of the home position, or every 11.25° of phase. Thereafter, step 484 is performed to determine the difference between the external servo loop positioner reading and the reading from sensor 416. This difference is stored as a function of the corresponding external servo loop position.

Step 486 causes steps 482 and 484 to be repeated until several full fringes have been processed in this manner. Once this has occurred, step 488 determines whether fringes on both sides of the home position have been processed. If not, step 490 causes the sensor 416 to be moved back to the home position and tabulation to be made in the reverse direction. When several fringes on both sides of the home position have been processed, the calibration procedure is terminated.

The objective of the calibration steps 482 through 490 is to create an error correction look-up table so that when the read/write arm is offset relative to the external servo loop positioner, errors in the grating fragment will be eliminated and the correct position will be held.

Upon completion of the calibration process of FIG. 33, several tasks will have been accomplished: 1) check for defective grating, 2) selection of a grating home location, 3) correlation of external loop position readings to internal loop position readings in the vicinity of the grating home location.

The grating fragment 418 is shipped within the completed housing so that a low cost replication or embossing manufacturing process is required. Since the grating is either used to provide a home position or is calibrated, it does not require inherent accuracy, and may be manufactured using a wide variety of standard processes. For example, the grating fragment 418 can be a replicated grating on plastic, or embossed or milled directly into the component 402. It can also be electro deposited.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An apparatus for detecting relative movement comprising a diffraction grating relatively movable with respect to a source and having a period P and a characteristic which diffracts light at a preselected wavelength $\lambda$ into positive and negative diffraction orders which interfere with one another in a region of natural interference adjacent the diffraction grating;

means for illuminating with first and second beams of light of wavelength $\lambda$ a region of said diffraction grating;

a periodic detector having a sensing plane positioned within the region of natural interference of the diffraction grating between positive and negative diffraction orders from the first and second beams of light; wherein the periodic detector has a period which is a function of the preselected wavelength $\lambda$ and the period P of the diffraction grating, wherein the periodic detector provides an output signal in response to light incident thereon, whereby the periodic detector responds principally to interference at said sensing plane between the positive and negative diffraction orders diffracted from said diffraction grating.

2. The apparatus of claim 1 wherein the illuminating means includes a light source positioned proximate the diffraction grating.

3. The apparatus of claim 2 wherein the multi-element detector includes two arrays of elongate photodiodes providing quadrature signals.

4. The apparatus of claim 1 wherein the illuminating means includes a light source and a light transmitting structure positioned between the light source and the diffraction grating.

5. An apparatus for detecting relative movement comprising a diffraction grating relatively movable with respect to a source and having a period P and a characteristic which diffracts light at a preselected wavelength $\lambda$ into positive and negative diffraction orders which interfere with one another in a region of natural interference adjacent the diffraction grating;

a light source providing a beam of light of wavelength λ;

a polarizing beam splitter;

a quarter-wavelength phase retarder, wherein the polarizing beam splitter is positioned in a path of the beam to reflect substantially all of the beam through the phase retarder and onto the diffraction grating, and further wherein the polarizing beam splitter and the phase retarder are positioned so that positive and negative diffraction orders diffracted from the diffraction grating pass through the phase retarder and the polarizing beam splitter; and a detector having a sensing plane positioned within a region of natural interference between positive and negative diffraction order beams from the diffraction grating which have passed through the phase retarder and the polarizing beam splitter.

6. The apparatus of claims 1 or 5 wherein the light source is monochromatic.

7. An apparatus capable of detecting relative movement of a member which includes a diffraction grating having a period P and a characteristic which diffracts light at a preselected wavelength λ into positive and negative diffraction orders that interfere with one another in a region of natural interference adjacent the diffraction grating, the apparatus comprising a head structure;

a carrier structure supported by the head structure;

a light source which provides collimated, monochromatic of the pre-selected wavelength λ and supported by the head structure;

a periodic detector positioned on the carrier structure, having a sensing plane and a having a period which is a function of the preselected wavelength λ and the period P of the diffraction grating, wherein the periodic detector provides an output signal in response to light incident thereon;

electronic circuitry positioned on the carrier structure, for conditioning the output signal from the periodic detector;

a mirror structure supported by the head structure;

wherein the mirror structure has a position on the head structure with respect to the light source so as to be capable of directing onto the periodic detector natural interference between positive and negative diffraction orders which are diffracted by the diffraction grating in response to light incident on the diffraction grating from the light source when the head structure is positioned adjacent the diffraction grating.

8. The apparatus of claims 5 or 7 wherein the light source is positioned proximate the diffraction grating.

9. An apparatus for detecting relative movement comprising a diffraction grating relatively movable with respect to a source and having a period P and a characteristic which diffracts light at a preselected wavelength λ into positive and negative diffraction orders which interfere with one another in a region of natural interference adjacent the diffraction grating;

means for illuminating with first and second beams of light of wavelength A a region of said diffraction grating;

a multi-element detector having a sensing plane positioned within the region of natural interference of the diffraction grating between positive and negative diffraction orders from the first and second beams of light; wherein the multi-element detector has a period which is a function of the preselected wavelength λ and the period P of the diffraction grating, wherein the multi-element detector provides an output signal in response to light incident thereon, whereby the multi-element detector responds principally to interference at said sensing plane between the positive and negative diffraction orders diffracted from said diffraction grating.

10. The apparatus of claims 1, 7 or 9, wherein the diffraction grating is located on a substrate and further including a binary zone lens located on the substrate which is constructed to focus light from the light source, and further wherein the detector includes an index portion which is constructed to detect the light focused by the binary zone lens.

11. The apparatus of claim 9 wherein the diffraction grating is ruled in orthogonal directions so that natural interference is produced in the sensing plane between positive and negative diffraction orders along orthogonal axes, and the multi-element detector includes elements positioned to detect the natural interference along the orthogonal axes.

12. The apparatus of claim 9 wherein the multi-element detector provides quadrature signals.

13. The apparatus of claim 9 wherein the multi-element detector includes interleaved arrays of elongate photodiodes.

14. The apparatus of claim 9, further including a processing module which produces quadrature signals from the signals out of the multi-element detector.

15. The apparatus of claim 14 wherein the processing module further performs processing which accounts for non-pure sinewave signals from the detector.

16. The apparatus of claim 14 wherein the processing module applies a weighting function to the non-pure sinewave signals.

17. The apparatus of claim 16 wherein the weighting function employs pattern matching tables.

* * * * *